US010140620B2

(12) United States Patent
Heath

(10) Patent No.: US 10,140,620 B2
(45) Date of Patent: Nov. 27, 2018

(54) MOBILE DEVICE SYSTEM AND METHOD PROVIDING COMBINED DELIVERY SYSTEM USING 3D GEO-TARGET LOCATION-BASED MOBILE COMMERCE SEARCHING/PURCHASES, DISCOUNTS/COUPONS PRODUCTS, GOODS, AND SERVICES, OR SERVICE PROVIDERS-GEOMAPPING-COMPANY/LOCAL AND SOCIALLY-CONSCIOUS INFORMATION/SOCIAL NETWORKING ("PS-GM-C/LANDSC/I-SN")

(76) Inventor: Stephan Heath, Littleton, CO (US)

( * ) Notice: Subject to any disclaimer, the term of this patent is extended or adjusted under 35 U.S.C. 154(b) by 1431 days.

(21) Appl. No.: 13/337,275

(22) Filed: Dec. 26, 2011

(65) Prior Publication Data
US 2013/0073377 A1     Mar. 21, 2013

Related U.S. Application Data

(63) Continuation-in-part of application No. 13/233,352, filed on Sep. 15, 2011, now abandoned.

(51) Int. Cl.
G06Q 30/02 (2012.01)
(52) U.S. Cl.
CPC ................................. G06Q 30/02 (2013.01)
(58) Field of Classification Search
None
See application file for complete search history.

(56) References Cited

U.S. PATENT DOCUMENTS

| 6,073,124 A | 6/2000 | Krishnan et al. |
| 7,630,936 B2 | 12/2009 | Kumar et al. |
| 7,756,756 B1 | 7/2010 | Lifson |

(Continued)

OTHER PUBLICATIONS

Q. Huang and Y. Liu, "On Geo-social network services," 2009 17th International Conference on Geoinformatics, Fairfax, VA, 2009, pp. 1-6; date of conference: Aug. 12-14, 2009; date added to IEEE Xplore Oct. 23, 2009 (Year: 2009).*

(Continued)

*Primary Examiner* — Eric R Netzloff
*Assistant Examiner* — Michael R Stibley
(74) *Attorney, Agent, or Firm* — Peter B. Scull; Hamilton, DeSanctis & Cha LLP

(57) ABSTRACT

Mobile device based systems and methods are provided for combined delivery system that will allow shoppers to search and pay for their purchases, redeem coupons and earn reward points via the web or a mobile device or portable device to engage in social networking integration & mobile: services, payment, wallet, express checkout, money transfer, social media widgets, keywords, coupons, instant messaging marketing, voting, eCards, short codes, commerce, shopping, push content, geo-mobile, and geo-social services (collectively referred to as "Mobile Services") with access to advertisements, daily deal coupons and free or discounted printable coupons, products & services, clickable advertisements & mobile advertisements by geo-target location from merchants, business owners, B2B business directory, retailers and major brands around the world, in combination with geospatial website for a multidimensional representation of information and/or scalable versions of web content associated with entities providing and/or members of the service and/or social networking.

9 Claims, 32 Drawing Sheets

(56) References Cited

U.S. PATENT DOCUMENTS

| | | | |
|---|---|---|---|
| 7,831,476 B2 * | 11/2010 | Foster | G06Q 30/02 705/26.8 |
| 7,860,852 B2 | 12/2010 | Brunner et al. | |
| 7,908,263 B1 | 3/2011 | Palz et al. | |
| 7,933,897 B2 | 4/2011 | Jones et al. | |
| 7,970,665 B1 | 6/2011 | Lifson | |
| 7,980,466 B2 | 7/2011 | Lee et al. | |
| 8,209,220 B2 | 1/2012 | Yoshikawa et al. | |
| 8,725,399 B2 * | 5/2014 | Nonaka | 701/420 |
| 2002/0055924 A1 | 5/2002 | Liming et al. | |
| 2002/0094868 A1 | 7/2002 | Tuck et al. | |
| 2003/0158796 A1 | 8/2003 | Balent | |
| 2004/0073634 A1 * | 4/2004 | Haghpassand | G06F 21/50 709/220 |
| 2005/0288959 A1 | 12/2005 | Eraker et al. | |
| 2006/0170670 A1 | 8/2006 | Burke | |
| 2006/0238380 A1 * | 10/2006 | Kimchi | G01C 21/26 340/995.1 |
| 2006/0265197 A1 | 11/2006 | Peterson et al. | |
| 2007/0143345 A1 | 6/2007 | Jones et al. | |
| 2007/0174259 A1 * | 7/2007 | Amjadi | 707/3 |
| 2007/0265006 A1 | 11/2007 | Washok et al. | |
| 2008/0307003 A1 | 2/2008 | O'Donnell | |
| 2008/0140650 A1 * | 6/2008 | Stackpole | G06F 17/3087 |
| 2008/0172288 A1 | 7/2008 | Pilkalns et al. | |
| 2008/0201156 A1 | 8/2008 | Abhyanker et al. | |
| 2008/0214148 A1 * | 9/2008 | Ramer | G06F 17/30749 455/414.1 |
| 2008/0222295 A1 * | 9/2008 | Robinson et al. | 709/227 |
| 2008/0300979 A1 | 12/2008 | Abhyanker et al. | |
| 2009/0070129 A1 | 3/2009 | Inbar et al. | |
| 2009/0070204 A1 | 3/2009 | Clancy et al. | |
| 2009/0144144 A1 | 6/2009 | Grouf et al. | |
| 2009/0163187 A1 | 6/2009 | Terrell et al. | |
| 2009/0187486 A1 | 7/2009 | Lefenfeld et al. | |
| 2010/0042923 A1 * | 2/2010 | Barcay | G06T 17/05 715/715 |
| 2010/0094752 A1 | 4/2010 | Heath | |
| 2010/0119053 A1 | 5/2010 | Goeldi | |
| 2010/0145800 A1 | 6/2010 | Eraker et al. | |
| 2010/0198684 A1 | 8/2010 | Eraker et al. | |
| 2010/0226535 A1 | 9/2010 | Kimchi et al. | |
| 2010/0325563 A1 | 12/2010 | Goldthwaite et al. | |
| 2011/0004515 A1 | 1/2011 | Mesaros | |
| 2011/0029360 A1 | 2/2011 | Gollapalli | |
| 2011/0035284 A1 | 2/2011 | Moshfeghi | |
| 2011/0041168 A1 | 2/2011 | Murray | |
| 2011/0066615 A1 | 3/2011 | Pradhan et al. | |
| 2011/0082736 A1 | 4/2011 | Goldman et al. | |
| 2011/0173066 A1 | 7/2011 | Simmons et al. | |
| 2011/0191417 A1 | 8/2011 | Rathord | |
| 2011/0191432 A1 | 8/2011 | Layson et al. | |
| 2011/0196776 A1 | 8/2011 | Rash et al. | |
| 2011/0208724 A1 | 8/2011 | Jones et al. | |
| 2011/0231363 A1 | 9/2011 | Rathod | |
| 2011/0238762 A1 * | 9/2011 | Soni | G01C 21/3679 709/206 |
| 2011/0246305 A1 | 10/2011 | Brazeau et al. | |
| 2011/0258073 A1 | 10/2011 | Lifson et al. | |
| 2011/0276396 A1 | 11/2011 | Rathod | |
| 2011/0276628 A1 | 11/2011 | Pell | |
| 2011/0313781 A1 | 12/2011 | Ho | |
| 2012/0036015 A1 | 2/2012 | Sheikh | |
| 2012/0054014 A1 | 3/2012 | Cho et al. | |
| 2012/0066037 A1 | 3/2012 | Glen | |
| 2013/0073336 A1 | 3/2013 | Heath | |
| 2013/0073366 A1 | 3/2013 | Heath | |
| 2013/0073374 A1 | 3/2013 | Heath | |
| 2013/0073376 A1 | 3/2013 | Heath | |
| 2013/0073387 A1 | 3/2013 | Heath | |
| 2013/0073388 A1 | 3/2013 | Heath | |
| 2013/0073389 A1 | 3/2013 | Heath | |
| 2013/0073400 A1 | 3/2013 | Heath | |
| 2013/0073473 A1 | 3/2013 | Heath | |
| 2013/0268357 A1 | 10/2013 | Heath | |
| 2014/0006129 A1 | 1/2014 | Heath | |

OTHER PUBLICATIONS

International Search Report and Written Opinion of the International Searching Authority. International Application No. PCT/US2012/036896, issued by the United States Patent Office, dated Jul. 20, 2012, Alexandria Virginia.

* cited by examiner

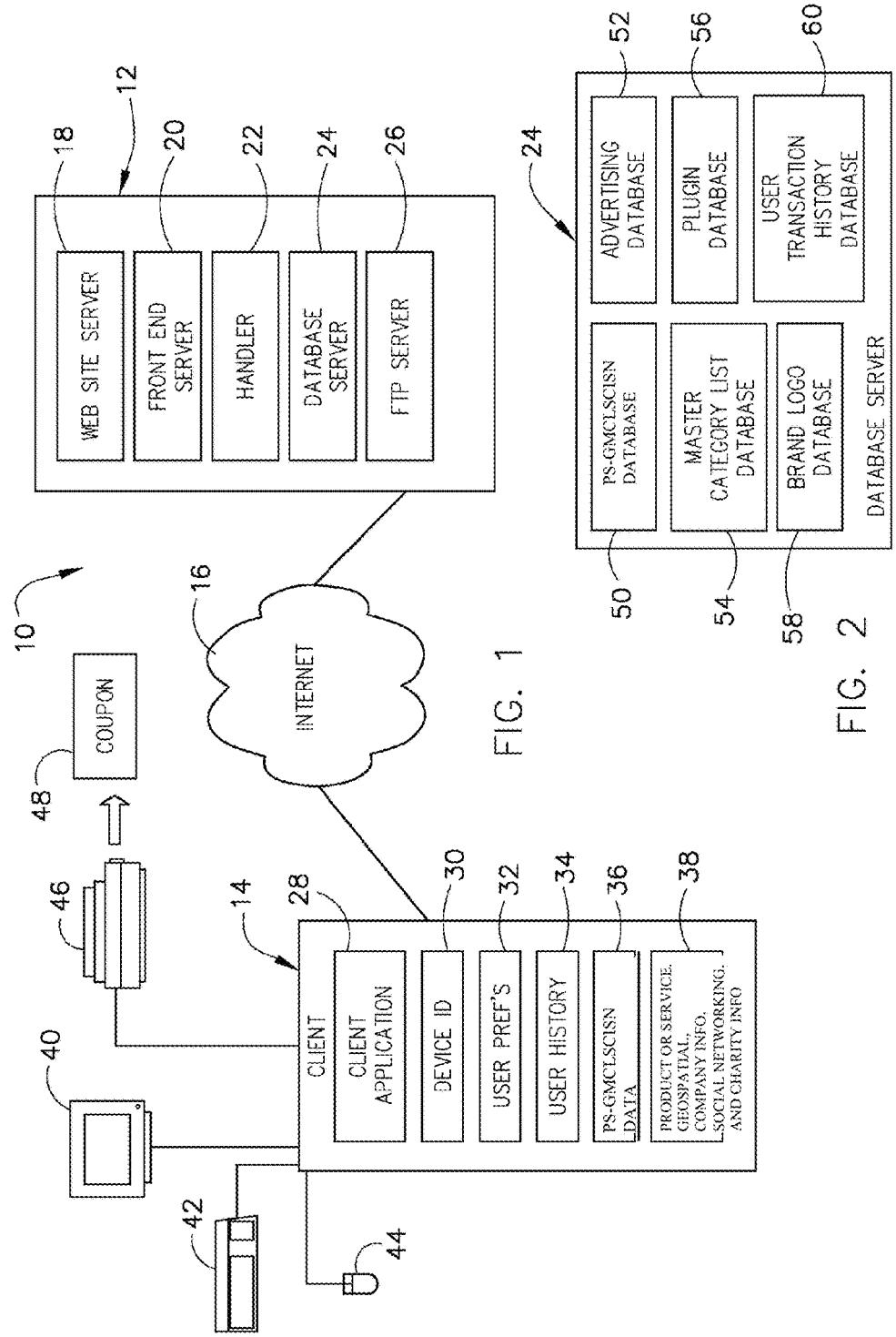

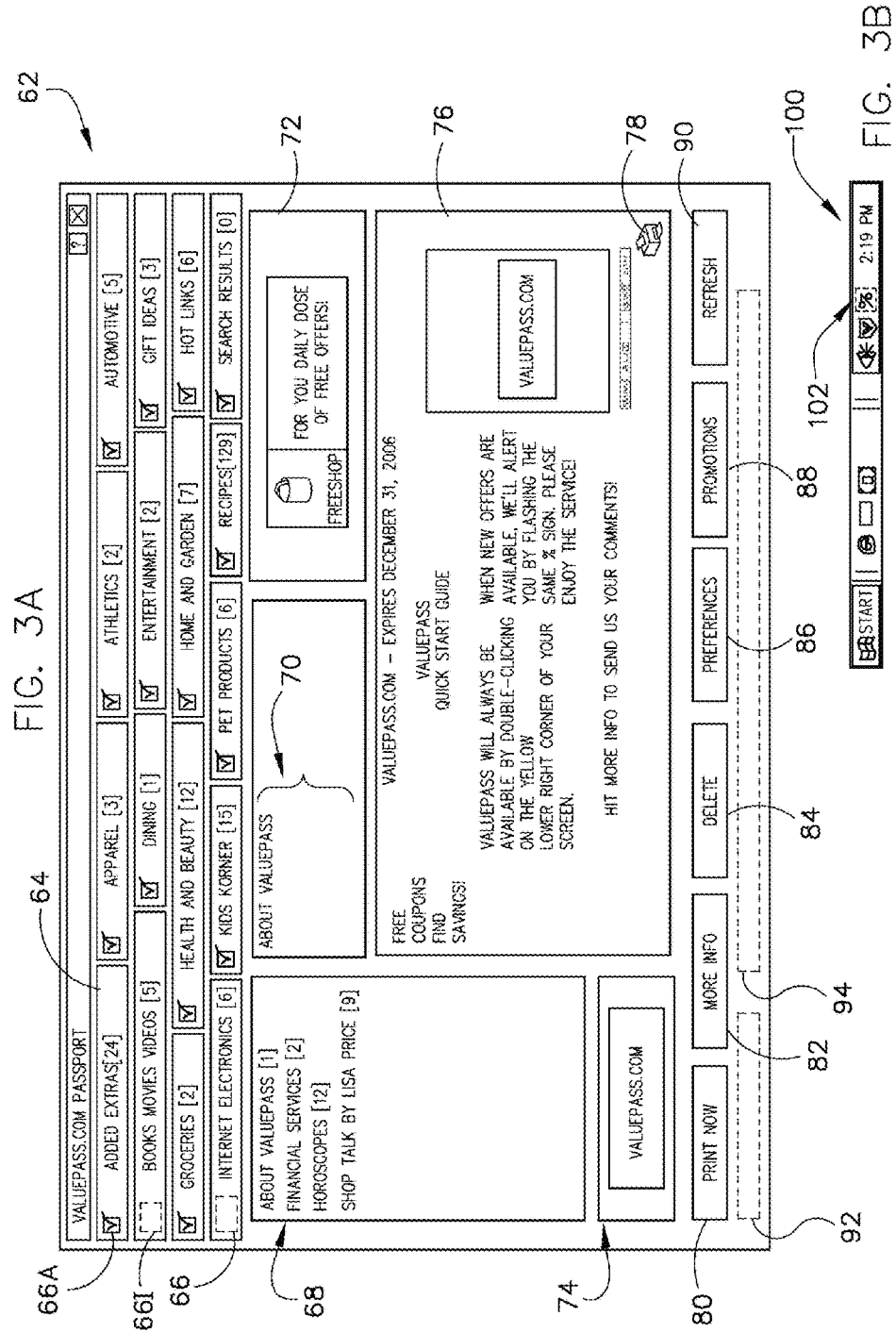

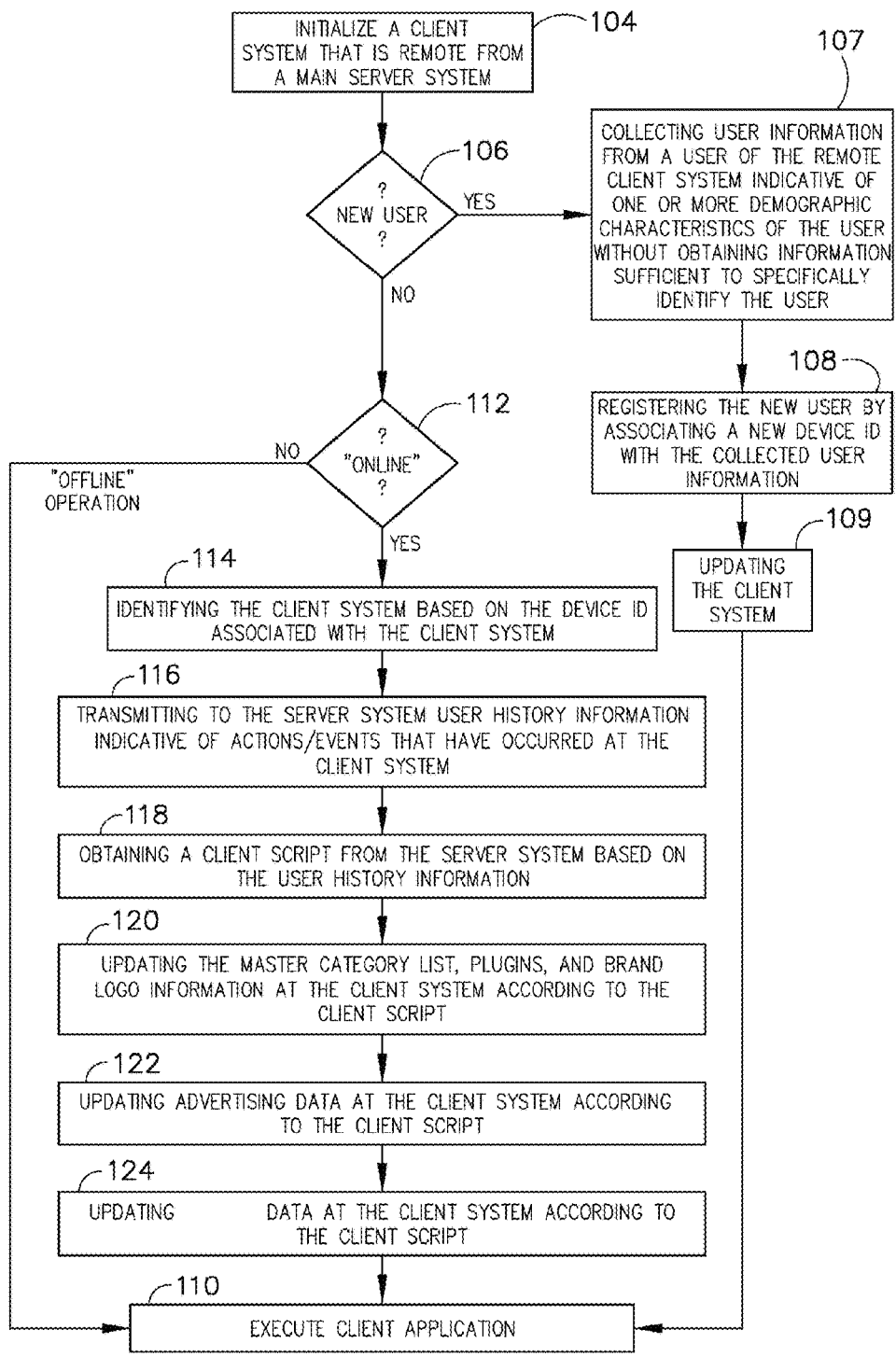

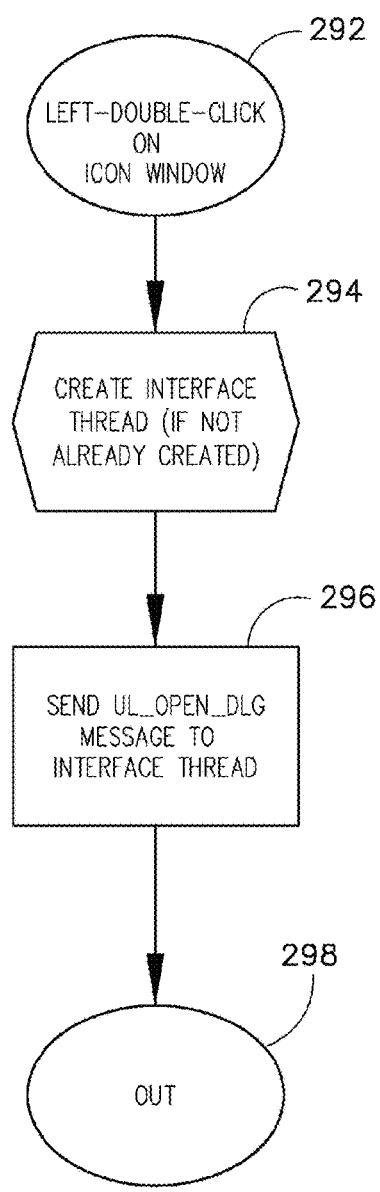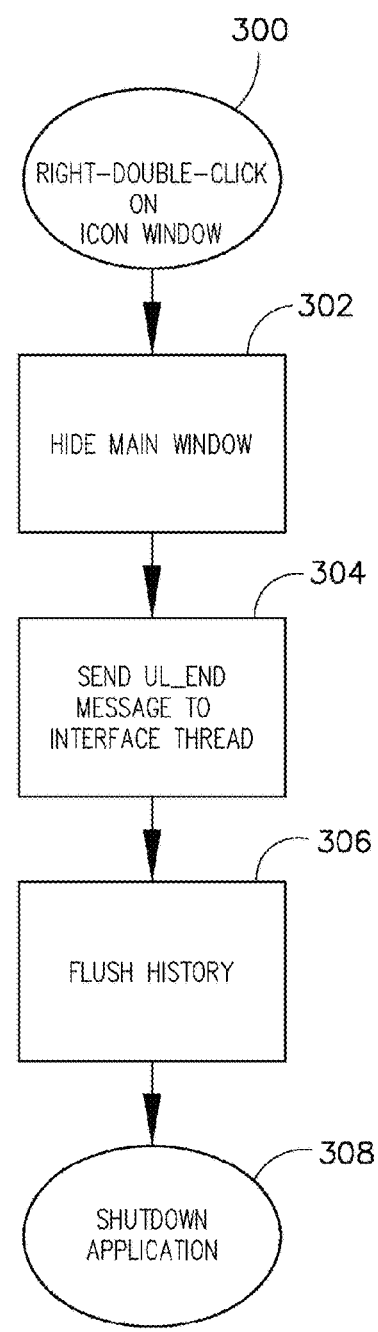
FIG. 19
FIG. 20

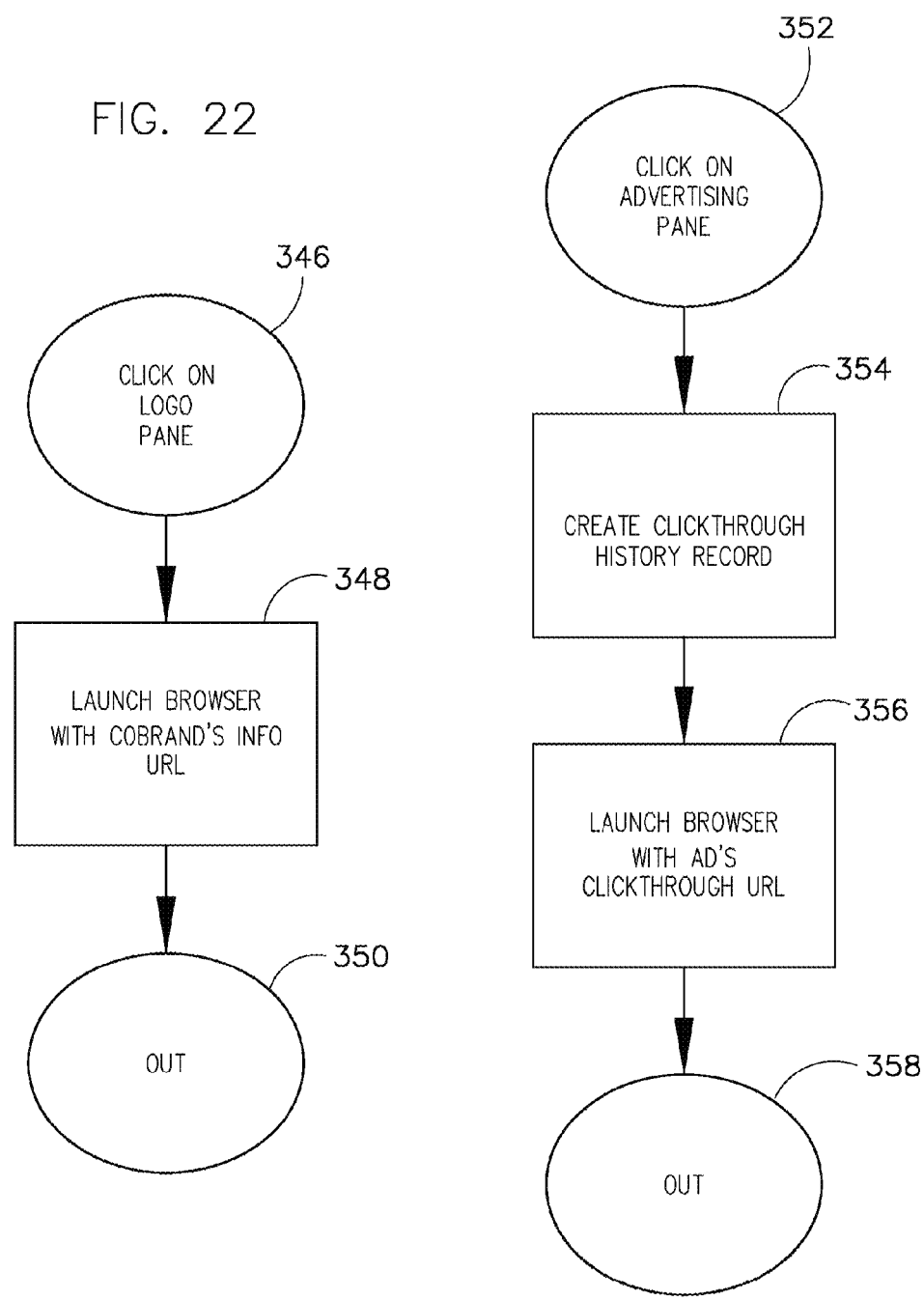

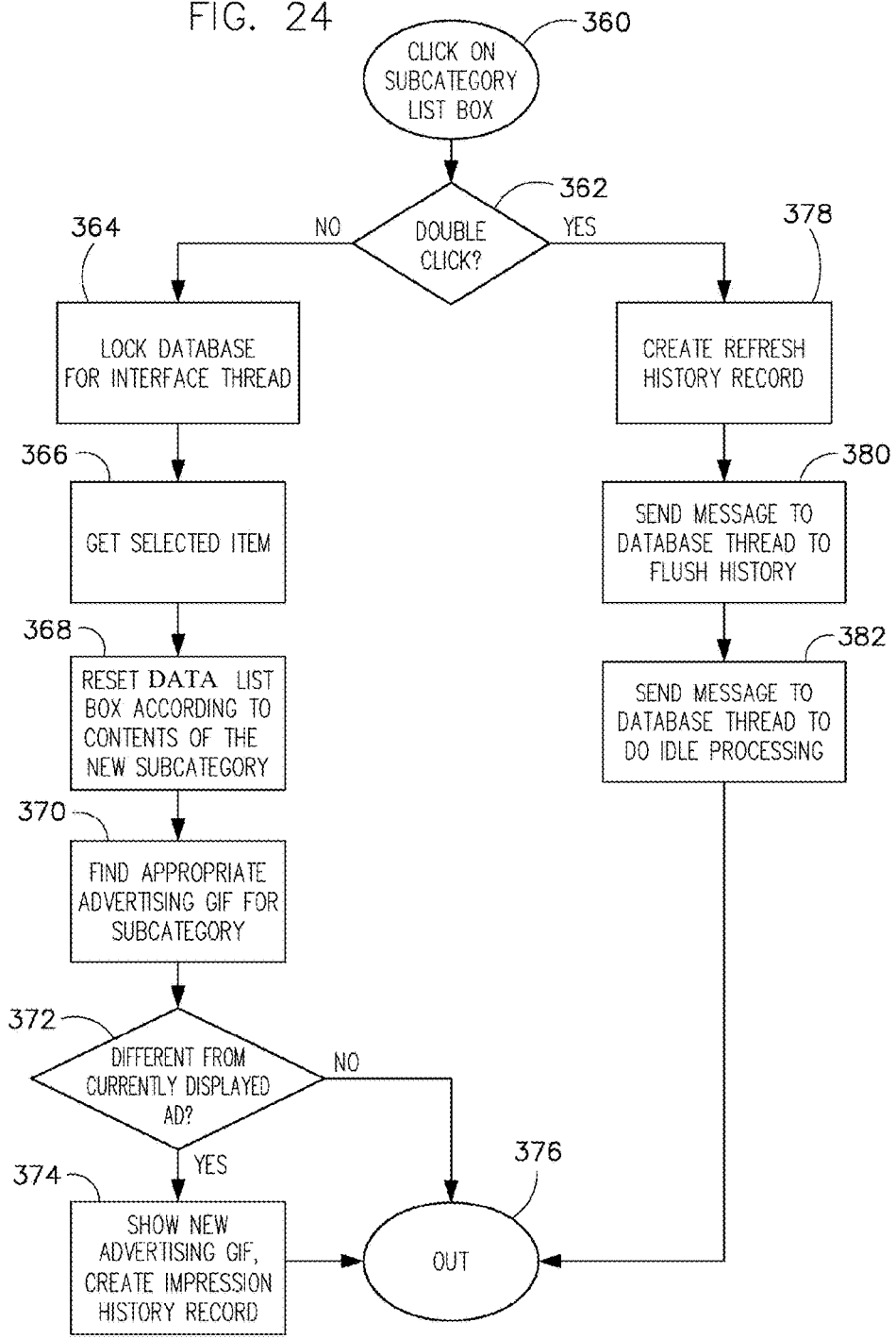

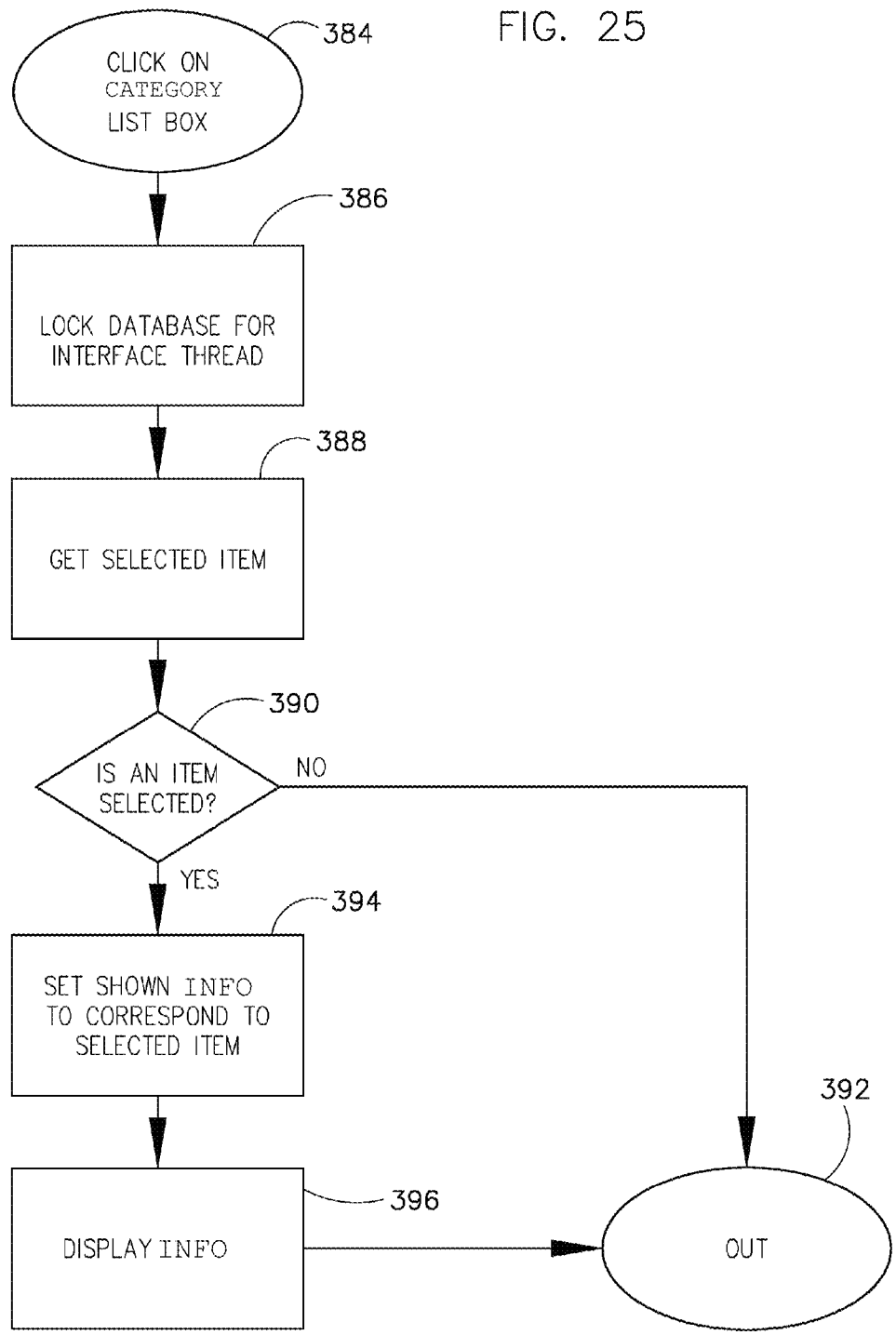

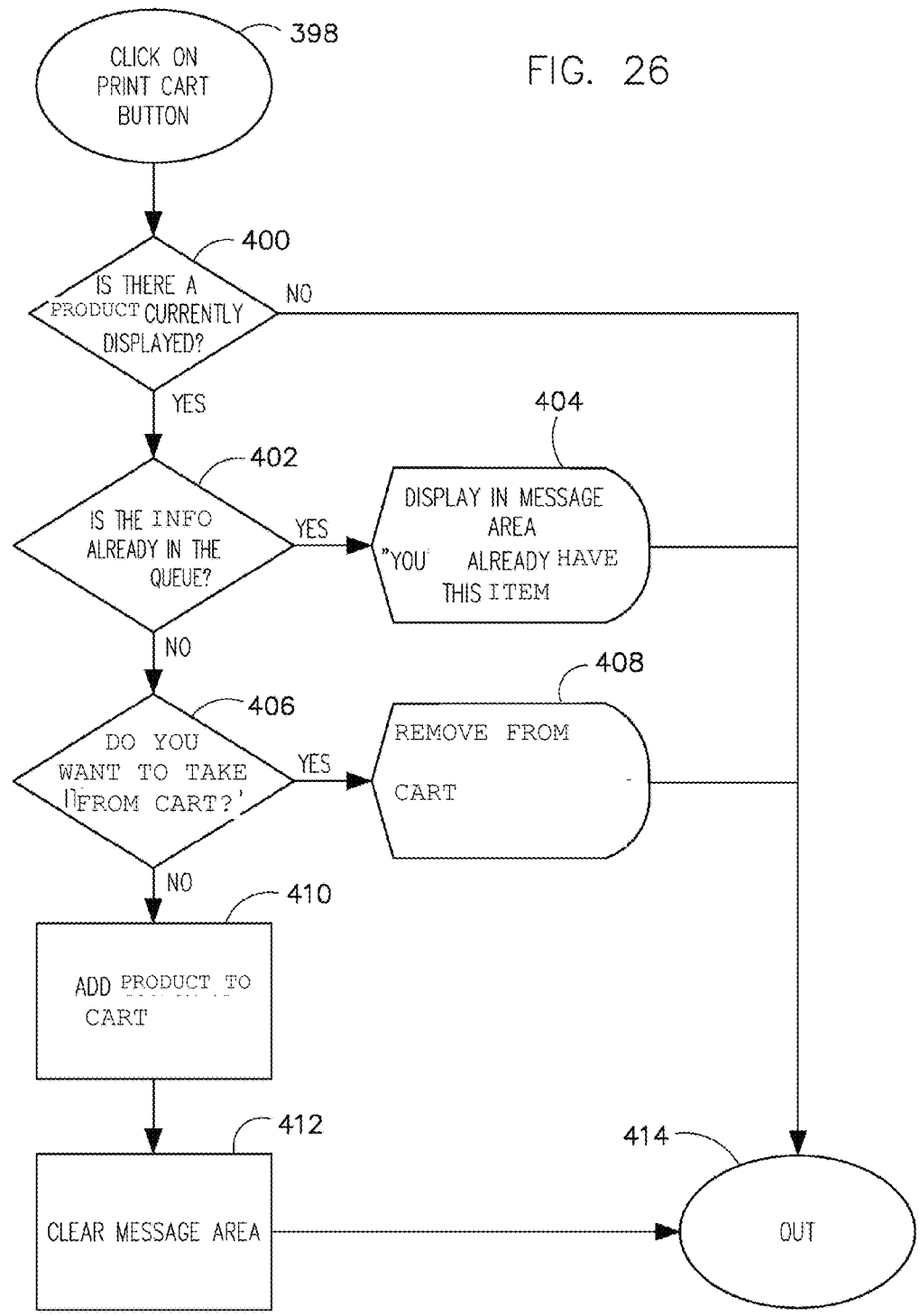

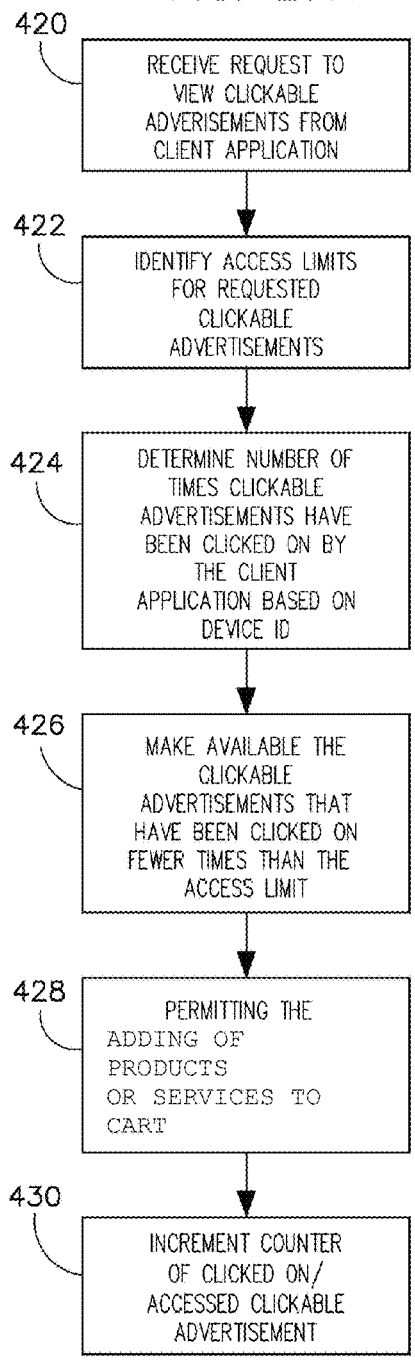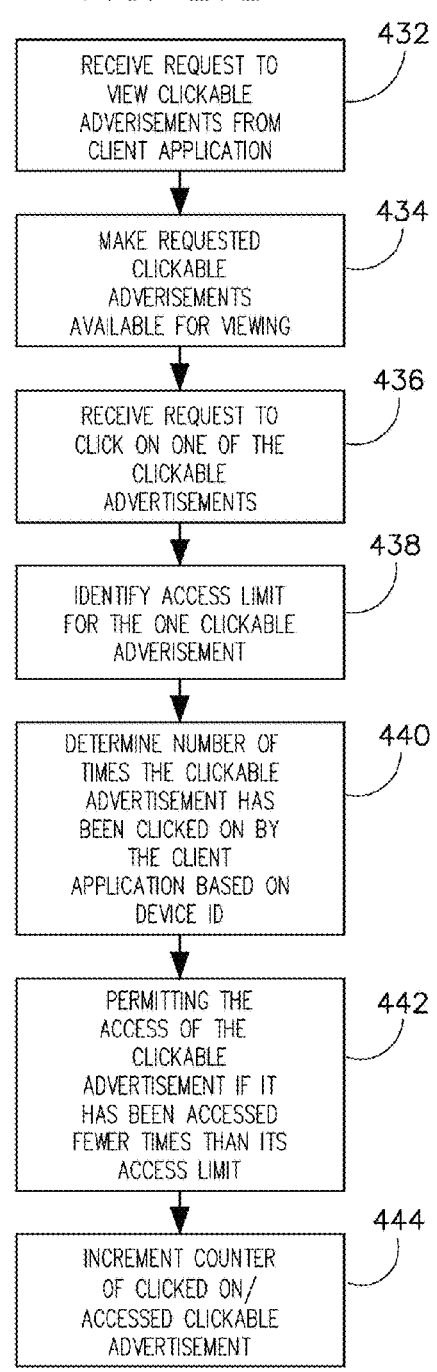

SOCIAL EARTH MOBILE

COUPONS, PRODUCTS & SERVICES WITH:

ADVERTIZING
AUCTIONS
COMMERCE
ENTERTAINMENT
GAMING
HEALTHCARE
BANKING
MEDIA
MICROLOANS
MORTGAGES
NETWORKING
ONLINE DATING
VIRTUAL
COMMUNITIES

A portion of the sale proceeds to microloans or microcredit, humanitarian aid, or sustainable gifts, and support other worldly causes through charitable donations.

FIG. 36

MOBILE DEVICE SYSTEM AND METHOD PROVIDING COMBINED DELIVERY SYSTEM USING 3D GEO-TARGET LOCATION-BASED MOBILE COMMERCE SEARCHING/PURCHASES, DISCOUNTS/COUPONS PRODUCTS, GOODS, AND SERVICES, OR SERVICE PROVIDERS-GEOMAPPING-COMPANY/LOCAL AND SOCIALLY-CONSCIOUS INFORMATION/SOCIAL NETWORKING ("PS-GM-C/LANDSC/I-SN")

PRIORITY

This application is a continuation in part of, and claims priority to, U.S. application Ser. No. 13/233,352, filed 15 Sep. 2011, which is entirely incorporated herein by reference.

FIELD OF THE INVENTION

The present invention provides in one aspect a mobile device delivery system for alternative computer based systems and methods for combined delivery system that will allow shoppers to search and pay for their purchases, redeem coupons and earn reward points via the web or a mobile device or portable device (e.g. mobile device, telephone, smart phone, PDA, laptop computer, Android, iOS devices, iPhone, 3G, 3GS, iPhone 4, iPad, iPod Touch, etc.) and engage in geo-target location-based social networking integration & mobile services for mobile social networking application that includes mobile advertisements, mobile text, mobile SMS marketing, mobile search, mobile multimedia, mobile operating system, mobile device, mobile payments, mobile wallet, mobile express checkout, mobile money transfer, mobile social media widgets, mobile keywords, mobile coupons, mobile instant messaging marketing, mobile voting, mobile eCards, mobile short codes, mobile commerce, mobile shopping, mobile push content, geo-mobile and geo-social (collectively referred to as "Mobile Services" as any product or service or subgroup thereof) in connection with server and/or cloud based internet with access to coupons, mobile services, products & services, clickable advertisements & mobile advertisements by geo-target location, daily coupons & free or discounted printable coupons, products & services, clickable advertisements & mobile advertisements by geo-target location from merchants, business owners, B2B business directory, retailers and major brands around the world, (collectively referred to as "Coupons" as any product or service or subgroup thereof), products, services, e-commerce, media and entertainment, sports, personal & financial network, real estate, service providers, and business owners e.g. for business services, healthcare services, specialty financial services, consumer products, specialty retail and media and entertainment, lenders, mortgage companies, social networking, online dating, gaming, retail stores, virtual communities and virtual goods, microloans or microcredit, humanitarian aid and support other worldly causes through charitable donations or sustainable gifts in combination with geospatial website for a multidimensional representation of information and/or scalable versions of web content that comprises social networking and/or socially conscious information and/or activities, on a three dimensional geospatial platform using multi-dimensional and scalable geospatial mapping, web mapping, mobile mapping & layers of geographic information associated with entities providing and/or members of the service and/or social networking.

BACKGROUND

Time and resources are wasted in the marketing of online products and services. Consumers waste time shopping in person or attempting to search for coupons, mobile services, products & services, clickable advertisements & mobile advertisements by geo-target location online where they lack control or create suitable preferences for access to the search results. One approach taken in response to these and other shortcomings involves providing mobile services to purchase coupons, mobile services, products & services over the Internet, e.g., a system for shopping online over public computer networks such as the Internet. However, users and members of such systems stem usually must be registered, wherein registration and/or subscription by the user can provide information sufficient to identify the user, such as the users and members name, address, Internet e-mail address, and/or an identification number, using an Internet server and a user display terminal in communication therewith. There are, however, numerous shortcomings to such a system. Group buying sites leverage the power of collective bargaining, providing local product or services deals that offer savings for consumers while delivering improved sales numbers to participating merchants.

In standard GM and/or GIS systems, geographically-referenced information is maintained confidential and protected datastores by the creators and/or collectors of such data. Access to information in the datastores is controlled and provided directly by the creator and/or owner. Without knowledge of the source and/or location of particular geographically-referenced information and a password and/or certificate to access the information, the information is inaccessible. Integration of geographically-referenced information to provide an integrated interface and/or view of the information in context with a geographic map is usually performed at a user's computer using sophisticated GM and/or GIS software.

Alternatively, a user can interface with a server device managed by the creator through a client device running specialized software applications to interact with the GM and/or GIS databases of the data creators. At present access to data in a public forum is generally restricted by standard network security measures such as digest authentication and certificates. However, there are problems and shortcomings with online mobile services, to purchase coupons, mobile services, products & services, clickable advertisements & mobile advertisements by geo-target location which should also provide socially conscious information about the companies that supply the online coupons, mobile services, products & services, clickable advertisements & mobile advertisements by geo-target location so that consumers can see where the companies and/or stores are located and can find out information about the companies, communities they are located in, what interaction and help they provide to communities and/or other economic and/or socially responsible activities, and to associate the geographical and other geospatially available information connecting also by the use of integrated social media, which combination is not current provided and/or available.

The first coupon issued by Coca-Cola in 1888. Since then, the coupon industry has come to the fore front in the last few years with the activity of Groupon™, Livingsocial™ and Coupons.com™. An estimated 332 billion coupons (valued at $485 billion) were distributed via all mediums in 2010 growing seven percent over 2009. Data shows that users of printable coupons have higher household incomes, have larger households, are better educated, shop more frequently and spend more each month on groceries. Coupons.com™ is a leader in printable coupons, including online printable, social, mobile and loyalty card promotions. Coupons.com™ is the driving force in transforming the multi-billion dollar coupon industry and ushering it into the printable world. For brand marketers, Coupons.com distributes printable coupons to millions of consumers through their website and thousands of websites comprising the Coupons.com™ printable coupon network. Online coupon programs are simple to use. They offer listings of coupons for any variety of products. Users can sign up and sign into view them. When a user fins ones they are interested in, they simply click on them and add them to their shopping cart. When they are finished shopping for coupons, they can either print them out with a computer or sent to their phone. The best coupon sites are sought after savvy shoppers worldwide who are looking to find online deals from around the world, leading restaurants, toy and entertainment companies as well for all of their shopping needs.

The mobile coupon industry is expected to reach $46 billion globally by 2016, a large jump form the $5.6 billion projected for the industry in 2011. Google Offers, a feature of the NFC-based Google Wallet mobile system, will be one catalyst for the growth. A mobile coupon is an electronic ticket solicited and/or delivered by mobile phone that can be exchanged for a financial discount or rebate when purchasing a product or service. Customarily coupons are issued by manufacturers of consumer-packaged goods or by retailers, to be used in retail stores as a part of sales promotions. They can also be used to attract consumers to entertainment attractions (amusement parks, zoos, museums, etc.) and services (beauty shops, spas, etc.). They are often distributed through SMS, MMS, Bluetooth and other mobile means. The customer redeems the coupon at a store or online. In some cases, the retailer could forward it to a clearinghouse or directly to the issuers, for reimbursement. Redeeming online coupons usually involves printing out a barcode, but coupons sent to mobile phones could potentially be much more convenient. Delivery is almost instantaneous and requires no paper or physical transportation costs. That means it's easier to respond quickly to mobile ads. Mobile coupons are low cost, instant delivery, trackable and envi-ronmentally friendly. Mobile coupons provide another channel for connecting people who grew up on the Internet and with mobile devices.

SUMMARY OF THE INVENTION

The present invention provides in one aspect a delivery system for a geospatial website for a multidimensional representation of information and/or scalable versions of web and mobile device or portable device (e.g. mobile device, telephone, smart phone, PDA, laptop computer, Android, iOS devices, iPhone, 3G, 3GS, iPhone, iPad, iPad Touch, etc.) content for an infrastructure and global platform that provides users and members and businesses of all types and sizes with access to broad markets for the delivery system that will allow shoppers to search and pay for their purchases, redeem coupons and earn reward points via a mobile device and allows users to engage in geo-target location-based social networking integration & mobile services, mobile payment, mobile wallet, mobile express checkout, mobile money transfer, mobile social media widgets, mobile keywords, mobile coupons, mobile instant messaging marketing, mobile voting, mobile eCards, mobile short codes, mobile commerce, mobile shopping, mobile push content, geo-mobile and geo-social (collectively referred to as "Mobile Services" as any product, service, or service provider or subgroup thereof) in connection with server and/or cloud based internet with access to advertisements, daily deal coupons and free or discounted printable coupons, products & services, clickable advertisements & mobile advertisements by geo-target location from merchants, business owners, B2B business directory, retailers and major brands around the world (collectively referred to as "Coupons" as any product, service, or service provider or subgroup thereof), microloans or microcredit, humanitarian aid and support other worldly causes through charitable donations or sustainable gifts in combination with geospatial website for a multidimensional representation of information and/or scalable versions of web content that comprises social networking and/or socially conscious information and/or activities, on a three dimensional geospatial platform using multi-dimensional and scalable geospatial mapping, web mapping, mobile mapping & layers of geographic information associated with entities providing and/or members of the service and/or social networking, coupons, mobile services, products & services, clickable advertisements & mobile advertisements by geo-target location, online auctions, products, services, e-commerce, media and entertainment, sports, personal & financial network, real estate, service providers, social networking, online dating, gaming, retail stores, virtual communities and virtual goods, microloans or microcredit, humanitarian aid and support other worldly causes through charitable donations or sustainable gifts for those in need (collectively referred to as "Products & Services" as any product, service, or service provider or subgroup thereof) through combined search and pay for coupons, mobile services, products & services, clickable advertisements & mobile advertisements by geo-target location with Geospatial Mapping/Web Mapping/Mobile Mapping/Company-Local & Socially Conscious Information/Location-Based Social Networking Integration & Mobile Services ("PS-GM-C/L&SC/I-SN") on a three dimensional geospatial platform using geospatial mapping, web mapping, mobile mapping & layers geographic information technology. One example of an aspect of the invention is a geospatial website that aggregates, inter alia clickable advertisements & mobile advertisements by geo-target location, and allows users to engage in geo-target location-based social networking integration & mobile services, search for coupons, mobile services, products & services, clickable advertisements & mobile advertisements by geo-target location from around the world and/or showcases them in their actual, physical location on the websites live view of a virtual Earth in combination with social networking and/or socially conscious information and/or activities.

The present invention provides in one aspect a system and method providing combined delivery system using 3d geo-target location-based online commerce searching/purchases, discounts/coupons and charity/humanitarian aid/loans for product service-geomapping-company/local and socially-conscious information/social networking ("ps-gm-c/l&sc/i-sn"), for users and/or shoppers using one or more function-alities to search and/or pay for one or more purchases, redeem coupons and/or earn reward points via the web using computer based access or mobile device or portable device access, and/or to engage in geo-target location-based social networking integration & mobile services for a mobile social networking application that can include one or more of mobile advertisements, mobile text, mobile sms marketing, mobile search, mobile multimedia, mobile operating systems, mobile devices, mobile banking, mobile payments, mobile wallets and/or electronic payments, mobile express checkout, mobile money transfers, mobile social media widgets, mobile keywords, mobile coupons, mobile instant messaging marketing, mobile voting, mobile ecards, mobile short codes, mobile commerce, mobile shopping, mobile push content, geo-mobile and geo-social in connection with server and/or cloud based internet with access to coupons, mobile services, products & services, clickable advertisements & mobile advertisements by geo-target location, daily deal coupons & free or discounted printable coupons, products & services from merchants, business owners, business to business, business directories, retailers and brands around the world, online auctions, e-commerce, media and entertainment, sports, personal & financial network, real estate, service providers, social networking, online dating, gaming, retail stores, virtual communities and virtual goods, microloans or microcredit, humanitarian aid and support other worldly causes through charitable donations or sustainable gifts on a three dimensional geospatial platform using geospatial mapping, web mapping, mobile mapping & layers.

The present invention provides in one aspect a delivery system for alternative computer based systems and methods for combined delivery system that will allow shoppers to search and pay for their purchases, redeem coupons and earn reward points via the web or a mobile device or portable device (e.g. mobile device, telephone, smart phone, PDA, laptop computer, Android, iOS devices, iPhone, 3G, 3GS, iPhone 4, iPad, iPod Touch, etc.) and engage in geo-target location-based social networking integration & mobile services for mobile social networking application that includes mobile advertisements, mobile text, mobile SMS marketing, mobile search, mobile multimedia, mobile operating system, mobile device, mobile payments, mobile wallet, mobile express checkout, mobile money transfer, mobile social media widgets, mobile keywords, mobile coupons, mobile instant messaging marketing, mobile voting, mobile eCards, mobile short codes, mobile commerce, mobile shopping, mobile The present invention provides a unique online shopping experience that will allow a community of savvy Social Shoppers to shop online for great bargains while at the same time helping those in need around the world. The Company plans on offering social networking integration with great bargains, daily search and pay for coupons, mobile services, products & services from around the world. In addition, the Company plans on taking a portion of its gross revenues to provide microloans or microcredit, humanitarian aid and support other worldly causes through charitable donations or sustainable gifts The present invention addresses problems and/or shortcomings of prior mobile services to purchase online coupons, mobile services, products & services, which should also provide socially conscious information about the companies that supply the online products and services so that consumers can see where the companies and/or stores are located and can find out information about the companies, communities they are located in, what interaction and help they provide to communities and/or other economic and/or socially responsible activities, and to associate the geographical and other geospatially available information connecting also by the use of integrated social media, which combination is not current provided and/or available.

As users and members and/or subscribers of the website, (e.g., "Social Shoppers") use Social Earth™ and Mobile Services to shop the world for coupons, mobile services, products & services, clickable advertisements & mobile advertisements by geo-target location, search and pay for coupons, mobile services, products & services, clickable advertisements & mobile advertisements by geo-target location e.g., but not limited to, any product or service, e.g., coupons, mobile services, products & services, clickable advertisements & mobile advertisements by geo-target location, daily deal coupons and free or discounted printable coupons, products & services, clickable advertisements & mobile advertisements by geo-target location from merchants, business owners, B2B business directory, retailers and major brands around the world, microloans or microcredit, humanitarian aid and support other worldly causes through charitable donations or sustainable gifts. In addition, users and members of the website will be able to view, including but not limited to, residential and commercial real estate listings, loans and quotes, auto loans, mortgages, banking services, and/or any other product or service, e.g., family fun, spoils, restaurants, events and/or hundreds of top consumer packaged goods brand/ors for, e.g., but not limited to, groceries, apparel, beauty products, beverages, books & magazines, foods, health care, household, office, personal care, pet care, photography, skincare & cosmetics and/or the like. Such users and members and/or subscribers (e.g., "Social Shoppers") can find great deals, product or services from leading restaurant, toy and/or entertainment companies and/or top retailers around the world.

A delivery system for a host geospatial website can provide for a multidimensional representation of information and/or scalable version of web content for the delivery of coupons, mobile services, products & services, clickable advertisements & mobile advertisements by geo-target location, social networking integration & mobile services, search and pay for coupons, mobile services, products & services, clickable advertisements & mobile advertisements by geo-target location on a three dimensional geospatial platform using geospatial mapping, web mapping, mobile mapping & layers geographic information technology. A host geospatial website can include realistic virtual landscape using satellite and/or aerial photography that can include many content layers of web based information, online auctions, e-commerce or m-commerce links, social networking and/or coupons, mobile services, products & services, clickable advertisements & mobile advertisements by geo-target location, search and pay for coupons, mobile services, products & services, clickable advertisements & mobile advertisements by geo-target location for a richer user experience. A host website shall store images, web-based content, social data and/or share live social feeds from social networks and/or other communications in real-time. Connecting with users and members known as "Social Shoppers" in real-time on a geographical area across multiple social layers that are displayed as graphic animated color overlays on a three dimensional geospatial platform using geospatial mapping, web mapping, mobile mapping & layers geographic information technology." The invention can also provide mobile payment method and/or system for effectuating an online payment through a mobile device or portable device (e.g. mobile device, telephone, smart phone, PDA, laptop computer, Android, iOS devices, iPhone, 3G, 3GS, iPhone, iPad, iPad Touch, etc.) to complete an online auctions, e-commerce or m-commerce transaction on a three dimensional geospatial platform using geospatial mapping web mapping, mobile mapping & layers geographic information technology. The present invention can also provide user-friendly desktop interfaces and mobile apps for smart phones and other communication devices that will allow Social Shoppers to enjoy a unique experience utilizing social networking integration & mobile services, search and pay for coupons, mobile services, products & services, clickable advertisements & mobile advertisements by geo-target location, as they virtually tour around the globe using the present invention.

Users and members of the present invention can do one or more of the following: Use the present invention after installing Google Earth or similar plug-ins; Search and pay for coupons, mobile services, products & services, clickable advertisements & mobile advertisements by geo-target location from around the world by geo-target location or anywhere in the world on the present inventions unique "live view" of the planet; optionally view and receive coupons, mobile services, products & services, clickable advertisements & mobile advertisements by geo-target location from around the world via the web, email or mobile device or portable device (e.g. mobile device, telephone, smart phone, PDA, laptop computer, Android, iOS devices, iPhone, 3G, 3GS, iPhone, iPad, iPad Touch, etc.) based upon geo-target location; View "live social feeds" from social networking sites such as Facebook™ and Twitter™; Connect with your friends on Skype™; Zoom to birds-eye and human scale view and navigate around stunning 3D satellite images of the virtual Earth; and/or Watch videos from RSS links. The present invention provides a unique interactive user experience, view live links to places and events knowing that a small portion of the dollars spent on the present invention are going to help those in impoverished conditions around the world.

The invention can further provide in one aspect geospatial website aggregates coupons, mobile services, products & services, clickable advertisements & mobile advertisements by geo-target location, and allows users to engage in geo-target location-based social networking integration & mobile services, search and pay for coupons, mobile services, products & services, clickable advertisements & mobile advertisements by geo-target location from around the world and/or showcases them in their actual, physical location on the websites unique live view of a virtual Earth. As users and members and/or subscribers shop the world for coupons, mobile services, products & services, clickable advertisements & mobile advertisements by geo-target location, as well as bargains, they can view coupons, mobile services, products & services, clickable advertisements & mobile advertisements by geo-target location for residential and commercial real estate listings, loans and quotes, auto loans, mortgages, banking services, and/or any other product or service, e.g., family fun, sports, restaurants, events and/or hundreds of top consumer products & services, e.g., but not limited to, groceries, apparel, beverages, books & magazines, foods, health care, household, office, personal care, pet care, photography, residential and commercial real estate listings, loans and quotes, auto loans, mortgages, banking services, autos, beauty products, business, classic car parts, restoration and maintenance services, collectibles & art, custom car parts, restoration and maintenance services, deals & gifts education, electronics, fashion, financial, healthcare, home, outdoor & décor, hospitality, insurance, online services, other legal, marketing, medical facilities, medical insurance, medical retailers, motors, pets, physicians, dentists, other practitioners, public services, psychics, intuitive, metaphysical, mediums & spiritual advisors, real estate, skincare & cosmetics, sports, travel, tourism, wedding, parties & entertainment, online dating and/or any other products & services. Social Shoppers can to find great product or services deals from leading restaurant, toy and/or entertainment companies and/or top retailers around the world. Social Shoppers can to use "a mobile device payment method and/or system for effectuating an online payment through a mobile device equipped carrier and/or a mobile device equipped bank using a mobile users device in connection with searching and paying for coupons, mobile services, products & services, Products & services, clickable advertisements & mobile advertisements by geo-target location or other online auctions, e-commerce or m-commerce transactions on the host geospatial website (e.g. mobile device, telephone, smart phone, PDA, laptop computer, Android, iOS devices, iPhone, 3G, 3GS, iPhone, iPad, iPad Touch, etc.); wherein users and members create and/or maintain a rich-media application via a geospatial mapping, web mapping, mobile mapping & layers geographic information platform via the Internet comprising: mobile banking, mobile payment, mobile wallet and/or electronic payments. Mobile payments are redefining commerce. Wider availability of mobile technology makes it easier to complete all types of transactions related to sending and receiving funds, the entire credit card and banking industry will change from top to bottom as the next wave of mobile technology attract more mobile users. The mobile or digital wallet will handle multiple cards and payment options through any financial networks. This invention and delivery system will allow Social Shoppers to pay for their purchases, redeem coupons and earn reward points through the web or a mobile device.

The delivery system for a host geospatial website can provide for a multidimensional representation of information and/or sealable version of web content for an infrastructure and global platform that provides users and members and businesses of all types and sizes with access to broad markets for the delivery of coupons, mobile services, products & services, clickable advertisements & mobile advertisements, mobile services, products & services, clickable advertisements & mobile advertisements by geo-target location, search and pay for coupons, mobile services, products & services, clickable advertisements & mobile advertisements by geo-target location on a three dimensional geospatial platform using geospatial mapping, web mapping, mobile mapping & layers geographic information technology. A host geospatial website can include realistic virtual landscape using satellite and/or aerial photography that can include many content layers of web based information, online auctions, e-commerce or m-commerce and mobile banking, mobile payment, mobile wallet and/or electronic payments, coupons, mobile services, products & services, clickable advertisements & mobile advertisements by geo-target location and live interaction with users for a richer user experience. A host geospatial website shall store images, web-based content, social data and/or share live social feeds from social networks and/or other communications in real-time. The use of geospatial mapping, web mapping, mobile mapping & layers geographic information for associating information to specific places can include, but is not limited to, one or more of: Live links to places and events; Data on the landscape; Zoom to birds-eye and human scale views; 3D custom audio/visual content; Interactive 360 panoramas; Fly-through tours with content, narration, music; Stunning imagery and videos; 3D buildings and landscaping online auctions, e-commerce or m-commerce and mobile banking, mobile payment, mobile wallet and/or electronic payments, tools and hooks; Clickable advertisements & mobile advertisements on the 3D landscape; Advanced search for private and public information; Social networking integration; Providing a social networking platform and allows users to engage in geo-target location-based social networking integration & mobile services and a means for users and members to interact i.e. search for user profiles, social links, share interests and/or activities, entertainment, events and interests, emailing, instant messaging, 'live" talk on Skype™, self service GIS and delivery of spatial data & information and uploading user generated content, and allows users to engage in geo-target location-planning or social-mapping (users are able to search and browse nearby stores, restaurants, etc.), games, groups, etc. for members; Self-posting for uploading user generated content; Custom tools, apps and widgets; and the like.

Connecting coupons, mobile services, products & services, clickable advertisements & mobile advertisements by geo-target location, and allows users to engage in geo-target location-based social networking integration & mobile services, search and pay for coupons, mobile services, products & services, clickable advertisements & mobile advertisements by geo-target location with users and members known as "Social Shoppers" in real-time on a geographical area across multiple social layers that are displayed as graphic animated color overlays on a three dimensional geospatial platform using geospatial mapping, web mapping, mobile mapping & layers geographic information technology. More specifically, it relates to a method for users and members known as "Social Shoppers" that will allow shoppers to search and pay for their purchases, redeem coupons and earn reward points via a mobile device and to effectuate banking and/or electronic payments; accessing a user account, engaging in mobile social activities and/or viewing available options via a three dimensional geospatial mapping platform using geospatial mapping, web mapping, mobile mapping & layers geographic information technology." The present invention provides one or more of the following advantages over online products & services, email, daily deal, coupons and social networking sites by one or more of: Combining the community of social networking and connecting buyers and sellers with the fun of collective buying, currently the fastest growing business model on the Web; A small portion of each "coupon," "mobile services," or "products & services" that are sold on its website of the present invention to provide microloans or microcredit, humanitarian aid or support other worldly cause through charitable donations or sustainable gifts; Gathering clickable advertisements & mobile advertisements by geo-target location, Search and pay for coupons, mobile services, products & services, clickable advertisements & mobile advertisements by geo-target location, as well as bargains from all over the world into one fun online 3D shopping experience; Shoppers can search for coupons, mobile services, products & services, clickable advertisements & mobile advertisements by geo-target location, and allows users to engage in geo-target location-based social networking integration & mobile services, Search and pay for coupons, mobile services, products & services, Products & services, clickable advertisements & mobile advertisements by geo-target location from around the world by geo-target locations in each market: Easy-to-scale usability and social networking component, Social Earth™. will spread virally and expand rapidly into different regions; Allowing Social Shoppers to engage in social networking activates and mobile social networking activities and share the latest coupons, mobile services, products & services, clickable advertisements & mobile advertisements by geo-target location with their friends in other popular social networks such as Facebook™ and Twitter™ will create "stickiness" and bring them back to the site again and again; Giving Social Shoppers a fun, hip interactive experience on a live view of a virtual Earth with colorful satellite imagery, aerial photography and graphic animated color overlays; and/or Having a unique interactive user experience, view live links to places and events.

Social Networking Integration:

The present invention can also provide in certain embodiments integrated "live social feeds" from social networking sites, e.g., but not limited to Facebook™, Twitter™ and Skype™, into its website(s), which allows Social Shoppers to interact and share the latest coupons, mobile services, products & services, clickable advertisements & mobile advertisements by geo-target location and deals with their friends, family, business associates, and others. Tapping into social networking users through social networking integration will help users of the present invention connect with thousands or millions of users. Twitter™ the latest social networking phenomenon enables its users to send and read other users' messages called "tweets." The present invention provides opportunities to use open source technology to rapidly grow its Social Shoppers around the world by utilizing social networking integration with "live social feeds" from these popular social networking sites into its website and giving its Social Shoppers the ability to talk with their friends via Skype™ will encourage Social Shoppers to share the latest coupons, mobile services, products & services clickable advertisements & mobile advertisements by geo-target location, search and pay for coupons, mobile services, products & services, clickable advertisements & mobile advertisements by geo-target location and deals with their friends.

BRIEF DESCRIPTION OF THE DRAWINGS

FIG. 1 is a diagrammatic and block diagram view of an electronic coupons, mobile services, products & services, clickable advertisements & mobile advertisements by geo-target location with /Geospatial Mapping/Web Mapping/Mobile Mapping/Company-Local & Socially Conscious Information//Location-Based Social Networking Integration & Mobile Services ("PS-GM-C/L&SC/I-SN") information and/or product/service distribution system, according to an exemplary embodiment;

FIG. 2 is a simplified block diagram showing, in greater detail, a database server portion of the main server system shown in FIG. 1;

FIGS. 3A-3B illustrate a screen display defining an interface associated with a client system portion, according to an exemplary embodiment;

FIG. 4 is a simplified flowchart diagram view illustrating interactions between the client system, and the main server system, according to an exemplary embodiment;

FIGS. 19-20 are simplified flowchart diagram views showing alternate responses taken by client system 14 in response to double-clicking taskbar icon 102, according to an exemplary embodiment;

FIGS. 22-23 are simplified flowchart diagram views showing alternate actions taken by the client system in response to selection by the user of a logo pane and an advertising pane, respectively, according to exemplary embodiments;

FIG. 24 is a simplified flowchart diagram view showing the steps executed by the client system when a user selects an item from PS-GM-C/L&SC/I-SN information and/or data subcategory list, according to an exemplary embodiment;

FIG. 25 is a simplified flowchart diagram view showing the steps executed by the client system when the user selects a particular PS-GM-C/L&SC/I-SN product and/or service, according to an exemplary embodiment;

FIG. 26 is a simplified flowchart diagram view showing the steps executed by the client system when PS-GM-C/L&SC/I-SN product and/or service is selected and added to a cart, according to an exemplary embodiment;

FIGS. 27A and 27B are flow diagrams of processes for controlling the number of clicks to a clickable advertisement, according to exemplary embodiments;

FIG. 36 presents a flow chart showing a typical transaction for the purchase a coupon, mobile services, product & services, clickable advertisements & mobile advertisements by geo-target location that provides a portion of the sale proceeds to microloans or microcredit, humanitarian aid and support other worldly causes through charitable donations or sustainable gifts. "Search for coupons, mobile services, products & services, clickable advertisements & mobile advertisements by geo-target location, retail stores, virtual communities and virtual goods, microloans or microcredit, humanitarian aid and support other worldly causes through charitable donations or sustainable gifts on the present inventions unique "live view" of the planet."

DETAILED DESCRIPTION OF EXEMPLARY EMBODIMENTS

Figure 5:
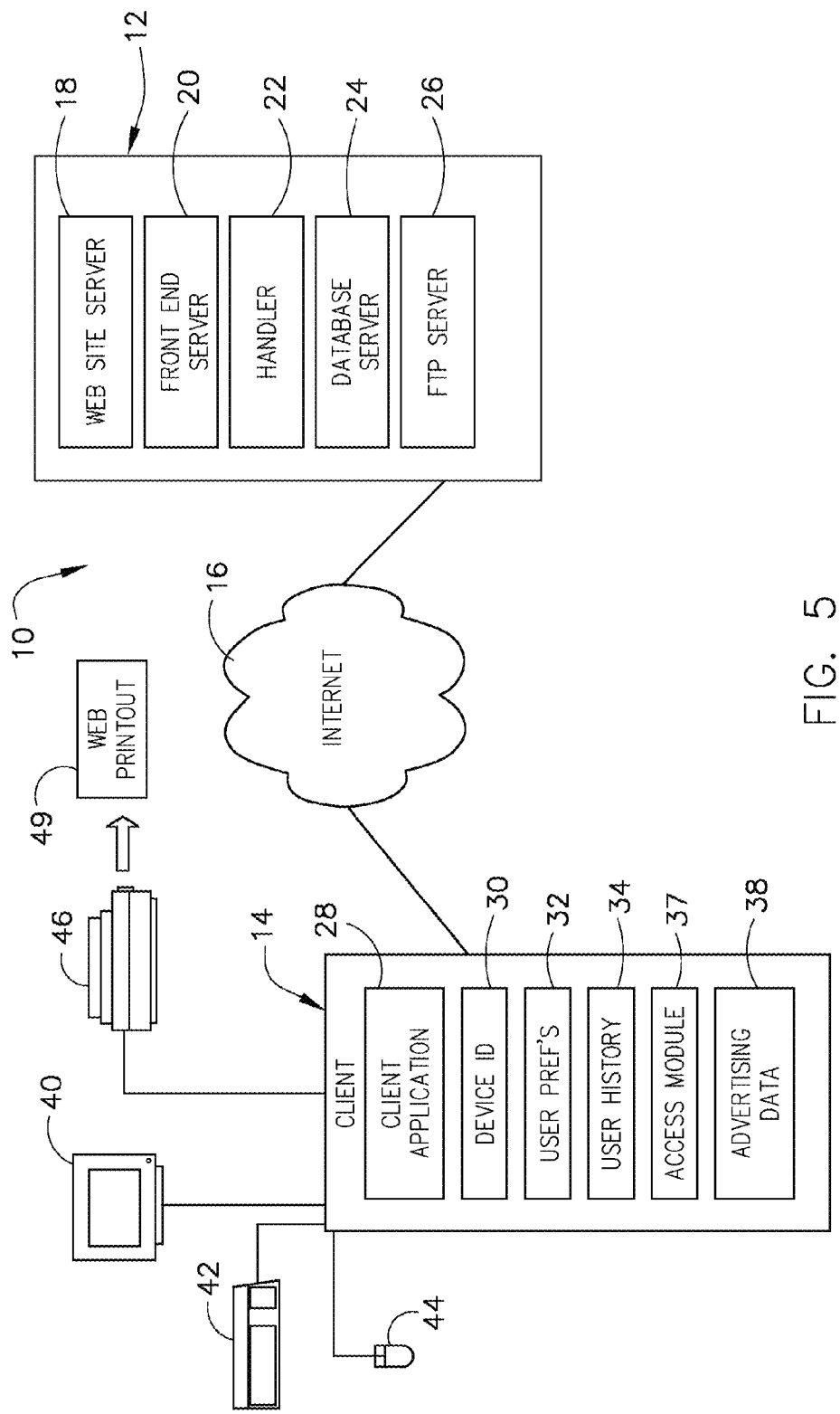
FIG. 5 is a diagrammatic and block diagram view of a system for controlling the number of clicks to a clickable advertisement, according to an exemplary embodiment.

The present invention provides in one aspect a delivery system for alternative computer based systems and methods for combined delivery system that will allow shoppers to search and pay for their purchases, redeem coupons and earn reward points via the web or a mobile device or portable device (e.g. mobile device, telephone, smart phone, PDA, laptop computer, Android, iOS devices, iPhone, 3G, 3GS, iPhone 4, iPad, iPod Touch, etc.) and engage in geo-target location-based social networking integration & mobile services for mobile social networking application that includes mobile advertisements, mobile text, mobile SMS marketing, mobile search, mobile multimedia, mobile operating system, mobile device, mobile payments, mobile wallet, mobile express checkout, mobile money transfer, mobile social media widgets, mobile keywords, mobile coupons, mobile instant messaging marketing, mobile voting, mobile eCards, mobile short codes, mobile commerce, mobile shopping, mobile push content, geo-mobile and geo-social (collectively referred to as "Mobile Services" as any product, service, or service provider or subgroup thereof) in connection with server and/or cloud based internet with access to coupons, mobile services, products & services, clickable advertisements & mobile advertisements by geo-target location, daily coupons & free or discounted printable coupons, products & services, clickable advertisements & mobile advertisements by geo-target location from merchants, business owners, B2B business directory, retailers and major brands around the world, (collectively referred to as "Coupons" as any product, service, or service provider or subgroup thereof), microloans or microcredit, humanitarian aid and support other worldly causes through charitable donations or sustainable gifts (collectively referred to as "Products & services" as any product, service, or service provider or subgroup thereof), in combination with geospatial website for a multidimensional representation of information and/or scalable versions of web content that comprises social networking and/or socially conscious information and/or activities, on a three dimensional geospatial platform using multi-dimensional and scalable geospatial mapping, web mapping, mobile mapping & layers of geographic information associated with entities providing and/or members of the service and/or social networking.

The present invention is intended for a mobile device or portable device (e.g. mobile device, telephone, smart phone, PDA, laptop computer, Android, iOS devices, iPhone, 3G, 3GS, iPhone, iPad, iPad Touch, etc.) that will allow shoppers to search and pay for their purchases, redeem coupons and earn reward points via the web or mobile device or portable device by geo-target location on a three dimensional geospatial platform using geospatial mapping, web mapping, mobile mapping & layers geographic information technology The present invention is intended for mobile social networking application by geo-target location on a three dimensional geospatial platform using geospatial mapping, web mapping, mobile mapping & layers geographic information technology.

The present invention uses virtual GPS for devices by geo-target location on a three dimensional geospatial platform using geospatial mapping, web mapping, mobile mapping & layers geographic information technology.

The present invention enabled "trusted" anchor devices which are accessible via WiFi or Bluetooth by geo-target location on a three dimensional geospatial platform using geospatial mapping, web mapping, mobile mapping & layers geographic information technology.

The present invention includes membership. Proximity-based alerts are generated per smart phone device as they are discovered by geo-target location on a three dimensional geospatial platform using geospatial mapping, web mapping, mobile mapping & layers geographic information technology.

The present invention includes information that can be sent to members via SMS or email.

The present invention includes group-related info included by geo-target location a calendar of events, data on the landscape, interactive 360 panoramas, and fly-through shopping tours with stunning 3D imagery.

The present invention includes geo-location technology and event networking and socializing by geo-target location on a three dimensional geospatial platform using geospatial mapping, web mapping, mobile mapping & layers geographic information technology.

The present invention provides in one aspect a delivery system for a geospatial website for a multidimensional representation of information and/or scalable versions of web and mobile device or portable device (e.g. mobile device, telephone, smart phone, PDA, laptop computer, Android, iOS devices, iPhone, 3G, 3GS, iPhone, iPad, iPad Touch, etc.) content for the delivery of coupons, mobile services, products & services, clickable advertisements & mobile advertisements, mobile services, products & services, clickable advertisements & mobile advertisements by geo-target location, search and pay for coupons, mobile services, products & services, clickable advertisements & mobile advertisements by geo-target location with/Geospatial Mapping/Web Mapping/Mobile Mapping/Company-Local & Socially Conscious Information/Location-Based Social Networking Integration & Mobile Services ("PS-GM-C/L&SC/I-SN") on a three dimensional geospatial platform using geospatial mapping, web mapping, mobile mapping & layers geographic information technology. One example of an aspect of the invention is a geospatial website that aggregates, inter alia, coupons, mobile services, products & services, clickable advertisements & mobile advertisements by geo-target location, microloans or microcredit, humanitarian aid and support other worldly causes through charitable donations or sustainable gifts, in combination with geospatial website for a multidimensional representation of information and/or scalable versions of web content that comprises social networking and/or socially conscious information and/or social networking activities and mobile social networking activities on a three dimensional geospatial platform using multi-dimensional and scalable geospatial mapping, web mapping, mobile mapping & layers of geographic information associated with entities providing and/or members of the service and/or social networking. coupons, mobile services, products & services, clickable advertisements & mobile advertisements by geo-target location, and allows users to engage in geo-target location-based social networking integration & mobile services, search and pay for coupons, mobile services, products & services, clickable advertisements & mobile advertisements by geo-target location, microloans or microcredit, humanitarian aid and support other worldly causes through charitable donations or sustainable gifts (collectively, "Product or Service" as any product, service, or service provider or subgroup thereof) from around the world and/or showcases them, e.g., in their actual, physical location on Social Earth™ website's live view of a virtual Earth in combination with social networking and/or socially conscious information and/or activities.

The present invention addresses problems and/or shortcomings of current online mobile services to purchase coupons, mobile services, products & services by geo-target location, retail stores, virtual communities and virtual goods, microloans or microcredit, humanitarian aid and support other worldly causes through charitable donations or sustainable gifts, which should also provide socially conscious information about the companies that supply the mobile services to purchase coupons, mobile services, products & services by geo-target location so that consumers can see where the companies and/or stores are located and can find out information about the companies, communities they are located in, what interaction and help they provide to communities and/or other economic and/or socially responsible activities, and to associate the geographical and other geospatially available information connecting also by the use of integrated social media, which combination is not current provided and/or available. As users and members and/or subscribers of the website, (e.g., "Social Shoppers") shop the world for coupons, mobile services, products & services, clickable advertisements & mobile advertisements by geo-target location, e.g., but not limited to coupons, mobile services, products & services, clickable advertisements & mobile advertisements by geo-target location, online auctions, residential and commercial real estate listings, loans and quotes, auto loans, mortgages, banking services, and/or any other product or service, e.g., but not limited to, family fun, spoils, restaurants, events and/or hundreds of top consumer packaged goods brand/ors for, e.g., but not limited to, groceries, apparel, beauty products, beverages, books & magazines, foods, health care, household, office, personal care, pet care, photography, skincare & cosmetics, daily deal coupons & free or discounted or discounted printable coupons, products & services, clickable advertisements & mobile advertisements by geo-target location from merchants, business owners, B2B business directory, retailers and major brands around the world, online auctions, e-commerce or m-commerce, media and entertainment, sports, personal & financial network of real estate professionals, service providers and business owners, B2B business directory, social networking, online dating, gaming, retail stores, virtual communities and virtual goods and the like, including residential and commercial real estate listings, loans and quotes, auto loans, mortgages, banking services, and/or any other product or service, e.g., family fun, sports, restaurants, events and/or hundreds of top consumer products & services, e.g., but not limited to, groceries, apparel, beverages, books & magazines, foods, health care, household, office, personal care, pet care, photography, residential and commercial real estate listings, loans and quotes, auto loans, mortgages, banking services, autos, beauty products, business, classic car parts, restoration and maintenance services collectibles & art custom car parts, restoration and maintenance services deals & gifts education, electronics, fashion, financial, healthcare, home, outdoor & décor, hospitality insurance, online services, other legal marketing, medical facilities, medical insurance, medical retailers, motors, pets, physicians, dentists, other practioners public services psychics, intuitive, metaphysical, mediums & spiritual advisors, real estate, skincare & cosmetics, sports, travel, tourism, wedding, parties & entertainment, online dating and/or any other product or service. Such users and members and/or subscribers (e.g., "Social Shoppers") can find great coupons, mobile services, product & services and deals from leading restaurant, toy and/or entertainment companies and/or top retailers around the world.

The delivery system for a host geospatial website can provide for a multidimensional representation of information and/or scalable version of web content for an infrastructure and global platform that provides users and members and businesses of all types and sizes with access to broad markets for the delivery of coupons, mobile services, products & services, clickable advertisements & mobile advertisements by geo-target location, and allows users to engage in geo-target location-based social networking integration & mobile services, Search and pay for coupons, mobile services, products & services, clickable advertisements & mobile advertisements by geo-target location, including microloans or microcredit, humanitarian aid and support other worldly causes through charitable donations or sustainable gifts on a three dimensional geospatial platform using geospatial mapping, web mapping, mobile mapping & layers geographic information technology. A host geospatial website can include realistic virtual landscape using satellite and/or aerial photography that can include many content layers of web based information, search and pay for coupons, mobile services, products & services, clickable advertisements & mobile advertisements by geo-target location, including mobile banking, mobile payment, mobile wallet and/or electronic payments and social networking for a richer user experience. A host website shall store images, web-based & mobile content, social data and/or share live social feeds from social networks Facebook™ and Twitter™ and/or other "live" communications in real-time on Skype™.

The use of geospatial mapping, web mapping, mobile mapping & layers geographic information for associating information to specific places can included, but it not limited to, one or more of: Live links to places and events; Data on the 3D landscape; Zoom to birds-eye and human scale views; 3D custom audio/visual content; Interactive 360 panoramas; Fly-through tours with content, narration, music; Stunning imagery and videos; 3D buildings and landscaping, online auctions, e-commerce or m-commerce and mobile banking, mobile payment, mobile wallet and/or electronic payments tools and hooks; Clickable advertisements & mobile advertisements on the 3D landscape; Advanced search for private and public information; Social networking integration; Self-posting for uploading user generated content; Custom tools, apps and widgets; and the like. Connecting buyers and sellers with coupons, mobile services, products & services, clickable advertisements & mobile advertisements by geo-target location with users and members known as "Social Shoppers" in real-time on a geographical area across multiple social layers that are displayed as graphic animated color overlays on a three dimensional geospatial platform using geospatial mapping, web mapping, mobile mapping & layers geographic information technology." The invention can also provide mobile payment method and/or system for combined delivery system that will allow shoppers to search and pay for their purchases, redeem coupons and earn reward points via the web or a mobile device effectuating an online payment through a mobile device or portable device (e.g. mobile device, telephone, smart phone, PDA, laptop computer, Android, iOS devices, iPhone, 3G, 3GS, iPhone, iPad, iPad Touch, etc.) to complete an online auctions, e-commerce or m-commerce and mobile banking, mobile payment, mobile wallet and/or electronic payments transaction on a three dimensional geospatial platform using geospatial mapping, web mapping, mobile mapping & layers geographic information technology.

The invention can further provide in one aspect geospatial website aggregates coupons, mobile services, products & services, clickable advertisements & mobile advertisements by geo-target location, and allows users to engage in geo-target location-based social networking integration & mobile services, buyers and sellers with coupons, mobile services, products & services, Products & services, clickable advertisements & mobile advertisements by geo-target location from around the world and/or showcases them in their actual, physical location on the websites unique live view of a virtual Earth. As users and members and/or subscribers shop the world for Search and pay for coupons, mobile services, products & services, clickable advertisements & mobile advertisements by geo-target location, as well as bargains, they can view media and entertainment, sports, personal & financial network of real estate professionals, service providers and business owners, B2B business directory, social networking, online dating, gaming, retail stores, virtual communities and virtual goods and the like, microloans or microcredit, humanitarian aid and support other worldly causes through charitable donations or sustainable gifts and more for family fun, sports, restaurants, events and/or hundreds of top consumer packaged goods brand/ors for groceries, apparel, beverages, books & magazines, foods, health care, household, office, personal care, pet care, photography, autos, beauty products, business, classic car parts, restoration and maintenance services, collectibles & art, custom car parts, restoration and maintenance services, deals & gifts, education, electronics, fashion, financial, healthcare, home, outdoor & décor, hospitality, insurance, online services, other legal marketing, medical facilities, medical insurance, medical retailers, motors, pets, physicians, dentists, other practioners, public services, psychics, intuitive, metaphysical, mediums & spiritual advisors, real estate, skincare & cosmetics, sports, travel, tourism, wedding, parties & entertainment, online dating and/or the like. Social Shoppers can to find great product or services deals from leading restaurant, toy and/or entertainment companies and/or top retailers around the world. Social Shoppers can to use "a mobile device payment method and/or system" for effectuating an online payment through a mobile device equipped carrier and/or a mobile device equipped bank using a mobile users device in connection with an online auctions, e-commerce or m-commerce and mobile banking, mobile payment, mobile wallet and/or electronic payments transactions on the host geospatial website (e.g., mobile telephone, smart phone, PDA, laptop computer, iPad™, iPhone™ or iPod™, etc.); wherein users and members create and/or maintain a rich-media application via a geospatial mapping, web mapping, mobile mapping & layers geographic information platform via the Internet comprising: mobile banking, mobile payment, mobile wallet and/or electronic payments on a three dimensional geospatial platform using geospatial mapping, web mapping, mobile mapping & layers geographic information technology.

Social Earth Mobile allowing Social Shoppers to receive clickable advertisements & mobile advertisements by geo-target location, search and pay for coupons, mobile services, products & services, clickable advertisements & mobile advertisements by geo-target location via a mobile device based upon their precise location. Mobile apps for smart phones (e.g., but not limited to, (e.g. mobile device, telephone, smart phone, PDA, laptop computer, Android, iOS devices, iPhone, 3G, 3GS, iPhone, iPad, iPad Touch, etc.) are provided that will allow Social Shoppers to receive clickable advertisements & mobile advertisements by geo-target location, search and pay for coupons, mobile services, products & services, clickable advertisements & mobile advertisements by geo-target location based upon their precise location or other criteria, such as shopping or interest preferences. With Social Earth Mobile, Social Shoppers can explore the same 3D imagery and terrain as the desktop version. Fly to your current location or anywhere in the world with the touch of a button. Pan, zoom, and tilt your view as you travel around the globe. Search for people, cities, places and businesses around the world. Search by voice. View many layers of geographic information and other information on a three dimensional geospatial platform using geospatial mapping, web mapping, mobile mapping & layers geographic information technology. The invention provides opportunities to connect buyers and sellers and reach people at the point of shopping—a benefit both to shoppers and merchants. The delivery system for a host geospatial website can provide for a multidimensional representation of information and/or sealable version of web content for an infrastructure and global platform that provides users and members and businesses of all types and sizes with access to broad markets for the delivery of coupons, mobile services, products & services, clickable advertisements & mobile advertisements, mobile services, products & services, clickable advertisements & mobile advertisements by geo-target location, search and pay for coupons, mobile services, products & services, clickable advertisements & mobile advertisements by geo-target location on a three dimensional geospatial platform using geospatial mapping, web mapping, mobile mapping & layers geographic information technology. A host geospatial website can include realistic virtual landscape using satellite and/or aerial photography that can include any content and many layers of web based information, clickable advertisements & mobile advertisements by geo-target location, Search and pay for coupons, mobile services, products & services, Products & services, clickable advertisements & mobile advertisements by geo-target location and mobile banking, mobile payment, mobile wallet and/or electronic payments links, social networking and/or clickable advertisements & mobile advertisements by geo-target location, daily deal coupons and free or discounted printable coupons, products & services, clickable advertisements & mobile advertisements by geo-target location from merchants, business owners, B2B business directory, retailers and major brands around the world, and allows users to engage in geo-target location-based social networking integration & mobile services, mobile advertisements, mobile text, mobile SMS marketing, mobile search, mobile multimedia, mobile operating system, mobile device, mobile banking, mobile payment, mobile wallet and/or electronic payments, mobile wallet, mobile express checkout, mobile money transfer, mobile social media widgets, mobile keywords, mobile coupons, mobile instant messaging marketing, mobile voting, mobile eCards, mobile short codes, mobile commerce, mobile shopping, mobile push content, geo-mobile and geo-social for a richer user experience. A host geospatial website shall store images, web-based content, social data and/or share live social feeds from social networks and/or other communications in real-time. Connecting an infrastructure and global platform that provides users and members and businesses of all types with access to broad market for the delivery of coupons, mobile services, products & services, clickable advertisements & mobile advertisements by geo-target location to users and members known as "Social Shoppers" in real-time on a geographical area across multiple social layers that are displayed as graphic animated color overlays on a three dimensional geospatial platform using geospatial mapping, web mapping, mobile mapping & layers geographic information technology.

More specifically, it relates to a method for users and members known as "Social Shoppers" to search and pay for their purchases, redeem coupons and earn reward points via the web or a mobile device or portable device (e.g. mobile device, telephone, smart phone, PDA, laptop computer, Android, iOS devices, iPhone, 3G, 3GS, iPhone 4, iPad, iPod Touch, etc.) to effectuate banking and/or electronic payments; accessing a user account, engaging in mobile social activities and/or viewing available options via a three dimensional geospatial mapping platform using geospatial mapping, web mapping, mobile mapping & layers geographic information technology."

Giving is more in vogue these days than ever. Americans donated nearly $290 billion to charity in 2010 up 4 percent from the year before, according to the Giving USA Foundation. And it's now easier to get a philanthropic bang for your buck thanks to humanitarian=minded credit cards, grocery stores, web sites and other ways. At Social Earth, we plan to turn everyday purchases into tools for social change. Social Shoppers who use the Social Earth Credit Card will be able to designate a small amount of each dollar spent on microloans, humanitarian aid or worldly cause, charity or sustainable gifts. If you're a Social Earth Credit Cardholder, you can enroll in the Social Earth™ Giving Program. Set up your account to donate every time you use your card or redeem your membership reward points for charities of your choice. Social Shoppers will also be able to donate their frequent-flyer miles to the Make-A-Wish-Foundation, which grants the wishes of children with life-threatening illnesses. The group needs more than 2.5 million miles of air travel each year to complete its mission. Major airlines, including United, Delta and Northwest, will let you turn over some or all of your frequent flyer miles to the American Red Cross. The aid organization then redeems the miles to dispatch volunteers to disaster areas.

Exemplary Definitions

A social networking service is an online service, platform, or site that focuses on building and reflecting of social networks or social relations among people, who, for example, share interests and/or activities. A social network service essentially consists of a representation of each user (often a profile), his/her social links, and a variety of additional services. Most social network services are web based and provide means for users to interact over the Internet, such as e-mail and instant messaging. Online community services are sometimes considered as a social network service, though in a broader sense, social network service usually means an individual-centered service, whereas online community services are group-centered. Social networking sites allow users to share ideas, activities, events, and interests within their individual networks. The main types of social networking services are those which contain category places (such as former school year or classmates), means to connect with friends (usually with self-description pages) and a recommendation system linked to trust. Other non-limiting examples can include one or more of the following, e.g., Facebook™, Twitter™, and Skype™ widely used worldwide, Nexopia (mostly in Canada); Bebo, VKontakte, Hi5, Hyves (mostly in The Netherlands), Draugiem.lv (mostly in Latvia), StudiVZ (mostly in Germany), iWiW (mostly in Hungary), Tuenti (mostly in Spain), Nasza-Klasa (mostly in Poland), Decayenne, Tagged, XING, Badoo and Skyrock in parts of Europe; Orkut and Hi5 in South America and Central America; and Mixi, Multiply, Orkut, Wretch, renren and Cyworld in Asia and the Pacific Islands and LinkedIn and Orkut are very popular in India.

A social network is a social structure made up of individuals (or organizations) called "nodes," which are tied (connected) by one or more specific types of interdependency, such as friendship, kinship, common interest, financial exchange, dislike, sexual relationships, or relationships of beliefs, knowledge or prestige.

Geospatial analysis is an approach to applying statistical analysis and other informational techniques to geographically based data. Such analysis employs spatial software and analytical methods with terrestrial or geographic datasets, including geographic information systems and geomatics. Geospatial Mapping links three-dimensional views of the earth with analytical databases of historical and current information. Mobile Mapping is the process of collecting geospatial data from a mobile vehicle, typically fitted with a range of photographic, radar, laser, LiDAR or any number of remote sensing systems. The primary outputs from such systems include GIS data, digital maps and georeferenced images and video. Geo-Mobile is a mobile social network, texted location information or mobile phone tracking can enable location-based services to enrich social networking. Geo-Social is a type of social networking in which geographic services and capabilities such as geocoding and geotagging are used to enable additional social dynamics. User submitted location data or geolocation techniques can allow social networks to connect and coordinate users with local people or events that match their interests. Google Earth is a non-limiting example of the application of geospatial analysis, where it provides a virtual globe, map and geographical information program. Google Earth is a virtual globe, map and geographic information program that layered with geographic information. Google Earth is available for Android, Windows 2000, XP, Vista, 7, Mac OS X, Blackberry Storm, iOS and Linux. Google Earth provides a wealth of topographical information about our planet Earth on a variety of subjects. Google Earth lets you fly anywhere to view satellite imagery, maps, terrain, 3D buildings, galaxies in outer space, and the depths of the ocean. With Google Earth 6, users can explore the streets in 3D like never before. Fly from outer space down to the streets with the new Street View and easily navigate your way around. Google Earth has also been able to assist in promoting awareness of global problems such as Hurricane, volcanic eruption Katrina, the war in Iraq and photos of the post Japan earthquake panoramas in Google Earth. Google Earth has many "layers" of data, including videos, photos, Wikipedia, real-time weather, real-time traffic, 3D buildings, GPS tracks and more. The release of free Web mapping applications opened up printable mapping to mainstream Internet users. Google also released free APIs for their Google Earth platform, allowing users to geo-locate and map their own data. Google is apparently working on a faster, easier Google Earth plug-in download as well as an improved Google Earth mobile app. Google Mobile applications are available for phones that run the Android operating system. The Android operating systems offers many features to users of Google Earth: allow users to search Google and mobile phone apps and contacts; Get email the instant it arrives via push; Search for any email saved in your account; See your friends' locations on a map. Use pictures to search the web; Instantly message your friends and family; Google contacts are automatically synced to your phone; Shop smarter with Google Shopper; Search for local businesses, driving with turn-by-turn GPS navigation, or get transit directions; Browse videos or upload your own at DVD quality; See buzz around you and tag posts with your location; Listen to voicemail, send free SMS, call internationally at low rates;

Google Calendar is synced to your phone; Get real-time quotes and news; Portfolio syncs with Google Finance account; Explore the world from the palm of your hand with Google Earth for Android; Publish blog posts on the go with an Android phone; Translate text in more than 50 languages and speech in 15 languages. The Google Latitude app will run on the iPhone 3G, 3GS, iPhone 4, iPad and iPod touch. The web application runs in the Safari browser on iPhone and iPod touch devices n the Safari browser. Google Latitude is available on Android, Blackberry, iPhone, Symbian, Windows Mobile or computer. With Google Mobile, users can explore the same global satellite and aerial imagery available in the desktop version of Google Earth, including high-resolution imagery for over half of the world's population and a third of the world's land mass. Search for cities, places and businesses around the globe with Google local search. Tilt your device, swipe or pinch and zoom to adjust your view. Panoramio and Wikipedia layers show the millions of geo-located photos and Wikipedia articles from around the world. The Google Earth API is a free service, available for any web site that is available free of charge to consumers. The Plug-in and its JavaScript API allow users to place a version of Google Earth into web pages. The API does not have all the features of the full Google Earth Application but enables sophisticated 3D map applications to be built, including use for GM of the present invention. The Google Earth Plug-in and its JavaScript API let you embed Google Earth, a true 3D digital globe, into your web pages. Using the API you can draw markers and lines, drape images over the terrain, add 3D models, or load KML files, allowing you to build sophisticated 3D map applications. Google Maps is a web mapping service application and technology provided by Google, free (non-commercial use), that powers many map-based services, including the Google Maps website, Google Ride Finder, Google Maps provides high-resolution aerial or satellite images for most urban areas in the United States (including Hawaii, Alaska, Puerto Rico and the U.S. Virgin Islands), Canada and the United Kingdom, as well as parts of Australia and many other countries. Google Transit and maps embedded on third-party websites via the Google Maps API. It offers street maps, a route planner for traveling by foot, car, bike (beta) or public transport and an urban business locator for numerous countries around the world. Google Street View is a technology featured in Google Maps and Google Earth that provides panoramic views from various positions along many streets in the world. Where available, Street View images appear after zooming in beyond the highest level in maps and satellite images, and also by dragging a "pegman" icon onto a location on a map. In marketing, a coupon is a ticket or document that can be exchanged for a financial discount or rebate when purchasing a product. Customarily, coupons are issued by manufacturers of consumer packaged goods or by retailers, to be used in retail stores as a part of sales promotions. They are often widely distributed through mail, magazines, newspapers, the Internet, directly from the retailer, and mobile device or portable device (e.g. mobile device, telephone, smart phone, PDA, laptop computer, Android, iOS devices, iPhone, 3G, 3GS, iPhone, iPad, iPad Touch, etc.) is such as cell phones. Since only price conscious consumers are likely to spend the time to claim the savings, coupons function as a form of price discrimination, enabling retailers to offer a lower price only to those consumers who would otherwise go elsewhere. In addition, coupons can also be targeted selectively to regional markets in which price competition is great. Internet Coupons: Online retailers often refer to coupons as "coupon codes," "promotional codes," "promotion codes," "discount codes," "key codes," "promo codes," "surplus codes," "portable codes," "shopping codes," "voucher codes," "reward codes," "discount vouchers," "free coupons," "discounted coupons," or "source codes." Internet coupons typically provide for reduced cost or free shipping, a specific dollar or percentage discount, or some other offer to encourage consumers to purchase specific products or to purchase from specific retailers. Because paper coupons would be difficult to redeem, typically secret words or codes are distributed for consumers to type in at checkout. Marketers can use different codes for different channels our groups in order to distinguish response rates.

The present invention can in one embodiment gather basic demographic profile information including the user's current geo-target location and behavior data as they search and pay for coupons, mobile services, products & services, clickable advertisements & mobile advertisements by geo-target location, which can be sent to advertisers or otherwise capitalized by the users of the invention. By gathering this valuable demographic information, the present invention provides the ability to target market to Social Shoppers based upon their precise geo-target location on the planet, demographic profile and selected social layer and buying preferences. This data can also include GPS for mobile user, which can be sent to advertisers servers for target mobile marketing based upon the users' geo-target location and buying preferences. The present invention can also provide fast access by, when visiting a website of a user of the present invention, Social Shoppers can access as easily as entering their email address and select their favorite city to access the site. The present invention can use email addresses and selected city for future email marketing. For example, In just 2, 3, 4, 5, 6, 7 or other number of clicks, Social Shoppers are ready to use the inventions website after they download a Google Earth™ or similar plug-in, or visit the Apple™, Android™, or similar marketplace for their smart phone, Social Networking Integration:

The present invention can also provide in certain embodiments integrated "live social feeds" from social networking sites, e.g., but not limited to Facebook™, and Twitter™, into its website(s) and "live" talk communications in real-time on Skype™, which allows Social Shoppers to interact and share the latest product or services deals with their friends, family, business associates, and others. The present invention can also provide in certain embodiments integrated "live talk" in its website from social networking site, e.g. Skype™. Tapping into thousands or millions of social networking users through social networking integration will help users and members of the present invention connect with thousands or millions of users and members around the world. Twitter™ the latest social networking phenomenon enables its users and members to send and read other users and members' messages called "tweets." The present invention provides opportunities to use open source technology to rapidly grow its Social Shoppers around the world by utilizing social networking integration with "live social feeds" from social networking sites into its website and encouraging Social Shoppers to share the latest coupons, mobile services, products & services, clickable advertisements & mobile advertisements by geo-target location with their friends.

Non Limiting Examples of Alternative
Implementations of the Present Invention

The present invention provides in one aspect combining buyers and sellers with clickable advertisements & mobile advertisements by geo-target location, search and pay for coupons, mobile services, products & services, clickable advertisements & mobile advertisements by geo-target location, the social media revolution and the power of geo-mapping technology. Also provided is an online experience that blends the best of online shopping for coupons, mobile services, products & services, clickable advertisements & mobile advertisements by geo-target location, and discounts, with social networking activities and mobile social networking activities, online dating and company and local and global information shown in three dimensions on a viewable and zoomable map.

Unlike other shopping sites, when site subscribers using the present invention, called Social Shoppers (or "SE SHOPPERS"), visit a website of the invention, they are invited to travel virtually just about any where in the world in search of the best Search and pay for coupons, mobile services, products & services, clickable advertisements & mobile advertisements by geo-target location as well as shop for the best bargains on the planet. This one-of-a-kind website aggregates coupons, mobile services, products & services, clickable advertisements & mobile advertisements by geo-target location, and allows users to engage in geo-target location-based social networking integration & mobile services for "daily deal coupons" and "free or discounted" printable coupons from major brands around the world (collectively referred to as "Coupons") and showcase them in their actual, physical location on the websites unique "live view" of Earth. As Social Shoppers shop the world for coupons, mobile services, products & services, clickable advertisements & mobile advertisements by geo-target location, as well as bargains, they can view coupons, mobile services, products & services, clickable advertisements & mobile advertisements by geo-target location, and allows users to engage in geo-target location-based social networking integration & mobile services, search and pay for coupons, mobile services, products & services, clickable advertisements & mobile advertisements by geo-target location from major brands around the world for family fun, sports, restaurants, events and hundreds of top consumer packaged goods brands for groceries, apparel, beauty products, beverages, books & magazines, foods, health care, household, office, personal care, pet care, photography, skincare & cosmetics and the like. Social Shoppers will find great product or services deals from leading restaurant, toy and entertainment companies and top retailers around the world.

Social Shoppers can select a target location in the U.S. such as Atlanta, Austin, Dallas, Denver, San Diego, and San Francisco or in any other cities around the world. Social Shoppers, e.g., can find product or services deals in London or they can tour the planet at will, jumping from Hong Kong to Amsterdam to Buenos Aires to check out the coupons, mobile services, products & services, clickable advertisements & mobile advertisements by geo-target location, as well as bargains. Because the Earth view comes live from satellite and webcam images, shoppers can zoom in for a closer look or zoom out to gain perspective on the location. Such an aspect of the present invention displays, organizes and delivers information across many social layers, and allows users to engage in geo-target location-based social networking integration & mobile services and social media sites featuring top-notch content, stunning satellite imagery, aerial photography and graphic animated color overlays on top of Google Earth.

The present invention delivers a delightful mash-up of content, and allows users to engage in geo-target location-based social networking integration & mobile services, clickable advertisements & mobile advertisements by geo-target location, search and pay for coupons, mobile services, products & services, clickable advertisements & mobile advertisements by geo-target location and live social networking feeds from Twitter™ and Facebook™ or other social networks. The present invention utilizes social networking platforms such as, but not limited to, Facebook™, Twitter™ and Skype™, to allow Social Shoppers to share the latest product or services deals with their friends in other popular social networks. Unlike other sites, the present invention aggregates coupons, mobile services, products & services, clickable advertisements & mobile advertisements by geo-target location, and allows users to engage in geo-target location-based social networking integration & mobile services, search and pay for coupons, mobile services, products & services, clickable advertisements & mobile advertisements by geo-target location on its site daily, but they won't last just one day. The present invention can further provide for coupons, mobile services, product & services by geo-target location that can last for days, weeks or even months. Social Shoppers are encouraged to share these clickable advertisements & mobile advertisements by geo-target location, search and pay for coupons, mobile services, products & services by geo-target location with their friends in Facebook™, Twitter™ and with "live" talk communications in real-time on Skype™ or other social networking avenues. The global sharing capabilities are built into the present inventions technology using sophisticated technology integrating geospatial mapping, web mapping, mobile mapping & layers geographic information, layering geo-target location-relevant data and GPS technologies. Social Shoppers are able to find coupons, mobile services, products & services, clickable advertisements & mobile advertisements by geo-target location, search and pay for coupons, mobile services, products & services, clickable advertisements & mobile advertisements by geo-target location in their local areas or just about anywhere else in the world with the click of a mouse or mobile device or portable device (e.g. mobile device, telephone, smart phone, PDA, laptop computer, Android, iOS devices, iPhone, 3G, 3GS, iPhone, iPad, iPad Touch, etc.). Capitalizing on the popularity of social networking giants Facebook™ and Twitter™ with more than 750 million users worldwide, the present invention provides an online community that taps into the power of social networking by integrating "live social feeds" from these social networking giants directly into its website. In addition, Social Earth™ plans to integrate Skype™ with "live" talk communications in real-time into it's website, which will allow Social Shoppers to communicate with their friends about the latest deal. By creating a highly engaged social networking community, the present invention creates "stickiness," keeping the Social Shoppers on the site for long periods of time, as well as bringing them back again and again.

The present invention provides long-time customer loyalty, not just a one-off deal. The present invention also can donate a small portion of each "coupon," "mobile services," or "products & services" that are sold to provide microloans or microcredit, humanitarian aid or other worldly causes through charitable donations or sustainable gifts. The community aspect of the present invention is the driver behind building awareness of the website and its featured clickable advertisements & mobile advertisements by geo-target location, search and pay for coupons, mobile services, products & services by geo-target location. Existing and potential customers provide coupons, mobile services, products & services, clickable advertisements & mobile advertisements by spreading the word to their friends about the great clickable advertisements & mobile advertisements by geo-target location, search and pay for coupons, mobile services, products & services by geo-target location they've found on a shopping site of the present invention. Add to that the power of collective buying and it's easy to see how the community provided by the present invention can leverage group size in exchange for larger discounts. The present invention delivers clickable advertisements & mobile advertisements by geo-target location, search and pay for coupons, mobile services, products & services, clickable advertisements & mobile advertisements by geo-target location from around the world to its Social Shoppers via its unique live view of the Earth that includes links to places and events, data on the landscape, interactive 360 panoramas, and fly-through shopping tours with stunning 3D imagery. The use of geospatial mapping, web mapping, mobile mapping & layers geographic information for associating information to specific places can included, but it not limited to, one or more of: Live links to places and events; Data on the landscape; Zoom to birds-eye and human scale views; 3D custom audio/visual content; Interactive 360 panoramas; Fly-through tours with content, narration, music; Stunning imagery and videos; 3D buildings and landscaping online auctions, e-commerce or m-commerce and mobile banking, mobile payment, mobile wallet and/or electronic payments tools and hooks; Advertising & mobile advertisements on the 3D landscape; Advanced search for private and public information; Social networking integration; Self-posting for uploading user generated content; Custom tools, apps and widgets; and the like. The present invention further provides mobile banking, mobile payment, mobile wallet and/or electronic payments, mobile device or portable device (e.g. mobile device, telephone, smart phone, PDA, laptop computer, Android, iOS devices, iPhone, 3G, 3GS, iPhone, iPad, iPad Touch, etc.) access from any device to provide clickable advertisements & mobile advertisements by geo-target location, search and pay for coupons, mobile services, products & services, clickable advertisements & mobile advertisements by geo-target location from around the world to Social Shoppers based upon their precise geo-target location. This provides the ability to create an infrastructure and global platform that provides users and members and businesses of all types and sizes with access to broad markets and connect buyers and sellers and to reach people at the point of shopping—a benefit both to shoppers and merchants.

Social Layers.

Social Shoppers using or part of the present invention virtually travel just about any where in the world in search of shopping for coupons, mobile services, products & services, clickable advertisements & mobile advertisements by geo-target location, as well as bargains. The present inventions technology drives content into a "virtual Earth" of the shopping scene on the planet Earth and allow Social Shoppers to view coupons, mobile services, products & services, clickable advertisements & mobile advertisements by geo-target location, search and pay for coupons, mobile services, products & services, clickable advertisements & mobile advertisements by geo-target location from around the world by geo-target location, their home town or another city around the world and virtually travel there in a matter of seconds. This website of the invention aggregates coupons, mobile services, products & services, clickable advertisements & mobile advertisements by geo-target location, and allows users to engage in geo-target location-based social networking integration & mobile services, clickable advertisements & mobile advertisements by geo-target location by geo-target location, search and pay for coupons, mobile services, products & services, clickable advertisements & mobile advertisements by geo-target location from around the world and showcase them in their actual, physical location on the virtual Earth. Because the virtual Earth is "interactive," one can zoom in for a more detailed view or zoom out to gain perspective on where they are in the world. Clickable advertisements & mobile advertisements by geo-target location by geo-target location, search and pay for coupons, mobile services, products & services, clickable advertisements & mobile advertisements by geo-target location can last for days, weeks or even months. What makes the present inventions website different from other group buying websites is that websites of the present invention allow Social Shoppers to search for coupons, mobile services, products & services, clickable advertisements & mobile advertisements by geo-target location by geo-target location, search and pay for coupons, mobile services, products & services, clickable advertisements & mobile advertisements by geo-target location as well as bargains on a virtual Earth, customize their buying preferences, engage in social networking and support worthwhile causes. Websites of the present invention can allow Social Shoppers to select from a menu of coupons based upon their preferences, which is integrated into the virtual Earth along with other layer location-relevant data as Social Shoppers shop online and interact with their friends on any social networking site. Advertisers and merchants will send coupons, mobiles services, products & services, clickable advertisements & mobile advertisements by geo-target location, search and pay for coupons, mobile services, products & services, clickable advertisements & mobile advertisements by geo-target location to Social Shoppers based on geo-target location.

The present invention provides layer applications, which are known as "social layers." These social layers allow Social Shoppers to customize their personal experience on Social Earth™. as they search for coupons, mobile services products & services, clickable advertisements & mobile advertisements by geo-target location, search and pay for coupons, mobile services, products & services, clickable advertisements & mobile advertisements by geo-target location in their local area or just about anywhere else in the world based upon their interests or travels take them. Social Shoppers select from a menu of "Purchase Coupons" categories, but are not limited to, (Arts & Entertainment, Travel, Giving Back, Eat & Drink, Deal of the Day) and "Free Coupons" categories, but are not limited to: (Health & Beauty Products, Sports, Shopping, Groceries). The present invention provides methods and systems that drive traffic to its website by targeting coupons, mobile services, products & services, clickable advertisements & mobile advertisements by geo-target location, clickable advertisements & mobile advertisements by geo-target location, and allows users to engage in geo-target location-based social networking integration & mobile services and connecting buyers and sellers from around the world on a global platform, based upon a user's preference, which are displayed on a unique "live view" of planet Earth. Once a Social Shopper selects one or more coupon categories, clickable advertisements & mobile advertisements by geo-target location and allows users to engage in geo-target location-based social networking integration & mobile services, search and pay for coupons, mobile services, products & services, clickable advertisements & mobile advertisements by geo-target location from around the world populate the virtual Earth. Social Shoppers are able to double click on coupons, mobile services, products & services, clickable advertisements & mobile advertisements by geo-target location and fly directly to its location on Earth. Social Shoppers can also click on one of the featured cities and take a tour of London, San Francisco or Denver and zoom down to street level to take a closer look. Social Shoppers enjoy the experience of virtually traveling around the world, zooming in and out to street level in search for great product or services deals and sharing the latest coupons, mobile services, products & services, clickable advertisements & mobile advertisements by geo-target location, search and pay for coupons, mobile services, products & services, clickable advertisements & mobile advertisements by geo-target location with their friends.

In connection with a one-of-a-kind geospatial website aggregates coupons, mobile services, products & services, clickable advertisements & mobile advertisements by geo-target location, search and pay for coupons, mobile services, products & services, clickable advertisements & mobile advertisements by geo-target location from around the world and showcases them in their actual, physical location on the websites unique live view of a virtual Earth. As Social Shoppers shop the world for bargains, they can view coupons, mobile services products & services, clickable advertisements & mobile advertisements by geo-target location, search and pay for coupons, mobile services, products & services, clickable advertisements & mobile advertisements by geo-target location from major brands around the world for family fun, sports, restaurants, events and hundreds of top consumer packaged goods brands for groceries, apparel, beauty products, beverages, books & magazines, foods, health care, household, office, personal care, pet care, photography, skin care & cosmetics and other embodiments.

Social Shoppers can find great coupons, mobile services, products & services, clickable advertisements & mobile advertisements by geo-target location, search and pay for coupons, mobile services, products & services by geo-target location from leading restaurant, toy and entertainment companies and top retailers around the world. Social Shoppers can search and pay for their purchases, redeem coupons and earn reward points via the web or a mobile device through "a mobile device payment method and system for effectuating an online payment through a mobile device equipped carrier or a mobile device equipped bank using a mobile users device in connection with an online auctions, e-commerce or m-commerce and mobile banking, mobile payment, mobile wallet and/or electronic payments transactions on the host geospatial website via a mobile device or portable device (e.g. mobile device, telephone, smart phone, PDA, laptop computer, Android, iOS devices, iPhone, 3G, 3GS, iPhone, iPad, iPad Touch, etc.); wherein users and members create and maintain a rich-media application via a geospatial mapping, web mapping, mobile mapping & layers geographic information platform via the Internet comprising: mobile banking, mobile payment, mobile wallet and/or electronic payments. The delivery system for a host geospatial website will provide for a multidimensional representation of information and scalable version of web content for the delivery of coupons, mobile services, products & services, clickable advertisements & mobile advertisements by geo-target location, search and pay for coupons, mobile services, products & services, clickable advertisements & mobile advertisements by geo-target location from around the world on a three dimensional geospatial platform using geospatial mapping, web mapping, mobile mapping & layers geographic information technology.

A host geospatial website will include realistic virtual landscape using satellite and aerial photography that will include many content layers of web based information, online auctions, e-commerce or m-commerce and mobile banking, mobile payment, mobile wallet and/or electronic payments links, social networking activities and mobile social networking activities, online dating and virtual clickable advertisements & mobile advertisements by geo-target location, daily deal coupons and free or discounted printable coupons, products & services, clickable advertisements & mobile advertisements by geo-target location from merchants, business owners, B2B business directory, retailers and major brands around the world, and allows users to engage in geo-target location-based social networking integration & mobile services, mobile advertisements, mobile text, mobile SMS marketing, mobile search, mobile multimedia, mobile operating system, mobile device, mobile banking, mobile payment, mobile wallet and/or electronic payments, mobile wallet, mobile express checkout, mobile money transfer, mobile social media widgets, mobile keywords, mobile coupons, mobile instant messaging marketing, mobile voting, mobile eCards, mobile short codes, mobile commerce, mobile shopping, mobile push content, geo-mobile and geo-social in connection with server and/or cloud based internet with access to coupons, mobile services, products & services, clickable advertisements & mobile advertisements by geo-target location, daily coupons & free or discounted printable coupons, products & services, clickable advertisements & mobile advertisements by geo-target location from merchants, business owners, B2B business directory, retailers and major brands around the world, (collectively referred to as "Coupons" as any product, service, or service provider or subgroup thereof), microloans or microcredit, humanitarian aid and support other worldly causes through charitable donations or sustainable gifts in combination with geospatial website for a multidimensional representation of information and/or scalable versions of web content that comprises social networking and/or socially conscious information and/or activities, on a three dimensional geospatial platform using multi-dimensional and scalable geospatial mapping, web mapping, mobile mapping & layers of geographic information associated with entities providing and/or members of the service and/or social networking for a richer user experience. A host geospatial website shall store images, web-based content, social data and share live social feeds from social networks and other communications in real-time. Connecting clickable advertisements & mobile advertisements by geo-target location, search and pay for coupons, mobile services, products & services, clickable advertisements & mobile advertisements by geo-target location from around the world with users and members known as "Social Shoppers" in real-time on a geographical area across multiple social layers that are displayed as graphic animated color overlays on a three dimensional geospatial platform using geospatial mapping, web mapping, mobile mapping & layers geographic information technology. More specifically, it relates to a method for users and members known as "Social Shoppers" to search and pay for their purchases, redeem coupons and earn reward points via the web or a mobile device through effectuate mobile banking and electronic payments; accessing a user account, engaging in mobile social networking activities and mobile social networking activities and viewing available options via a three dimensional geospatial mapping platform using geospatial mapping, web mapping, mobile mapping & layers geographic information technology."

Giving Back:

Social Shoppers will be able to help those who have been impacted by a natural disaster, live in impoverished conditions or are less fortunate in the world. Social Earth™. plans to offer coupons, mobile services, products & services, clickable advertisements & mobile advertisements by geo-target location, and allows users to engage in geo-target location-based social networking integration & mobile services, search and pay for coupons, mobile services, products & services, clickable advertisements & mobile advertisements by geo-target location from around the world and bringing together a collective consciousness of Social Shoppers and raising awareness for those who are less fortunate and suffering from around the world by providing them with access to microloans or microcredit, humanitarian aid and supporting other worldly causes through charitable donations or sustainable gifts.

Products & Services:

Non-limiting examples of products and services provided by the present invention, can include, but are not limited to: A powerful search engine; coupons, mobile services, products & services, clickable advertisements & mobile advertisements by geo-target location, daily deal coupons and free or discounted printable coupons, products & services, clickable advertisements & mobile advertisements by geo-target location from merchants, business owners, B2B business directory, retailers and major brands around the world, online auctions, e-commerce or m-commerce, media and entertainment, sports, personal & financial network of real estate professionals, service providers and business owners, B2B business directory, online dating, gaming, retail stores, virtual communities and virtual goods and the like, microloans or microcredit, humanitarian aid and support other worldly causes through charitable donations or sustainable gifts (collectively "Product or Service" as any product, service, or service provider or subgroup thereof) with geospatial mapping, web mapping, mobile mapping & layers geographic information. Free real estate information on market trends, free mortgage quotes auto loans, insurance and home equity loans; Low mortgage rates to refinance your home; Compare lender quotes from competing providers; Providing a database with millions of residential and commercial listings from around the world; Providing a database with thousands of service providers and business owners, B2B business directory from around the world; Comparing auto quotes from competing providers and refinance your car loan; Providing coupons, mobile services, products & services, clickable advertisements & mobile advertisements opportunities for service providers who want to reach millions of users online; Providing social networking activities and mobile social networking activities and user profiles; Providing RSS links with news feeds (e.g., from CNN or MSN) for breaking news, real-time weather, sports and media and entertainment news and financial markets from around the world; and/or providing the ability to purchase products, goods and services from thousands of service providers and online businesses from around the world.

Geo-Target Location-Based Social Networking Integration & Mobile Services:

Non-limiting examples of geo-target location-based social networking integration & mobile services, include search, friend-finder, people tracking and user-generated content via a web based system or mobile device.

Mobile Advertisements, Mobile Text, Mobile SMS Marketing:

Non-limiting examples of virtual mobile advertisements, mobile text, mobile SMS marketing, products and services provided by the present invention, can include, but are not limited to, mobile advertisements, mobile text, mobile SMS marketing, etc. This type of clickable advertisements & mobile advertisements is most commonly referred to as a Mobile Web Banner or Mobile Web Poster. Mobile advertising is a form of advertising via mobile (wireless) phones or other mobile devices, while in others, it is dominated by Mobile SMS Advertising (which has been estimated at over 90% of mobile marketing revenue worldwide). Short Message Service (SMS) is a text messaging service component of phone, web or mobile communication systems, utilizing standardized communications protocols that allow the exchange of short text messages between fixed line or mobile phone devices. Most SMS messages are mobile-to-mobile text messages though the standard supports other types of broadcast messaging as well. Providing virtual mobile advertisements, mobile text, mobile SMS marketing, mobile text, SMS advertising & mobile marketing, digital billboards and other products & services that connects millions of users and members via the Internet with thousands of service providers and business owners, B2B business directory from around the world on a three dimensional geospatial platform using geospatial mapping, web mapping, mobile mapping & layers geographic information technology.

Mobile Search:

Non-limiting examples of virtual mobile advertisements, daily deal coupons and free or discounted printable coupons, products & services, clickable advertisements & mobile advertisements by geo-target location from merchants, business owners, B2B business directory, retailers and major brands around the world, and allows users to engage in geo-target location-based social networking integration & mobile services, products and services provided by the present invention, can include, but are not limited to, virtual mobile search. Mobile search is an evolving branch of information retrieval services that is centered around the convergence of mobile operating system and mobile phones and other mobile devices. Web search engine ability in a mobile form allows users to find mobile content on websites which are available to mobile devices on mobile devices. Providing mobile search and other products & services that connects millions of users and members via the Internet with thousands of service providers and business owners, B2B business directory from around the world on a three dimensional geospatial platform using Geospatial mapping, web mapping, mobile mapping & layers geographic information technology.

Virtual Mobile Multimedia:

Non-limiting examples of virtual mobile multimedia, products and services provided by the present invention, can include, but are not limited to, virtual mobile multimedia products and services. Mobility and portability of media is also known as mobile multimedia. Media can be downloaded onto the mobile device by podcasting or can be streamed over the web. Digital applications include gaming, video, audio, downloadable ring tones and mobizines. Providing virtual mobile multimedia, products & services that connects millions of users and members via the Internet with thousands of service providers and business owners, B2B business directory from around the world on a three dimensional geospatial platform using Geospatial mapping, web mapping, mobile mapping & layers geographic information technology.

Mobile Operating System:

Non-limiting examples of mobile operating system, also known as a mobile OS, mobile software platform or a handheld operating system such as Windows, Mac OS X, or Linux distributions that controls a desktop computer or laptop provided by the present invention, can include, but are not limited to, virtual mobile multimedia products and services. Operating systems that can be found on smart phones, mobile OS-powered tablet computers, and other mobile devices include Google's Android, Apple's iOS RIM's Blackberry OS, Microsoft's Windows Phone, Linux, HP's webOS, Samsung's Bada, and Nokia's MeeGo amount many others. Providing mobile operating system, products & services that connects millions of users and members via the Internet with thousands of service providers and business owners, B2B business directory from around the world on a three dimensional geospatial platform using Geospatial mapping, web mapping, mobile mapping & layers geographic information technology.

Mobile Device:

Non-limiting examples of a mobile device or portable device (e.g. mobile device, telephone, smart phone, PDA, laptop computer, Android, iOS devices, iPhone, 3G, 3GS, iPhone, iPad, iPad Touch, etc.). from around the world on a three dimensional geospatial platform using Geospatial mapping, web mapping, mobile mapping & layers geographic information technology.

Mobile Banking, Mobile Payment, Mobile Wallet & Mobile Express Checkout, Mobile Money Transfer:

Non-limiting examples of a mobile banking and mobile payment, mobile wallet, mobile express checkout, mobile money transfer method and/or system provided by the present invention, can include, but are not limited to, mobile banking, mobile payment, mobile wallet and/or electronic payments and mobile wallet, mobile express checkout, mobile money transfer. Mobile payments are redefining commerce. The mobile or digital wallet will handle multiple major credit cards, including VISA, MasterCard, Discover, AMEX, Social Earth Credit Card, Social Earth Debit Card and payment options through any financial networks or operator billing platform such as PayPal™, Amazon Payments™ and Google Checkout™. The delivery system will allow Social Shoppers to pay for their purchases, redeem coupons and earn reward points through the web or a mobile device from around the world on a three dimensional geospatial platform using Geospatial mapping, web mapping, mobile mapping & layers geographic information technology. Providing mobile banking, mobile payment, mobile wallet and/or electronic payments and mobile wallet, mobile express checkout, mobile money transfer for the purpose of effectuating an online payment through a mobile device or portable device (e.g. mobile device, telephone, smart phone, PDA, laptop computer, Android, iOS devices, iPhone, 3G, 3GS, iPhone, iPad, iPad Touch, etc.) to complete an online auctions, e-commerce or m-commerce transaction or micropayment via a mobile device (e.g. Premium SMS based transaction mobile payment, direct mobile billing, mobile web payments (WAP), Contactless NFC, P2P Person-to-Person, Point of Sale/Text & PIN & Bluetooth, Point of Sale/Contactless (NFC)) on a three dimensional geospatial platform using geospatial mapping, web mapping, mobile mapping & layers geographic information technology that will allow Social Shoppers to purchase coupons, products & services, clickable advertisements & mobile advertisements by geo-target location from merchants, business owners, B2B business directory, retailers and major brands around the world as they virtually tour around the globe using the present invention.

Mobile Social Media Widgets:

Non-limiting examples of a Social Media Widgets for Twitter™ and Facebook™ as a way for Social Shopper's to connect with their existing fans, friends and other active users who are in these popular social networks.

A Mobile KeyWords:

Non-limited example of a mobile keyword identifies a product, service, or business by geo-target location on Social Earth™. The text response can be more information about a coupon, product, service, or service provider by geo-target location on Social Earth™. This invention can provide Social Shoppers by geo-target location to set up a different automated response with each Mobile Keyword that they set up.

Mobile Coupons:

Non-limited examples of a Mobile Coupons with promotion codes for each individual SMS Mobile Coupon, which can be redeemed on Social Earth™.

Mobile Instant Messaging Marketing:

Non-limited examples of instant message marketing can provide Instant Messaging Marketing to Social Shoppers clickable advertisements & mobile advertisements a particular coupon, product or service. If the Social Shopper is not online to receive the IM, the message will be redirected to their mobile phone and email address.

Mobile Voting:

Non-limited examples of a Mobile Vote for a contest or other promotion for a particular coupon, product or service.

Mobile eCards:

Non-limited examples of a Mobile eCards for clickable advertisements & mobile advertisements sales & promotions, seasonal cards and other products and services.

Mobile Short Codes:

Non-limited examples of a Mobile Short Codes, which are special telephone numbers that are typically 4 to 6 digits long and used for texting purposes.

Clickable Advertisements & Mobile Advertisements, Coupons, Products & Services, a Data Mashup of Geo-Target Location-Based Social Networking Integration & Mobile Services:

Non-limiting examples of clickable advertisements & mobile advertisements, daily deal coupons and free or discounted printable coupons, products & services, clickable advertisements & mobile advertisements by geo-target location from merchants, business owners, B2B business directory, retailers and major brands around the world, and allows users to engage in geo-target location-based social networking integration & mobile services, products and services provided by the present invention, can include, but are not limited to: the following. Providing virtual coupons, mobile services, products & services, clickable advertisements & mobile advertisements by geo-target location, daily deal coupons and free or discounted printable coupons, products & services, clickable advertisements & mobile advertisements by geo-target location from merchants, business owners, B2B business directory, retailers and major brands around the world, digital billboards and other products & services that connects millions of users and members via the Internet with thousands of service providers and business owners, B2B business directory from around the world on a three dimensional geospatial platform using geospatial mapping, web mapping, mobile mapping & layers geographic information technology.

Virtual Online Auction Market:

Non-limiting examples of virtual online auctions services provided by the present invention, can include, but are not limited to the following. Providing an infrastructure and global platform that provides users and businesses of all types and sizes with access to broad markets of virtual online auctions and other products & services that connects millions of users and members via the Internet with thousands of online auctions, products, services, service providers and business owners, B2B business directory from around the world on a three dimensional geospatial platform using geospatial mapping, web mapping, mobile mapping & layers geographic information technology.

Virtual E-Commerce or M-Commerce Market:

Non-limiting examples of e-commerce or m-commerce products and services provided by the present invention, can include, but are not limited to the following. Providing an infrastructure and global platform that provides users and members and businesses of all types and sizes with access to broad markets of e-commerce or m-commerce and other products & services that connects millions of users and members via the Internet with thousands of online products, services, service providers and business owners, B2B business directory from around the world on a three dimensional geospatial platform using geospatial mapping, web mapping, mobile mapping & layers geographic information technology.

Virtual Media and Entertainment Market:

Non-limiting examples of virtual media and entertainment products and services provided by the present invention, can include, but are not limited to, virtual media and entertainment. Providing an immersive, interactive virtual reality to media and entertainment and other products & services that connects millions of users and members via the Internet with thousands of videos, games, virtual reality television and other amusement applications that connects millions of users and members via the Internet with thousands of virtual media and entertainment and other amusement applications with thousands of service providers and business owners, B2B business directory from around the world on a three dimensional geospatial platform using geospatial mapping, web mapping, mobile mapping & layers geographic information technology.

Virtual Sports Market:

Non-limiting examples of virtual sports provided by the present invention, can include, but are not limited to the following. Providing an immersive, interactive virtual reality to sports, media and entertainment, sporting events, players, scores and updates, sports around the world, RSS links, videos and other products & services that connects millions of users and members via the Internet with thousands of videos, games, virtual sports and other amusement applications that connects millions of users and members via the Internet with thousands of virtual media and entertainment and other amusement applications from around the world on a three dimensional geospatial platform using geospatial mapping, web mapping, mobile mapping & layers geographic information technology.

Virtual Personal & Financial Network of Real Estate Professionals Service Providers and Business Owners, B2B Business Directory Market:

Non-limiting examples of virtual personal & financial network of real estate professionals, service providers and business owners, B2B business directory, products and services provided by the present invention, can include, but are not limited to the following: Providing an infrastructure and global platform that provides users and members and businesses of all types and sizes with access to broad markets of virtual personal & financial network of real estate professionals, service providers, business owners, B2B business directory and other products & services that connects millions of users and members via the Internet with thousands of real estate professionals, service providers and business owners, B2B business directory from around the world on a three dimensional geospatial platform using geospatial mapping, web mapping, mobile mapping & layers geographic information technology.

Virtual Real Estate Market:

Non-limiting examples of products and services provided by the present invention, can include, but are not limited to the following: Providing real estate and other products & services with a powerful personal & financial network of thousands of real estate and other professionals that connects millions of users and members via the Internet with thousands of real estate and other professionals and other products, services, service providers and business owners, B2B business directory from around the world on a three dimensional geospatial platform using geospatial mapping, web mapping, mobile mapping & layers geographic information technology.

Virtual Service Providers:

Non-limiting examples of products and services provided by the present invention, can include, but are not limited to: allowing service providers and business owners, B2B business directory' to reach users and members and consumers online, offering coupons, mobile services, products & services, clickable advertisements & mobile advertisements opportunities for service providers and business owners, B2B business directory for business services, healthcare services, specialty financial services, consumer products, specialty retail and media and entertainment, lenders, mortgage companies; providing coupons, mobile services, products & services, clickable advertisements & mobile advertisements by geo-target location, daily deal coupons and free or discounted printable coupons, products & services, clickable advertisements & mobile advertisements by geo-target location from merchants, business owners, B2B business directory, retailers and major brands around the world that can appear on users' property search results; provide a geospatial platform to allow thousands of service providers and business owners, B2B business directory for business services, healthcare services, specialty financial services, consumer products, specialty retail and media and entertainment, lenders, mortgage companies lenders and mortgage companies to provide financing quotes to millions of users and members and consumers online; providing real estate market information and mortgage quotes for, e.g., purchase of a new home, refinance, consolidating debt, auto loans, insurance quotes or home equity loans and other products, services, service providers and business owners, B2B business directory from around the world on a three dimensional geospatial platform using geospatial mapping, web mapping, mobile mapping & layers geographic information technology.

Virtual Social Networking & Mobile Market:

Non-limiting examples of virtual social networking & mobile market, products and services provided by the present invention, can include, but are not limited to the following: Providing a social networking platform with and allows users to engage in geo-target location-based social networking integration & mobile services and a means for users and members to interact and i.e. search for user profiles, social links, share interests and/or activities, entertainment, events and interests, emailing, instant messaging, live "talk" communication in real-time on Skype™, self service GIS and delivery of spatial data & information and uploading user generated content, and allows users to engage in geo-target location-planning or social-mapping (users are able to search and browse nearby stores, restaurants, etc.), games, groups, etc. for members and other products & services that connects millions of users and members via the Internet with millions of members from around the world on a three dimensional geospatial platform using geospatial mapping, web mapping, mobile mapping & layers geographic information technology.

Virtual Online Dating Market:

Non-limiting examples of virtual online dating products and services provided by the present invention, can include, but are not limited to the following: Providing an online dating community and services for users and members to interact i.e. user profile, social links, share interests and/or activities, entertainment, events and interests, emailing and instant messaging, games, groups, etc. and other products & services that connects millions of users and members and members via the Internet with millions of members from around the world on a three dimensional geospatial platform using geospatial mapping, web mapping, mobile mapping & layers geographic information technology.

Virtual Social Gaming Market:

Non-limiting examples of products and services provided by the present invention, can include, but are not limited to, gaming and social sites, add-ons for online games, digital gifts and other items, online virtual communities and similar or related forms of entertainment, virtual real estate, social networks, searching online for different types of real estate and other products, services that connects millions of users and members via the Internet from around the world on a three dimensional geospatial platform using geospatial mapping, web mapping, mobile mapping & layers geographic information technology.

Virtual Retail Stores Market:

Non-limiting examples of products and services provided by the present invention, can include, but are not limited to, virtual retail stores. Proving users and members and business owners, B2B business directory with an online retail store and ability to create a central shopping location where buyers can learn about you and all the products that you sell. Providing online retail stores for members and business owners, B2B business directory and other products, services, service providers and business owners, B2B business directory that connects millions of users and members via the Internet with thousands of members and business owners, B2B business directory from around the world on a three dimensional geospatial platform using geospatial mapping, web mapping, mobile mapping & layers geographic information technology.

Virtual Communities Market:

Non-limiting examples of products and services provided by the present invention, can include, but are not limited to, virtual worlds. Virtual worlds are online communities in which individuals are able to interact with each other in real time, and can include v-businesses, which is virtual commerce of goods and services for use in these virtual worlds. Virtual communities have thousands and millions of members, namely people who join the virtual communities to exchange information, gain social support, or to seek entertainment and friendship. Providing users and members and business owners, B2B business directory with an online virtual community and other products, services, service providers and business owners, B2B business directory that connects millions of users and members and members via the Internet on a three dimensional geospatial platform using geospatial mapping, web mapping, mobile mapping & layers geographic information technology.

Virtual Goods Market:

Non-limiting examples of products and services provided by the present invention, can include, but are not limited to, virtual goods, which can relate to virtual worlds and multiplayer online role playing games (MMO or MMORPG), e.g., like Entropia and Second Life, for members and other products, services, service providers and businesses that connects millions of users and members via the Internet with thousands and millions of members from around the world on a three dimensional geospatial platform using geospatial mapping, web mapping, mobile mapping & layers geographic information technology.

Microloans or Microcredit Market:

Non-limiting examples of products and services provided by the present invention, can include, but are not limited to, microloans or microcredit, which is an extension of very small loans to those in poverty designed to spur entrepreneurship. Providing microloans or microcredit to men and women that lack collateral, steady employment and verifiable credit history and in impoverished conditions around the world and other products, services, service providers and business owners, B2B business directory that connects millions of users and members via the Internet with thousands and millions of disadvantaged men and women from around the world on a three dimensional geospatial platform using geospatial mapping, web mapping, mobile mapping & layers geographic information technology.

Humanitarian Aid Market:

Non-limiting examples of products and services provided by the present invention, can include, but are not limited to, humanitarian aid for poverty, save lives, provide food, clean water and shelter to alleviate suffering and maintain human dignity. Providing humanitarian aid to those in impoverished conditions and suffering from around the world from natural disasters and man made disasters and including animals, animal rights and protecting endangered species and wildlife from extinction and other products, services, service providers and business owners, B2B business directory that connects millions of users and members and members via the Internet with millions of underprivileged men, women and children and including animals, animal rights and protecting endangered species and wildlife from extinction from around the world from poverty, natural disasters and man made disasters on a three dimensional geospatial platform using geospatial mapping, web mapping, mobile mapping & layers geographic information technology.

Charitable Donations or Sustainable Gifts Market:

Non-limiting examples of products and services provided by the present invention, can include, but are not limited to, charitable donations or sustainable gifts. Charitable donations or sustainable gifts may include such categories as: hunger & poverty, education & play, immunization, water, nutrition, health & emergency. In addition, Social Earth™. supports saving the rain forest, lives and finding cures for infectious diseases, etc. A donation or sustainable gift may take various forms, including cash or a Social Earth™ Coupon, can include, but are not limited to, a goat, sheep, chicken, water buffalo, cow, stove, carpentry tools, class supplies, health clinic, food, clothing, water, medical or other supplies, services, new or used goods including clothing, toys, food and vehicles. It may also consist of emergency, relief or humanitarian aid items, development aid support and medical care needs as i.e. blood or organs for transplant. Providing charitable donations or sustainable gifts to those in need in impoverished conditions for such items as food, clothing, education, health or benefit a cause around the world and other products, services, service providers and business owners, B2B business directory that connects millions of users and members and members via the Internet with thousands of local communities, charitable organizations and foundations from around the world on a three dimensional geospatial platform using geospatial mapping, web mapping, mobile mapping & layers geographic information technology.

The present invention further provides the use of various marketing and customer generation methods, including, but not limited to, social media platforms to generate traffic to the websites and access points for the present invention, e.g., but not limited to, a Social Earth™. website, in order to provide a large subscriber base of Social Shoppers; which can include, but is not limited to, one or more of the following: Social Earth™ Coupons—Social Shoppers can view coupons, mobile services, products & services, clickable advertisements & mobile advertisements, coupons, mobile services, products & services, clickable advertisements & mobile advertisements by geo-target location, and allows users to engage in geo-target location-based social networking integration & mobile services for Search and pay for coupons, mobile services, products & services by geo-target location or just anywhere else in the world. This invention can provide Social Shoppers to electronically offer free gifts, % discounts, incentives and reminders with Coupons by geo-target location; Mobile Coupons—This invention can provide Mobile Coupons to Social Shoppers via a mobile device with promotion codes for each individual SMS Mobile Coupons by geo-target location, which can be redeemed on Social Earth™. Video Coupons—"Video" Coupons that are displayed on one or more pages, links, on its Social Earth™. website; Email Marketing—featured coupons, mobile services, products & services, clickable advertisements & mobile advertisements by geo-target location will be emailed to users containing a headline of the deal(s) with a full description of the daily deal and/or links to more coupons, mobile services, products & services by geo-target location nearby; Website—Visitors are prompted to register as a Social Shopper when they first visit the Social Earth™. website and thereafter use the website as a portal for featured coupons, mobile services, products & services, clickable advertisements & mobile advertisements by geo-target location, nearby, national product or services deals and/or where available; Mobile Applications—Consumers can access mobile search and pay for coupons, mobile services, products & services, clickable advertisements & mobile advertisements by geo-target location on smart phones, Androids™ or similar mobile devices, which are compatible with Google Earth and Google Maps and similar geospatial mapping, web mapping, mobile mapping & layers geographic information technologies, and smart phones; Geospatial Mapping links three-dimensional views of the earth with analytical databases of historical and current information. Mobile Mapping is the process of collecting geospatial data from a mobile vehicle, typically fitted with a range of photographic, radar, laser, LiDAR or any number of remote sensing systems. The primary output from such systems include GIS data, digital maps and georeferenced images and video. Google Ad Words™—Google Ad Words™ or similar advertizing is provided to maximize search results for coupons, mobile services, products & services, clickable advertisements & mobile advertisements by geo-target location on Social Earth™; Pay Per Ad—the invention can provide a PPC Ad link on other "high traffic" websites to drive traffic to websites of the invention; In-stream Advertising—In-stream advertising also provides to use social media platforms such as "live social feeds" from Facebook™ and Twitter™ and communications in real-time on Skype™ to spread the word about coupons, mobile services, products & services, clickable advertisements & mobile advertisements by geo-target location; Mobile SMS Marketing Campaign—This invention can provide Mobile SMS Marketing Campaign for the delivery millions of trackable, mobile coupons, mobile services, products & services, clickable advertisements & mobile advertisements by geo-target location each week for retailers and restaurants, powering mobile web application for top brands and developing SMS marketing solutions; Mobile Text—This invention can provide Mobile Text messages to Social Shoppers by geo-target location for clickable advertisements & mobile advertisements by geo-target location of coupons, products & services, clickable advertisements & mobile advertisements by geo-target location from merchants, business owners, B2B business directory, retailers and major brands around the world. Mobile SMS Marketing—Mobile SMS Marketing has emerged as a new way of contacting customers with speed, relevance and effective response. Mobile SMS Marketing is by a text messaging, which is the most widely used data application in the world, with 2.4 billion active users, or 74% of all mobile phone subscribers. The invention can provide Mobile SMS Marketing by geo-target location to connect Social Shoppers with thousands and millions of coupons, products and services. Instant Messaging Marketing—Instant message marketing is rapidly becoming accepted in the business community as a viable communications tool and process. Once Social Shoppers sign up for the Social Earth™ Mobile Services, the invention can provide Instant Messaging Marketing to Social Shoppers clickable advertisements & mobile advertisements a particular coupon, product or service. If the Social Shopper is not online to receive the IM, the message will be redirected to their mobile phone and email address. Social Media Widgets—the invention can provide Social Shoppers with Social Media Widgets for Twitter™ and Facebook™. This invention can provide a way for Social Shopper's to connect with their existing fans, friends and other active users who are in these popular social networks. Mobile KeyWord—A mobile keyword is a one-word phrase that identifies a product, service, or business by geo-target location on Social Earth™. The text response can be more information about a coupon, product, service, or service provider by geo-target location on Social Earth™. This invention can provide Social Shoppers by geo-target location to set up a different automated response with each Mobile Keyword that they set up. Mobile Short Code—the invention can provide Social Shoppers by geo-target location with Mobile Short Codes, which are special telephone numbers that are typically 4 to 6 digits long and used for texting purposes. Mobile Search—This invention can provide Social Shoppers by geo-target location with Mobile Search for people, coupons, products and services on Social Earth™. Mobile eCards—This invention can provide Mobile eCards to Social Shoppers by geo-target location for clickable advertisements & mobile advertisements sales & promotions, seasonal cards and other products and services. Mobile Voting—This invention can provide Social Shoppers by geo-target location to cast a Mobile Vote for a contest or other promotion for a particular coupon, product or service. Mobile SMS Appointment Reminders—This invention can provide Mobile SMS Appointment Reminders to Social Shoppers by geo-target location for upcoming sales or online auctions on Social Earth™. Mobile Multimedia—This invention can provide an immersive, interactive virtual reality to media and entertainment and other products & services that connects millions of users and members via the Internet with thousands of videos, games, virtual reality television and other amusement applications on Social Earth™. Mobile Banking—The invention can also provide mobile payment method and/or system for effectuating an online payment through a mobile device or portable device (e.g. mobile device, telephone, smart phone, PDA, laptop computer, Android, iOS devices, iPhone, 3G, 3GS, iPhone, iPad, iPad Touch, etc.) to complete an online auctions, e-commerce or m-commerce transaction on a three dimensional geospatial platform using Geospatial mapping, web mapping, mobile mapping & layers geographic information technology. The present invention can also provide user-friendly desktop interfaces and mobile apps for smart phones and other communication devices that will allow Social Shoppers to enjoy a unique experience utilizing social networking integration & mobile services, Clickable advertisements & mobile advertisements by geo-target location, Search and pay for coupons, mobile services, products & services, Products & services, clickable advertisements & mobile advertisements by geo-target location, as they virtually tour around the globe using the present invention. Self-Service GIS—Web based interactive mapping and self-service applications increase the potential audience for geospatial tools. Imagery These interactive packages of spatial data, visualization and analysis functionally are available on multiple devices. User Generated Traffic—the invention can provide rewards to Social Shoppers for sharing and spreading the word about products, goods and services that are offered. E.g., if a certain number of people sign up for coupons, mobile services, products & services, clickable advertisements & mobile advertisements by geo-target location, then the deal becomes available to all included; Share Coupons with Friends—the present invention provides this way to make it easy for users and members to share "coupons," "mobile services," or "products & services" by geo-target location with their friends in other social networking and similar sites, e.g., but not limited to, Facebook™, Twitter™, Skype™, StumbleUpon™, Delicious™, Friendfeed™, or Digg™; Refer A Friend—the invention can provide a Referral Widget and encourage Social Shoppers to refer their friends and receive $10 worth of loyalty credits; Loyalty Card Program—the invention can provide Loyalty Card Programs that reward Social Shoppers each time they purchase a coupon, mobile services, products & services, clickable advertisements & mobile advertisements by geo-target location; Social Network Feeds—the invention provides where Social Shoppers can suggest coupons, mobile services, products & services, clickable advertisements & mobile advertisements by geo-target location for an online business to their friends and others in the Social Shopper community, track their friends and share "live social feeds" from Facebook™ and Twitter™;

SOCIAL EARTH™ for Your Business—the present invention can provides for help for online businesses to reach new customers with the inventions "live view" Earth business platform, where are provided online businesses featured in a sponsor ads, such as, but not limited to, Premium Sponsor Ads; Social Earth™ Gift Cards—Social Shoppers and businesses can purchase Social Earth™ Gift Cards for friends, family and customers; Foursquare™—the invention can provide promotions via Foursquare so consumers can act and immediately share the information with their friends; Open Source Technologies—the invention provides that Social Shoppers can connect with thousands or millions of Social Shoppers in other popular social networks such as Facebook™ and Twitter™ using open source technologies; Data Mining—the invention provides for gathering social data for online, mobile advertisers and social brands that are interested in a geo-target location or market of a particular segment based upon their precise location or other criteria; Image Sharing Sites—the invention provides for Social Shoppers to upload images on image sharing sites such as Flickr™ and Picasaweb™; Social Bookmarking: the invention provides for the use of social bookmarking with sites like Digg™, Delicious™, StumbleUpon™, etc.; Search Engine Optimization—Key words can be used in the present invention to optimize visibility to top search engines such as: Google™, Yahoo™, Bing™, Ask™ and AOL Search™. Other search engines such as: Collecta™, Topsy™, 48ers™, Leapfish™, Scoopler™ and Sency™ are powerful tools that will show live streams of micro blog updates from Twitter™, Jaiku™ and Identica™, photos from Flickr™, TwitPic™ and yFrog™ and videos from YouTube™ and Ustream™; YouTube™: the present invention can provide periodic YouTube videos outlining how to use and maximize user purchasing power using the present invention, e.g., SOCIAL EARTH™, as well as soliciting and providing video testimonials from Social Shoppers on an ongoing basis, e.g., incentivizing "four star" videos with a special "Best Expert User" badge to be featured on their profile page; Video Viral Marketing can also be used in the present invention; as well as Blogging, and using article servers (such as ezinearticles.com, goarticles.com, selfgrowth.com, isnare.com); Twitter™. Marketing, including, e.g., but not limited to, discounts or other special product or services deals, on Twitter™. Affiliates—the invention can further provide API widgets or geo-targeted social links that can be downloaded by affiliates. Social Shoppers can get paid X percent (X %) of sales of Social Earth™ Coupons on their websites; Independent Coupon Distributors—the invention can provide network(s) of independent coupon distributors that own Valupak™ or other franchises (and other direct mail coupon companies) to include "coupons," "mobile services," "products & services" by geo-target location that can be distributed to local businesses.

Referring now to the drawings wherein like reference numerals are used to identify identical components in the various views, FIG. 1 shows an example of a combined coupons, mobile services, products & services with /Geospatial Mapping/Web Mapping/Mobile Mapping/Company-Local & Socially Conscious Information/Location-Based Social Networking Integration & Mobile Services ("PS-GM-C/L&SC/I-SN") system 10 in accordance with an exemplary embodiment combined online coupons, mobiles services, product & services by geo-target location in combination with geospatial mapping, web mapping, mobile mapping & layers geographic information/company/local & socially conscious information/and/or social networking distribution system 10 includes a main server system 12 and a client system 14 that is remote from main server system 12, connected together by a distributed computer network, such as the Internet 16 (network, or mobile device or portable device (e.g. mobile device, telephone, smart phone, PDA, laptop computer, Android, iOS devices, iPhone, 3G, 3GS, iPhone, iPad, iPad Touch, etc.) access system). A user desiring to obtain one and/or more of online coupons, mobile services, product & services by geo-target location in combination with geospatial mapping, web mapping, mobile mapping & layers geographic information/company/local & socially conscious information/and/or social networking uses client system 14 to interact with main server system 12 to obtain online coupons, mobile services, products & services, clickable advertisements & mobile advertisements by geo-target location. An electronic coupon can be but is not limited to any advertisement that is electronic (e.g., electronic advertisement on website, electronic advertisement sent to client device, a hyper link based on a search result from a search engine and/or any other push/pull techniques).

Main server system 12 is configured to be connected to, and/or otherwise receive, coupon, company, social activity, product, and/or services information from the issuer of such coupons (i.e., the coupons sponsor) and/or as provided by the website and/or other electronically provided information, e.g., by PDA, cell phone, portable electronic tablet, etc., including mobile banking, mobile payment, mobile wallet and/or electronic payments or online auctions, e-commerce or m-commerce system. Although not shown, this function can be performed by a direct electronic connection with a sponsor system, and/or can involve loading data from a physically transportable data storage medium (e.g., diskette, tape, CD-ROM, USB drive, etc.). The coupon sponsor may, and in most cases will, issue in connection with the coupon an associated set of instructions that define how the coupon is to be distributed. For example, such instructions can include restrictions as to the number of coupons that any one user can print out for redemption, the state and/or zip code associated with a user for such user to have access to the coupon, the expiration date, the item and discount amount, etc. Main server system 12 is further configured to be connected to, and/or otherwise receive, clickable advertisements & mobile advertisements information from an advertising sponsor, or purchasing system, e.g., Amazon, or company purchase website or mobile application, or through mobile banking, mobile payment, mobile wallet and/or electronic payments system. Although not shown, this function can be performed by direct electronic connection with the ad sponsors system, and/or can involve loading data from a physically transportable data storage medium (i.e., diskette, tape, CD-ROM, etc.). The advertising impressions are displayed on client system 14, as described in greater detail below.

Main server system 12 can include a website server 18, a front-end server 20, a handler 22, a database server 24, and an FTP server 26. Website server 18 is configured to provide "web pages" mobile app, online auctions, e-commerce or m-commerce or electronic or mobile banking, mobile payment, mobile wallet and/or electronic payments, to consumers (including possible users and members of electronic coupon distribution system 10) with Internet access. Internet 16, more particularly, the World Wide Web portion thereof, "WWW," is an interconnected computer network that is generally distributed throughout the world on discrete interconnected computer nodes having software interfaces generally referred to as "web pages," which further includes geospatial mapping, web mapping, mobile mapping & layers geographic information, social networking, company and local information, and/or any other useful data. Access to Internet 16 can be made by various methods; typically, however, a non-institutional user obtains access from one of a plurality of Internet Service Providers (ISPs), which in turn obtain authorized access to Internet 16. Navigation on the WWW portion of Internet 16 involves knowledge of a directory structure of various nodes of the Internet (i.e., an "address" to each given resource on Internet 16). Such an address is generally referred to as a Uniform Resource Locator (URL), which typically starts with a protocol name followed by a domain name, for example: http://www.valuepass.com. Website server 18 is configured to provide, among other things, an interface for effecting a download of client software that a consumer can download and execute to establish a client system 14 on his and/or her computer system. In this way the consumer can become an authorized user ("user") of electronic coupon distribution system 10. In particular, website server 18 can refer an Internet consumer to FTP server 26 for the client installation file.

Front-end server 20 provides multiple interface and allocation/direction features for electronic coupon distribution system 10. Front-end server 20 is the entity that is initially contacted by client system 14 at the start of each new session of combined coupons, mobile services, products & services by geo-target location with /Geospatial Mapping/Web Mapping/Mobile Mapping/Company-Local & Socially Conscious Information/Location-Based Social Networking Integration & Mobile Services ("PS-GM-C/L&SC/I-SN") distribution system 10, and/or when automatic coupon updates occur. Handler 22 is configured to interface with database server 24. After a new session is established by a user, all subsequent requests by client system 14 can be directed to and are "handled" by handler 22. As a result, handler 22 can thereafter issue a request and/or a command to database server 24, and/or directly respond to client system (if configured to do so). Database server 24 can comprise a plurality of physical, individual general purpose digital computers configured as database servers, which can be further configured in a cluster arrangement. Database server 24, in one embodiment, can be configured to operate using SQL server software, such as, but not limited to, Microsoft SQL Server Version 7, commercially available from, for example, Microsoft Corporation, Redmond, Wash., U.S.A.

FTP server 26 can be configured to operate in cooperation with website server 18 to provide, for example, installation and/or setup programs. The installation program(s) are downloaded to a general-purpose computer (e.g., PC and/or a MAC) for installation of the client software in accordance with the present disclosure. Client system 14 includes client application software 28, DeviceID data 30 (ID) data 30, user preference data 32, user history data 34, PS-GM-C/L&SC/I-SN information data 36, and advertising data 38. In addition, client system 14 can comprise a general purpose computing apparatus configured to operate in accordance with an operating system having a graphical user interface, such as, for example, Windows 95/98/NT 4.0/2000/Vista/7, and Apple Computer, Inc. MAC OS Operating System for Macintosh platforms. Client system 14 can further include standard peripherals such as a display device 40, a keyboard 42, a pointing device, such as a mouse 44, and an output device, such as a printer 46, for producing a "hard copy" of PS-GM-C/L&SC/I-SN 48. DeviceID data 30 can be stored on main server system 12, according to an exemplary embodiment. In exemplary embodiments, one, a few, a plurality and/or all DeviceID data 30 can be stored on main server system 12.

Client application software 28 comprises software compatible with and executing on client system 14 configured to implement the present disclosure as described herein. Client application software 28 performs various functions including, but not limited to, collecting user information, including preferences, communicating with main server system 12 via Internet 16, and providing an interface for the user for browsing through, and selecting, PS-GM-C/L&SC/I-SN information for printout. DeviceID data 30 can comprise a multi-digit number that is assigned by main server system 12, more particularly, database server 24, when a user registers with PS-GM-C/L&SC/I-SN information distribution system 10. DeviceID data 30 can have a format, such as XXXXXXXX, where X is a digit between 0-9. DeviceID data 30, however, does not specifically identify the user personally, but rather, more accurately associates a physical machine defining client system 14 with user profile information obtained during registration. DeviceID data 30 is stored on client system 14, main server system 12, and/or both as a part of a User Info object. If the DeviceID data 30 is stored on client system 14, then DeviceID data 30 is provided to main server system 12 when making requests, for example, for new PS-GM-C/L&SC/I-SN information data. If a client system 14 operates multiple independent operating systems (e.g., a Mac operating system (a product of Apple Computer, Inc.) and a Windows operating system (a product of Microsoft Corp.)), then there can be a separate DeviceID data 30 for each operating system assigned to that client system 14. Main server system 12 can correlate the provided DeviceID data 30 with user information stored in a profile database. The user information can then be used in identifying PS-GM-C/L&SC/I-SN information suitable for the user. In this embodiment, however, the user is not personally identified nor is it even possible (e.g., through the "hacking" of main server system 12) to identify the user personally, as such information is not even collected from the user. Accordingly, the approach described herein maintains privacy of the user of PS-GM-C/L&SC/I-SN information distribution system 10.

The User Info object further includes user information collected from the user of client system 14 indicative of one and/or more demographic characteristics of the user. In this embodiment, the user information is insufficient to specifically identify the user. In a constructed embodiment, such information comprises a postal zip code associated with the user, and a state in which the user resides. Client application software 28 allows the user to update this information after initial registration. In addition, the User Info object includes the mode in which the Internet is accessed, for example, through use of a modem (e.g., dial-up), through use of a Local Area Network (LAN), and/or use of a proxy server. The User Info object can further include the version number of the client application software 28. User preference data 32 comprises two main groups. The first group of information contained in user preference data 32 includes information defining how often the main server system 12 is checked for new PS-GM-C/L&SC/I-SN information. In a constructed embodiment, the options include one hour, two hours, four hours (the default), twice a day, and once a day. The first group of information contained in user preference data 32 can also include a miscellaneous item of information indicating whether the user prefers that certain PS-GM-C/L&SC/I-SN information be automatically printed (this can be selected and/or deselected by the user). The second main group of information included in user preference data 32 includes a comprehensive listing of main categories of PS-GM-C/L&SC/I-SN information selected by the user that the user wishes to receive. While the particular main PS-GM-C/L&SC/I-SN information category descriptions can be changed on main server system 12 and downloaded to client system 14 at any time, exemplary categories include "Apparel," "Beauty Products," "Athletics," "Automotive," "Internet Electronics," and "Skincare & Cosmetics" among others. A user can deselect a category, in which case PS-GM-C/L&SC/I-SN information pertaining to that category will not be sent from main server system 12 to client system 14.

User history data 34 comprises data corresponding to events occurring at the remote client system 14, as well as other items pertaining to the operation of client system 14. All these items are stored in a user history file. For example, when a user is browsing through available PS-GM-C/L&SC/I-SN information, each PS-GM-C/L&SC/I-SN information that is selected for viewing is noted in the user history file. Likewise, when PS-GM-C/L&SC/I-SN information is selected for printing, that action is also recorded in the user history file. Other examples include when PS-GM-C/L&SC/I-SN information is actually printed, and when an advertising impression (described in further detail below) is displayed on display device 40. The information contained in the user history data 34 is encrypted by client application software 28 in accordance with a client system encryption strategy to protect the integrity of the data contained therein. The contents of the user history data 34 are described and illustrated in greater detail in connection with FIG. 17.

PS-GM-C/L&SC/I-SN information data 36 includes information corresponding to the PS-GM-C/L&SC/I-SN information available (e.g., for browsing) on client system 14. Each PS-GM-C/L&SC/I-SN information, such as PS-GM-C/L&SC/I-SN information 48, includes a plurality of items of information associated therewith.

Therefore, an exemplary, non-limiting, structure is defined for each PS-GM-C/L&SC/I-SN information having the items of information set forth in Table 1 below.

TABLE 1

PS-GM-C/L&SC/I-SN information Data Structure

1. PS-GM-C/L&SC/I-SN information Sponsor Name
2. Product and/or Service Description
3. Savings and/or Discount Amount
4. The Number of PS-GM-C/L&SC/I-SN information Available for Printout
5. The Number of PS-GM-C/L&SC/I-SN information Printed Out Thus Far
6. Expiration Date
7. Optional Text/Image(S)
8. PS-GM-C/L&SC/I-SN information Identification Number In addition, when PS-GM-C/L&SC/I-SN information 48 is actually printed out, additional information can be printed out on the "hard copy" of the PS-GM-C/L&SC/I-SN information. These additional items can include the DeviceID data 30, portions of the demographic data such as the postal zip code, one and/or more items of the user information contained in user preference data 32, the date and time, and optionally various Internet URLs. Coupon sponsors have found some of the information appearing on printed PS-GM-C/L&SC/I-SN information 48 desirable. That is, when the user redeems PS-GM-C/L&SC/I-SN information 48, for example, at a retail store, information appearing on PS-GM-C/L&SC/I-SN information 48 (which is eventually returned by the retailer to the PS-GM-C/L&SC/I-SN information issuer and/or sponsor) is available to the PS-GM-C/L&SC/I-SN information sponsor. This information can thereafter be used in analyzing and assessing the efficacy of various advertising/promotional strategies. PS-GM-C/L&SC/I-SN information data 36 can be stored on a hard drive and/or the like associated with client system 14, and is preferably stored in an encrypted form. In particular, and in accordance with the present disclosure, PS-GM-C/L&SC/I-SN information data 36 corresponding to PS-GM-C/L&SC/I-SN information is encrypted by main server system 12 in accordance with a server system encryption strategy. \

The encrypted PS-GM-C/L&SC/I-SN information data is then transmitted to client system 14. Client system 14 further encrypts the once-encrypted PS-GM-C/L&SC/I-SN information data in accordance with a client system encryption strategy to thereby generate doubly encrypted PS-GM-C/L&SC/I-SN information data. The doubly encrypted PS-GM-C/L&SC/I-SN information data 36 can then be stored on the client system 14. The foregoing encryption steps substantially minimize the occurrence of fraud in the distribution of PS-GM-C/L&SC/I-SN information compared to known systems. A user, for example, can therefore not easily defeat the PS-GM-C/L&SC/I-SN information counting scheme that limits the number of printouts by, for example, exploring the client systems hard drive, identifying PS-GM-C/L&SC/I-SN information data, and thereafter producing printed copies of the PS-GM-C/L&SC/I-SN information. Use of the environment established by client application software 28 is therefore practically the only means for the user to obtain usable PS-GM-C/L&SC/I-SN information 48. Advertising data 38 comprises a plurality of advertising impressions wherein each impression can include a predetermined combination of text and images. Advertising data 38 is also stored on client system 14 in an encrypted form. Display device 40, keyboard 42, mouse 44, and printer 46 can comprise an apparatus known to those of ordinary skill in the art.

FIG. 2 shows, in greater detail, database server 24 of main server system 12. As described above, database server 24 can comprise a plurality of physical database servers arranged in a cluster. Further physical machines can be added to provide for load balancing (i.e., scalability, and the ability to quickly add additional hardware as load and responsiveness criteria require). Database server 24 can include PS-GM-C/L&SC/I-SN information database 50, an advertising database 52, a master category list master category list database 54, a plug-in database 56, a brand logo database 58, and a user transaction history database 60.

PS-GM-C/L&SC/I-SN information database 50 includes PS-GM-C/L&SC/I-SN information data similar to that described in connection with PS-GM-C/L&SC/I-SN information data 36, but is more in the nature of a master PS-GM-C/L&SC/I-SN information database including the entire universe and/or a larger set of PS-GM-C/L&SC/I-SN information available on PS-GM-C/L&SC/I-SN information distribution system 10. Advertising database 52 includes a plurality of ad impressions, which can be a combination of text and/or images. Again, advertising database 52 is in the nature of a master advertising database including all of the advertising impressions included in main server system 12.

Master category list database 54 includes the main PS-GM-C/L&SC/I-SN information category names presently established on PS-GM-C/L&SC/I-SN information distribution system 10. In addition, display characteristics, such as the color of a main PS-GM-C/L&SC/I-SN information category button (to be described in connection with FIG. 3A) can also be stored in database 54.

Plug-in database 56 includes information as to available plugins for use in connection with client application software 28 of client system 14. Plug-in database 56 includes a plurality of plugins. The particular plugins that are selected for use in connection with client application software 28 depends on what added functionality has been configured in client system 14. For example, plugins can be configured to provide Zodiac information, recipe information, and stock quote information to the user. Additionally, a plug-in can be configured to provide a new PS-GM-C/L&SC/I-SN information style for the user. In this way, client system 14 can be updated remotely with new functionality.

Brand logo database 58 includes information as to how the user interface of client system 14 is "branded." The default "branding" of the user interface involves the display of a company logo of the assignee of the present disclosure. Also, a corresponding Internet URL for "click through" purposes is associated with the brand image. However, in alternate embodiments, other companies can arrange (e.g., through a referral of potential new users and members of PS-GM-C/L&SC/I-SN information distribution system 10) to have the user interface of client application software 28 "branded" with the referring company's logo (and Internet URL for "click through").

User transaction history database 60 includes information contained in user history data 34 uploaded from client system 14. User transaction history database 60 therefore contains information corresponding to actions and/or events taken by and/or involving the user of client system 14. User transaction history database 60 therefore includes a record for each PS-GM-C/L&SC/I-SN information that has been downloaded and/or otherwise provided to client system 14. As each PS-GM-C/L&SC/I-SN information is displayed, and/or printed by the user, for example, the corresponding record in user transaction history database 60 is updated.

Referring now to FIGS. 3A and 3B, FIG. 3A shows a Graphical User Interface (GUI) 62 displayed on display device 40 in connection with the execution of client application software 28. User interface 62 includes a plurality of main PS-GM-C/L&SC/I-SN information category "buttons" 64 each having a respective status indicator 66 associated therewith. User interface 62 also includes PS-GM-C/L&SC/I-SN information subcategory list 68, PS-GM-C/L&SC/I-SN information list 70, an advertising pane 72, a logo pane 74, a main PS-GM-C/L&SC/I-SN information display area 76, an "Add-To-Print-Cart" button 78, a "Print Now" button 80, a "More Info" button 82, a "Delete" button 84, a "Preferences" button 86, a "Promotions" button 88, a "Refresh" button 90, a printout status display area 92, and a general message display area 94.

Main PS-GM-C/L&SC/I-SN information category buttons 64 allow the user of client system 14 to select the general category of PS-GM-C/L&SC/I-SN information that the user is interested in viewing. For example, the user who is interested in browsing through media and entertainment PS-GM-C/L&SC/I-SN information, would select the main category button 64 designated "Media and Entertainment" using a pointing device such as mouse 44 (e.g., via "clicking" on the button). Status indicator 66 associated with each main PS-GM-C/L&SC/I-SN information category button 64 indicates whether there are PS-GM-C/L&SC/I-SN information under that main category that have not yet been displayed in PS-GM-C/L&SC/I-SN information display area 76. As shown in FIG. 3A, when a status indicator 66 is "checked" (i.e., active), as indicated generally at 66.sub.A for the main PS-GM-C/L&SC/I-SN information category button labeled "Added Extras," such indication informs the user that PS-GM-C/L&SC/I-SN information are available under that main PS-GM-C/L&SC/I-SN information category that have not yet been displayed.

Alternatively, when there are no undisplayed PS-GM-C/L&SC/I-SN information under a main category, the "checked" status indicator 66 becomes inactive and is removed, as shown by a dashed line box designated 66.sub.I where a status indicator would otherwise be displayed had it been "active." When one of the plurality of main PS-GM-C/L&SC/I-SN information category buttons 64 is selected, a corresponding subcategory list is displayed in PS-GM-C/L&SC/I-SN information subcategory list 68. A user can then browse through the items contained in PS-GM-C/L&SC/I-SN information subcategory list 68 and make a selection. When one of the items contained in PS-GM-C/L&SC/I-SN information subcategory list 68 is selected by the user (e.g., via "clicking"), the corresponding individual PS-GM-C/L&SC/I-SN information and/or informational messages are displayed in PS-GM-C/L&SC/I-SN information list 70. The user can then select an item from PS-GM-C/L&SC/I-SN information list 70, which will then be displayed in PS-GM-C/L&SC/I-SN information display area 76. Through the foregoing interface, users and members of PS-GM-C/L&SC/I-SN information distribution system 10 can quickly and easily navigate from broad main PS-GM-C/L&SC/I-SN information categories, to individual PS-GM-C/L&SC/I-SN information, for printout and later redemption. If the user desires to print out a particular PS-GM-C/L&SC/I-SN information, the user can select the print cart button 78 to add the selected PS-GM-C/L&SC/I-SN information to a print cart and/or queue for subsequent printout on printer 46. Alternatively, the user can print the selected PS-GM-C/L&SC/I-SN information immediately by selecting the "Print Now" button 80.

Advertising pane 72 is configured to display an advertising impression. In one embodiment, the advertising impression is selected from a plurality of advertising impressions as a function of a selected PS-GM-C/L&SC/I-SN information subcategory. For example, a vendor of electronic equipment can arrange to have an ad impression for that vendors company displayed in advertising pane 72 when the user selects a particular PS-GM-C/L&SC/I-SN information subcategory from list 68 when the "Internet Electronics" category button 64 is selected. As a further feature, the advertiser can provide an Internet URL (e.g., to its home page) and have it associated with the ad impression. Client application software 28 is configured such that when a user selects (e.g., "clicks") advertising pane 72, an Internet browser program associated with client system 14 is launched and is directed to the URL as specified by the advertiser. This is a so-called "click through" occurrence, which is recorded in the user history file. Logo pane 74 provides a display area through which the user interface 62 of PS-GM-C/L&SC/I-SN information distribution system 10 can be "branded." As with advertising pane 72, an Internet URL can be associated with the brand logo displayed in logo pane 74. Client application software 28 is configured such that when the user selects (e.g. "clicks") logo pane 74, an Internet browser program associated with client system 14 is launched and is directed to the specified URL.

The "Print Now" button 80 is configured under client application software 28 such that when selected, the PS-GM-C/L&SC/I-SN information currently being viewed is printed out on printer 46. If there are one and/or more other PS-GM-C/L&SC/I-SN information currently in the print queue, as a result of prior selection of the print cart button 78 for previously displayed PS-GM-C/L&SC/I-SN information, then selection of the "Print Now" button 80 by the user will operate to print all such selected PS-GM-C/L&SC/I-SN information 48 on printer 46. The "More Info" button 82 is configured under client application software 28 to launch an Internet browser program associated with client system 14 when selected, and, further, to direct the browser to a specified URL. In accordance with a secure e-couponing embodiment of the present disclosure, predetermined ones of the PS-GM-C/L&SC/I-SN information displayed in PS-GM-C/L&SC/I-SN information display area 76 can be redeemed by the user electronically (as opposed to printing out the displayed PS-GM-C/L&SC/I-SN information and physically tendering the same to the retailer). Generally, a portion of the PS-GM-C/L&SC/I-SN information being displayed in PS-GM-C/L&SC/I-SN information display area 76 will tell the user to click on the "More Info" button 82 to instantly redeem the PS-GM-C/L&SC/I-SN information.

Client application software 28 is configured to invoke, in response to the "click," the specified but completely hidden and inaccessible URL (including the appended promotional code) using an Internet browser program. Client application software 28 disables access to the invoked URL/code. For example, moving the mouse arrow over the PS-GM-C/L&SC/I-SN information/ad does not cause the URL to be displayed, nor is "right-button clicking" operative to allow capture of the URL. Accordingly, the specified URL (and code) is neither displayed nor available, and cannot be discovered by, for example, "right-clicking" on PS-GM-C/L&SC/I-SN information display area 76, like a web-based e-PS-GM-C/L&SC/I-SN information distribution systems. The browser takes the user to the website corresponding the specified URL, where the appended promotional code is processed, and the user provided an opportunity to redeem the same. The present disclosure therefore provides secure PS-GM-C/L&SC/I-SN information distribution. In another embodiment, the specified URL that is invoked when the "More Info" button 82 is "clicked" comprises the URL associated with an advertiser's website (i.e., the advertiser associated with an ad impression displayed in advertising pane 72). The "Delete" button 84 is configured under client application software 28 to delete the currently viewed PS-GM-C/L&SC/I-SN information when selected by the user.

The "Preferences" button 86 is configured under client application software 28 to allow the user to set and/or modify the information contained in the user preference data 32, when selected by the user. For example, the refresh interval referred to above can be updated by the user to extend and/or foreshorten the PS-GM-C/L&SC/I-SN information update interval. The "Promotions" button 88 is configured under client application software 28 to prompt the user to enter a promotion code to obtain a special promotion PS-GM-C/L&SC/I-SN information, when selected by the user. For example, a third-party website, and/or the like, can advise the user of a promotional code, with instruction to establish client system 14 (if they are not already a registered user), and then to enter the promotion code as described above, to obtain the promotional PS-GM-C/L&SC/I-SN information.

The "Refresh" button 90 is configured under client application software 28 to transmit an update request from client system 14 to main server system 12, when selected by the user. This action, in-effect, requests that any new PS-GM-C/L&SC/I-SN information waiting for the user on main server system 12 at that point in time be downloaded to client system 14. Additionally, any data in the user history file is uploaded. Printout status display area 92 is provided for displaying messages pertaining to the status of the print cart (e.g., "Items to Print: 2"). Message display area 94 is provided for displaying various messages to the user of client system 14.

Referring now to FIG. 3B, the graphical user interface associated with the operating system of client system 14 can include a taskbar 100. In accordance with the present disclosure, taskbar icon 102 is provided. Client application software 28 is configured to display taskbar icon 102 to the user in a first display state when no new PS-GM-C/L&SC/

I-SN information and/or messages are available to the user. Taskbar icon 102 in the first display state can assume a static display. In constructed embodiment, taskbar icon 102 includes a generally black-colored "%" symbol on a yellow-colored background, all enclosed by a dashed-line box.

Client application software 28 is further configured to display taskbar icon 102 in a second display state different from the first display state when new PS-GM-C/L&SC/I-SN information and/or messages are available for the user. In a constructed embodiment, the second display state associated with taskbar icon 102 comprises a quasi-flashing display state wherein (i) the color of the "%" symbol is indexed and/or rotated through a plurality of different colors, and (ii) the dashed-line enclosure box is manipulated to give the sense of movement, particularly rotation, around the perimeter of taskbar icon 102.

Referring now to FIG. 4, a brief description of the operation of PS-GM-C/L&SC/I-SN information distribution system 10, particularly the main interactions between client system 14 and main server system 12, will now be set forth. Each time a new session is commenced, the basic steps set forth in FIG. 4 are performed. In step 104, client system 14, by way of execution of client application software 28, is initialized. In step 106, client application software 28 determines whether there is an identified user device for client system 14, and/or whether the present user is a "new" user device. Client application software 28 can make this determination based on the existence and/or absence of particular files on client system 14 (e.g., a file containing a DeviceID data 30) indicative of whether and/or not this is a "new" user device. If "NO," then the method branches to step 112. Otherwise, if the answer to step 106 is "YES," then the method branches to step 107.

In step 107, client application software 28 obtains user information from the user. In particular, client application software 28 is configured to collect user information from a user of client system 14 indicative of one and/or more demographic characteristics of the user without obtaining information sufficient to specifically identify the user. In a constructed embodiment, the information obtained comprises a postal zip code associated with the user, and a State where the user resides. Personal information such as the users and members name, e-mail address, residence address, social security number, telephone number, and the like is not obtained in step 107. In accordance with the present disclosure, the foregoing step provides useful information to main server system 12 in the selection of PS-GM-C/L&SC/I-SN information appropriate for the user (e.g., geographic area). PS-GM-C/L&SC/I-SN information from merchants located geographically proximate the users and members residence can be more easily redeemed by the user, thus increasing the efficacy of the PS-GM-C/L&SC/I-SN information offer. Other information, such as the type of Internet connection (e.g., modem), can also be obtained from the user in step 107.

In step 108, main server system 12 registers the "new" user device. Main server system 12 determines whether the user of remote client system 14 is a "new" user device based on the presence and/or absence of DeviceID data 30 in a message from client system 14 to main server system 12. The "new" user device is then registered on main server system 12. Main server system 12 is configured to register the new user by performing, among other things, the steps of allocating a new DeviceID data 30, and associating the new DeviceID data 30 with the user information obtained in step 107. Through the foregoing, remote client system 14 can always be identified by its DeviceID data 30. In step 109, client system 14 and main server system 12 communicate so as to update the master category list, plugins, brand logo information, advertising data and PS-GM-C/L&SC/I-SN information data at the remote client system 14. This is done, for the first time client application software 28 is executed, by searching the main server system 12 for new information that has come into being between the time the installation and/or setup program that the user used to install client system 14 was populated with such data (the "sync" date), and the present time (the server date). The identified information is downloaded to thereby update client system 14. This step ensures that the user of client system 14 has the most up-to-date information in these categories. The method then proceeds to step 110 wherein main client application software 28 is executed.

When the answer to step 106 is "NO," then the method branches to step 112. In step 112, client application determines whether client system 14 is "online." Client system 14 is "online" when the user is connected to the Internet such that client system 14 can communicate with main server system 12. While this basic step are described in greater detail below (FIG. 9), it bears emphasizing that client system 14, in an exemplary embodiment, will not force a connection to Internet 16. Rather, if there is no "online" connection, the user of client system 14 will have access to PS-GM-C/L&SC/I-SN information in an "offline" mode of operation. Thus, if the answer to step 112 is "NO," then the method branches to step 110. Otherwise, when the answer step 112 is "YES," then the method branches to step 114. In step 114, main server system 12 identifies the remote client system 14 based on a DeviceID data 30 provided by client system 14. In this way, main server system 12 can utilize the information "on file," such as state and zip code, for a variety of purposes. In a constructed embodiment, the state and zip code data are included in a request by front-end server 20 to database server 24 to select a server that will service this user for this session (described in detail in connection with FIG. 10). The response to the request is a virtual IP address to a particular handler 22, and a selected database "name" of a selected database server 24.

In step 116, main server system 12, particularly the assigned handler 22 and database server 24, is updated with any information contained in user history data 34 that has not yet been uploaded and processed. The user history file contains information indicative of actions taken by, or, events occurring in response to actions taken by, the user of remote client system 14. As described above, user history data 34 contains information such as the identity of PS-GM-C/L&SC/I-SN information selected, PS-GM-C/L&SC/I-SN information printed, advertising impressions displayed in advertising pane 72, etc. The assigned handler 22 in conjunction with database server 24 uses the user history file in at least two ways: (i) to produce data from which a user script can be built by the remote client system 14 and, (ii) to update the user transaction history database 60, which can then be queried to prepare reports that are provided as feedback to the various advertising sponsors, PS-GM-C/L&SC/I-SN information issuers, and PS-GM-C/L&SC/I-SN information referral agents.

Step 118 involves obtaining a client script for execution by client system 14. Step 118 includes the substep of identifying PS-GM-C/L&SC/I-SN information at main server system 12 suitable for the user. What is suitable for any particular user can be based on DeviceID data 30, the user information associated with DeviceID data 30, the main PS-GM-C/L&SC/I-SN information categories selected by the user, the OS platform (e.g., MAC OS vs. Windows), the version of client application software 28, the cobrand ID, and the promotional code, if any. Use of these criteria can be either inclusive and/or exclusive. Client system 14 can be sent lists of undownloaded PS-GM-C/L&SC/I-SN information, undownloaded ads, etc. The lists can only identify, for example, the PS-GM-C/L&SC/I-SN information to be downloaded (not the PS-GM-C/L&SC/I-SN information itself). Steps 120, 122, and 124 involve obtaining the actual PS-GM-C/L&SC/I-SN information data, ad data, etc.

In step 120, the master category list, plugins, and brand logo information is updated, based on execution of the client script by client system 14. Particularly, client system 14 works through the list of needed items. In step 122, advertising data comprising advertising impressions from advertising database 52 are updated at the remote client system 14. This step ensures that the user has the most up-to-date advertising available. Again, client system 14 works through a list of needed ads, sequentially making requests from database server 24. In step 124, PS-GM-C/L&SC/I-SN information data from PS-GM-C/L&SC/I-SN information database 50 is updated at remote client system 14. Updating of the PS-GM-C/L&SC/I-SN information data includes retrieving PS-GM-C/L&SC/I-SN information data corresponding to the identified PS-GM-C/L&SC/I-SN information (i.e., the list provided as part of the client script).

In FIG. 5, a diagrammatic and block diagram view of a system for controlling the number of clicks to a clickable advertisement is shown, according to an exemplary embodiment. The system for controlling the number of clicks to a clickable advertisement includes additional features, such as an access module 37 and a web printout 49, according to an exemplary embodiment. Client application software 28, DeviceID data 30, user preferences 32, user history data 34, advertising data 38 and the other features listed in FIG. 1 operate in a similar manner as detailed in the description of FIG. 1.

Figure 6:
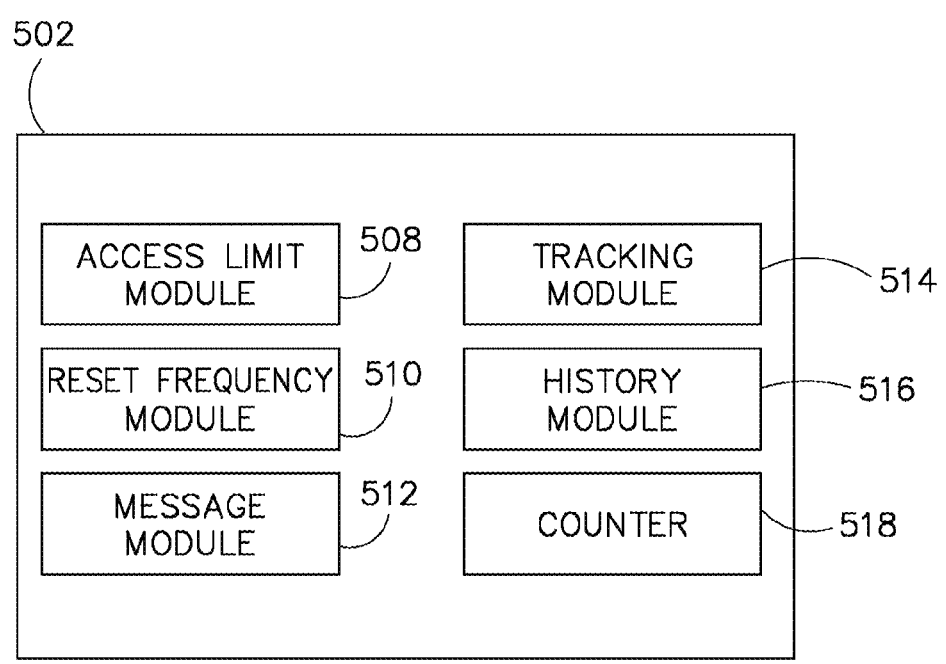
FIG. 6 is a block diagram showing, in greater detail, the system for controlling the number of clicks to a clickable advertisement shown in FIG. 5, according to an exemplary embodiment.

In FIG. 6, a block diagram of the system for controlling the number of clicks to a clickable advertisement shown in FIG. 5 is shown, according to an exemplary embodiment. The system for controlling the number of clicks to a clickable advertisement can include a processing circuit 502. Processing circuit 502 can include an access limit module 508, a reset frequency module 510, a message module 512, a tracking module 514, a history module 516 and a counter module 518, according to exemplary embodiments. Access limit module 508 can be configured to limit the amount of times an advertisement, website, and/or PS-GM-C/L&SC/I-SN information can be accessed. The amount of times an advertisement, website, and/or PS-GM-C/L&SC/I-SN information can be accessed can be determined manually and/or automatically. The manual process can include data entry by a user, system administrator, clerk, etc. The automatic process can include simple and/or complex algorithms, which can for example dynamically change the access limit based on inputs, such as time of day, time passed since last access attempt, advertising campaign strategy and timing, etc. It should be noted that any algorithm that is known to a person of ordinary skill in the art is hereby incorporated into this disclosure. One and/or more components of processing circuit 502 can be operable on client system 14, website server 16, and/or both. The term processing circuit and processor can be used interchangeably. In an exemplary embodiment, counter module 518 monitors the number of times the advertisement, website, and/or PS-GM-C/L&SC/I-SN information has been accessed. Processing circuit 502 compares the number of times the advertisement, website, and/or PS-GM-C/L&SC/I-SN information has been accessed to the number of times the user is allowed to access the information based on the data stored in access limit module 508 to determine whether access should be granted.

In an exemplary embodiment, reset frequency module 510 is configured to reset the number of times the advertisement, website and/or PS-GM-C/L&SC/I-SN information has been access based on predetermined timeframe. For example, access limit module 508 can be set to limit the access to the advertisement, website, and/or PS-GM-C/L&SC/I-SN information to three times. However, reset frequency module 510 is configured to reset the number of times the advertisement, website, and/or PS-GM-C/L&SC/I-SN information has been accessed to zero every twenty-four hours. Therefore, the advertisement, website, and/or PS-GM-C/L&SC/I-SN information can be accessed up to three times every twenty-four hours. It should be noted that any reset time interval can be utilized and that reset frequency module 510 can be configured to increment access limit module 508. For example, access limit module 508 can be set to allow access three times. After a predetermined timeframe (e.g., twenty-four hours) has past, reset frequency module 510 can be configured to increment access limit module 508 to allow access six times.

In an exemplary embodiment, message module 512 is configured to transmit various messages. These messages can include access denial messages, access allowed messages, system status messages, promotional messages, informational messages, and/or system reporting messages. In an exemplary embodiment, history module 516 is configured to store a history of all advertisement, website, and/or PS-GM-C/L&SC/I-SN information accessed by the computing device. In an exemplary embodiment, tracking module 514 is configured to analyze the data stored in history module 516 to determine any patterns in the coupons, mobile services, products & services, clickable advertisements & mobile advertisements by geo-target location, daily deal coupons and free or discounted printable coupons, products & services, clickable advertisements & mobile advertisements by geo-target location from merchants, business owners, B2B business directory, retailers and major brands around the world, and allows users to engage in geo-target location-based social networking integration & mobile services, mobile advertisements, mobile text, mobile SMS marketing, mobile search, mobile multimedia, mobile operating system, mobile device, mobile banking, mobile payment, mobile wallet and/or electronic payments, mobile wallet, mobile express checkout, mobile money transfer, mobile social media widgets, mobile keywords, mobile coupons, mobile instant messaging marketing, mobile voting, mobile eCards, mobile short codes, mobile commerce, mobile shopping, mobile push content, geo-mobile, geo-social, coupons, mobile services, products & services, clickable advertisements & mobile advertisements by geo-target location, daily deal coupons and free or discounted printable coupons, products & services, clickable advertisements & mobile advertisements by geo-target location from merchants, business owners, B2B business directory, retailers and major brands around the world on its website, and/or PS-GM-C/L&SC/I-SN information accessed by the computing device that indicate misuse, fraud and/or other behavior warranting further evaluation.

Processing circuit 502 can be implemented with digital and/or analog components, such as one and/or more processors and/or logic devices, such as a complex instruction set computer (CISC) microprocessor, a reduced instruction set computing (RISC) microprocessor, a very long instruction word (VLIW) microprocessor, a processor implementing a combination of instruction sets, and/or other processor device. In one embodiment, for example, processing circuit 502 can be implemented as a general purpose processor, such as a processor made by Intel® Corporation, Santa Clara, Calif. Processing circuit 502 can also be implemented as a dedicated processor, such as a controller, microcontroller, embedded processor, a digital signal processor (DSP), a network processor, a media processor, an input/output (I/O) processor, a media access control (MAC) processor, a field programmable gate array (FPGA), a programmable logic device (PLD), and so forth.

Figure 7:
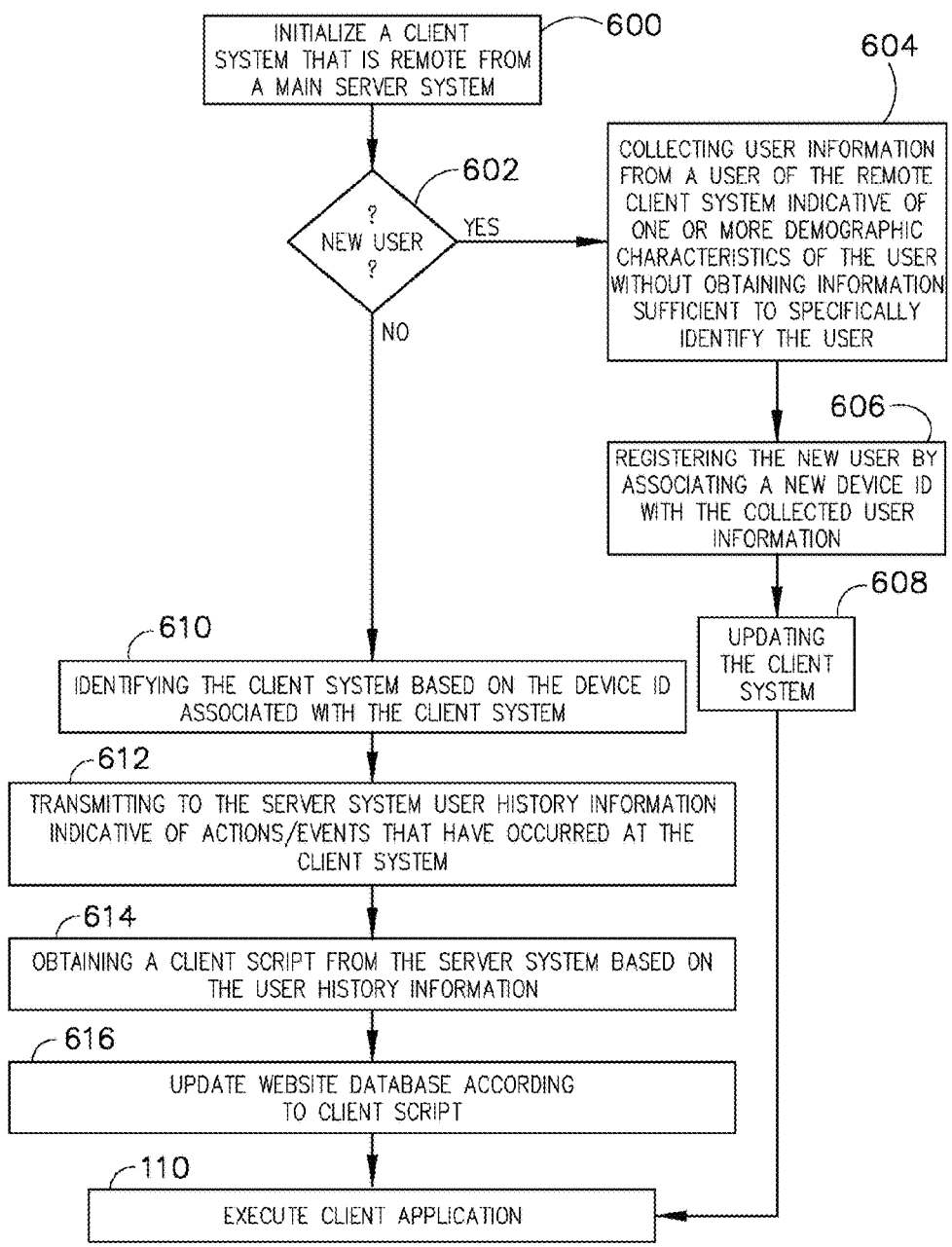
FIG. 7 is a simplified flowchart diagram view illustrating interactions between the client system, and the main server system, according to an exemplary embodiment.

In FIG. 7, a flowchart diagram view illustrating interactions between client system 14, and main server system 12 is shown, according to an exemplary embodiment. The process is started by initializing client system 14 that is remote from main server system 12 (step 600). The system determines whether the user is a new user (step 602). If the user is a new user device, then the system collects user information from a user of remote client system 14 indicative of one and/or more demographic characteristics of the user without obtaining information sufficient to specifically identify the user (step 604). The system registers the new user device by associating a new DeviceID data 30 with the collected user information (step 606). The system updates client system 14 (step 608). If the user is not a new user, then the system identifies client system 14 based on DeviceID data 30 associated with client system 14 (step 610). The system transmits to main server system 12 user history information indicative of actions/events that have occurred at client system 14 (step 612). The system obtains a client script from the server system based on the user history information (step 614). The system updates the website database according to client script (step 616). The system executes client application software 28 (step 616).

Figure 8:
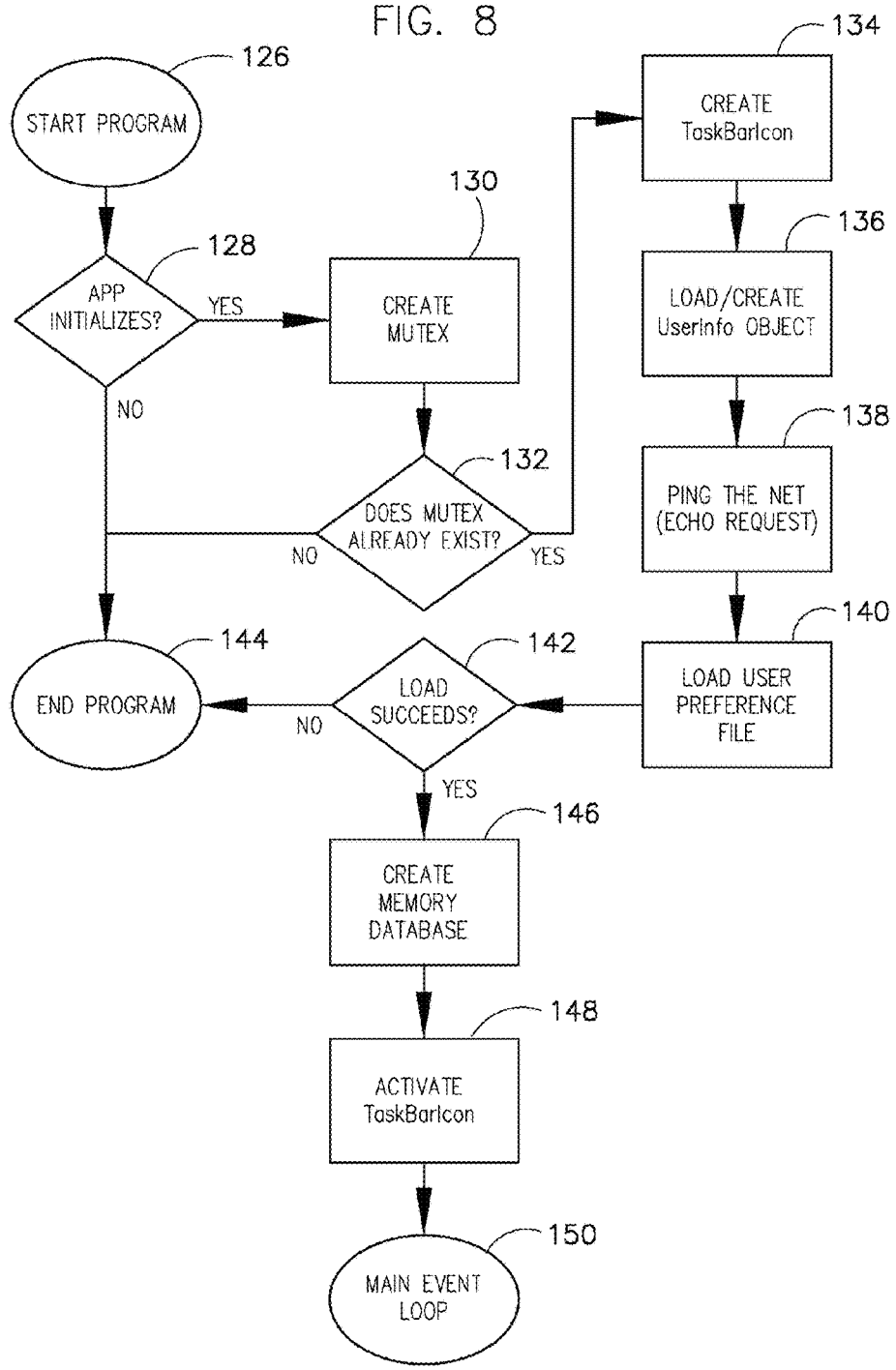
FIG. 8 is a simplified flowchart diagram view showing, in greater detail, the initial steps illustrated in FIG. 4 for system initialization, according to an exemplary embodiment.

FIG. 8 shows steps 104, 106, 107 and 112 of FIG. 4 in greater detail. The method begins in step 126 with initiation of client application software 28. In step 128, if client application software 28 properly initializes, then the method branches to step 130. Otherwise, the method branches to step 144 where execution of client application software 28 ends. In step 130, a "mutex" is created by client application software 28. "Mutex" stands for "mutually exclusive." Programs and/or code segments that establish a mutex prevent other programs and/or code segments from running if they try to establish a mutex with the same ID. Client application software 28 employs mutex functionality in the Microsoft Operating system to ensure that only one instance of client application software 28 is running on any given client system 14. A second instance would be denied use of the mutex, and that instance would then exit. In step 132, a test is performed to determine whether the mutex already exists. If the answer is "NO" the method branches to step 144 where client application software 28 ends. However, if the response to the inquiry in step 132 is "YES," then the method branches to step 134.

In step 134, taskbar icon 102 is created by client application software 28. The taskbar icon 102 is graphically illustrated in FIG. 3B. As described above, a quasi-flashing taskbar icon 102, in an exemplary embodiment, is a visual alert to the user of client system 14 that new PS-GM-C/L&SC/I-SN information and/or offers are available for browsing. The method then proceeds to step 136. In step 136, a User Info object is loaded (if it already exists) and/or created (if it does not already exist). If this is the first time the client application software 28 has been executed, the User Info object must be created. As described above, the User Info object includes DeviceID data 30, demographic data, proxy server information, if any and software version number. This information can be stored, for example, on a hard drive portion of client system 14. The method then proceeds to step 138.

In step 138, client system 14 transmits an echo request to main server system 12, which is received by front-end server 20. Inasmuch as client system 14 can be connected to the Internet in a variety of logically and physically different configurations (e.g., dial-up connection, proxy server, hidden proxy server such as in the case of AOL, etc.), step 138 is provided to ensure a virtual channel for messaging between client system 14 and main server system 12. The method then proceeds to step 140. In step 140, a user preference file containing user preference data 32 is loaded into the memory of client system 14 for use by client application software 28. Initially, a default set of information is used, in which all PS-GM-C/L&SC/I-SN information categories are selected and the refresh interval is set to 4 hours. The method then proceeds to step 142.

In step 142, a test is made by client application software 28 to determine whether the user preference file has loaded successfully. If the answer to this inquiry is "NO," then the method branches to step 144 ("end program"). This can occur when the user preference file has been deleted, for example. On the other hand, if the answer to step 142 is "YES," then the method branches to step 146. In step 146, a memory database is created for maintaining user history events. This database is configured to contain the user actions taken by the user, ad impression displayed, etc., and to store the same for later transmittal to main server system 12 as user history data 34.

In step 148, taskbar icon 102 (FIG. 3B) is activated. This provides a visual cue to the user that client application software 28 is available, and, that PS-GM-C/L&SC/I-SN information lists can be browsed, PS-GM-C/L&SC/I-SN information selected and printed out, and/or any other function available on client application software 28. Under certain circumstances, taskbar icon 102 alerts the user to new PS-GM-C/L&SC/I-SN information and/or offers.

In step 150, client application software 28 begins main event loop processing. In main event loop processing, certain action, such as, for example, selecting a main PS-GM-C/L&SC/I-SN information category, selecting PS-GM-C/L&SC/I-SN information subcategory, selecting a particular PS-GM-C/L&SC/I-SN information, displaying PS-GM-C/L&SC/I-SN information, printing PS-GM-C/L&SC/I-SN information, refreshing the local PS-GM-C/L&SC/I-SN information database, etc., can be initiated by the user and detected and executed by client application software 28. While the program in accordance with an exemplary embodiment can be invoked manually by user of client system 14, many operating systems, notably Windows 95/98, allow the user to specify that the execution of client application software 28 should occur on startup of the computer on which client system 14 resides. Accordingly, without any further intervention by the user, upon each startup of client system 14, client application software 28 will initialize.

Figure 9:
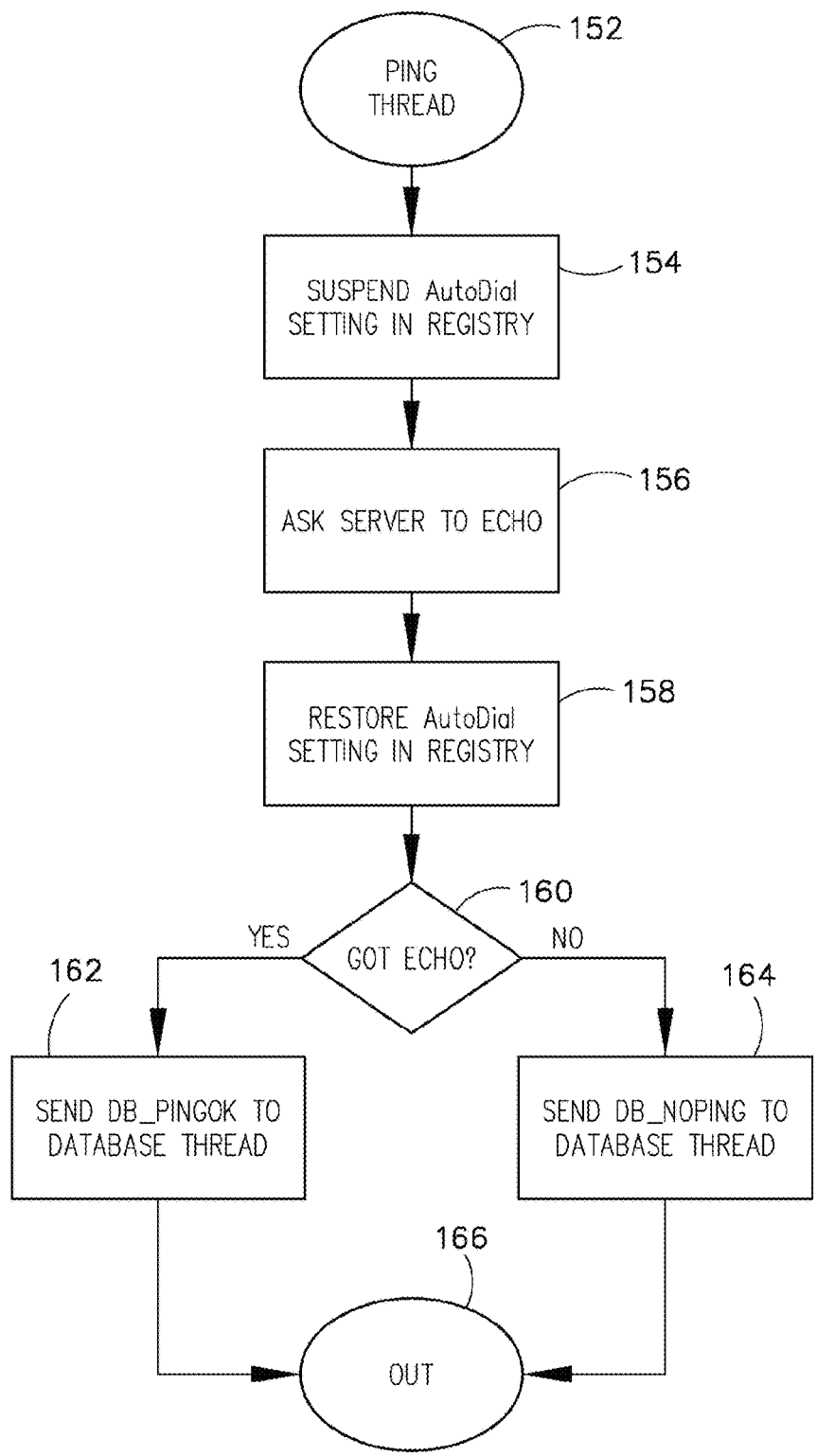
FIG. 9 is a simplified flowchart diagram view showing, in greater detail, an echo request step shown in block diagram form in FIG. 8, according to an exemplary embodiment.

FIG. 9 shows step 138 of FIG. 8 (the "echo request" and/or "ping the net" step) in greater detail. Execution of the method begins in step 152 wherein the "ping thread" portion of client application software 28 commences execution. If client system 14 is not "online," client application software 28 will not force an Internet connection. Thus, in step 154, client application software 28 suspends the "AutoDial" setting in the Windows registry. This ensures that the echo request to front-end server 20 does not automatically cause a dialog window to be presented to the user asking for ISP Identification and Password information. In step 156, client system 14 through execution of client application software 28, transmits a request to front-end server 20 to echo. The nature of the requested "echo" can simply be a return transmittal of an acknowledgement from front-end server 20. In step 158, the "AutoDial" setting is restored in the Windows registry.

In step 160, the ping thread performs a test to determine whether the requested "echo" was received by way of a return transmission from front-end server 20. If the answer to this inquiry is "YES," then the method branches to step 162, wherein a positive indication that an echo response to the echo request was returned to the client system ("DB_PINGOK") is generated. The positive indication is provided to client application software 28 (particularly, a database thread portion thereof). Otherwise, if no echo was received from front-end server 20, then a negative indication ("DB_NOPING") is sent to the database thread in step 164. In either case, control from steps 162 and 164 both proceed to step 166, which is an exit step from the ping thread portion of client application software 28.

Figure 10:
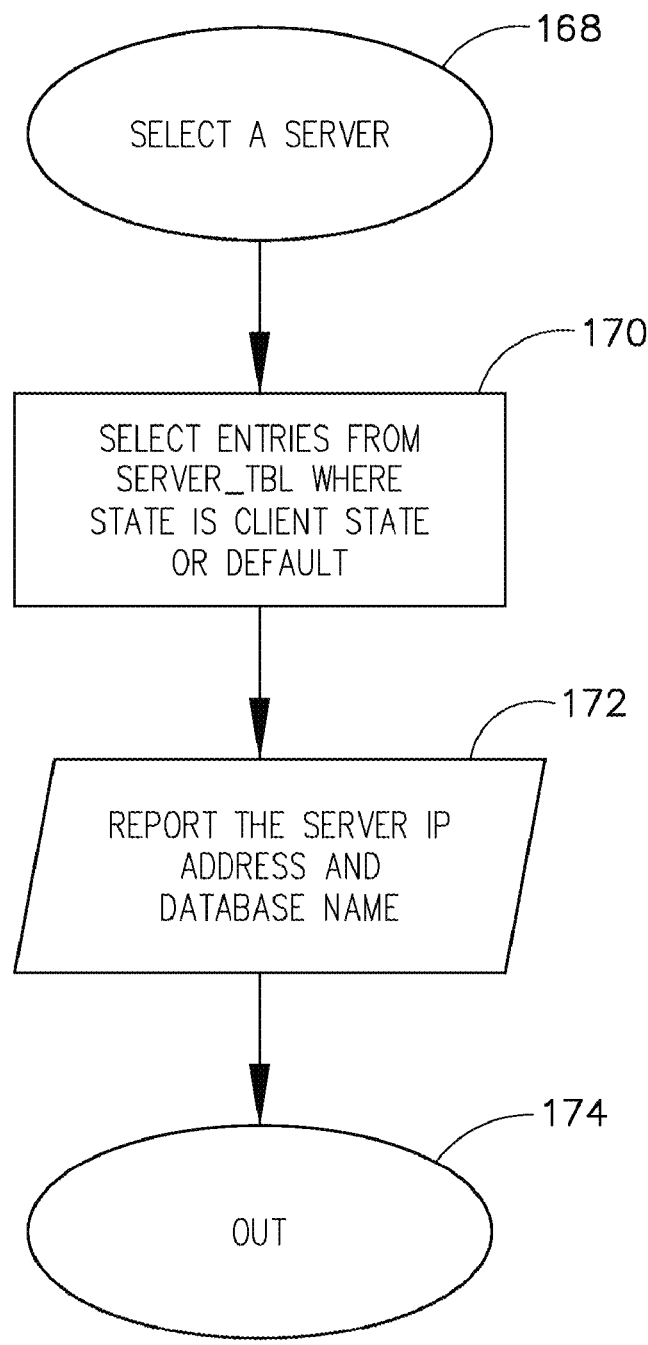
FIG. 10 is a simplified flowchart diagram view showing a server selection routine performed at the main server system, according to an exemplary embodiment.

FIG. 10 shows in detail the steps performed by main server system 12, particularly front-end server 20, in requesting that an appropriate handler 22 and database server 24 be selected for servicing client system 14. This "server select" operation occurs immediately after a successful "echo request" operation (FIG. 9). A plurality of database servers 24 can be deployed, the particular number of which is selected to match the quantity of incoming requests ("load") from the multiplicity of client systems 14 installed remotely. Step 168 marks the beginning of the method. At this point, main server system 12 has in its possession at least the demographic information previously collected (e.g., state and zip code) even if it is a "new user" with no assigned DeviceID data 30 yet. The database server receives the request. The method then proceeds to step 170.

In step 170, a database server 24 routine selects entries from a server table where the state in the table matches the state of residence provided by client system 14. The table entry information defines the logical entities that will service this client system 14.

In step 172, an Internet Protocol (IP) address and a database name are reported over Internet 16 to client system 14. Subsequent requests during this session from client system 14 regarding requests for updated data and the like are sent in a message addressed to the selected server IP address (which points to a handler 22), and will include in that message the selected database name, which logically maps to entries selected in step 170 (e.g., these can be various advertisement databases 52, PS-GM-C/L&SC/I-SN information databases 50, etc.). The selected IP address, in-effect, is a virtual IP address since there are a plurality of database servers 24, perhaps arranged in a cluster, that are physically provided in order to provide the desired load carrying capacity. The routing function is performed on main server system 12, by handler 22 in a manner known to those of ordinary skill in the art. The method ends in step 174.

Figure 11:
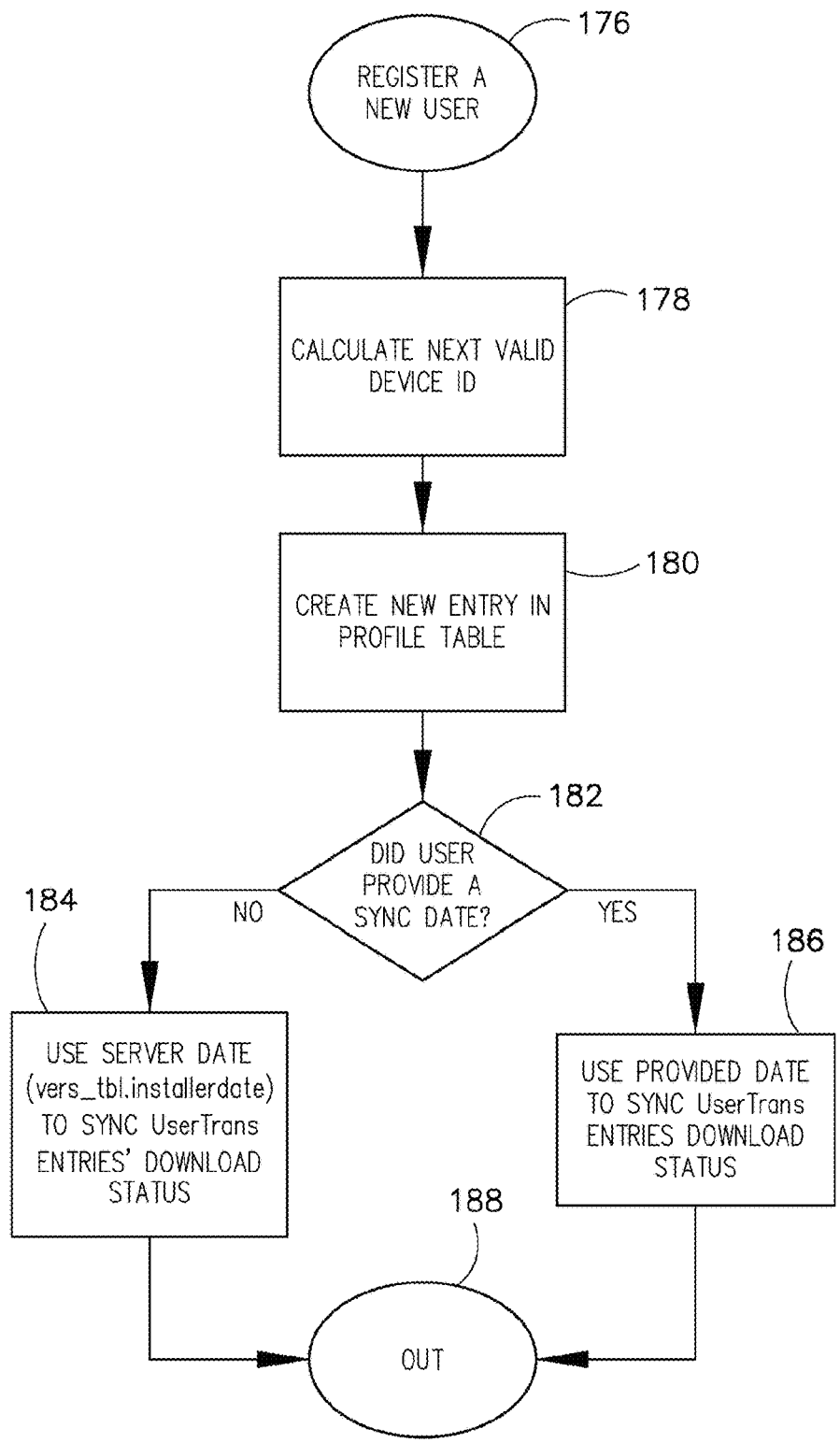
FIG. 11 is a simplified flowchart diagram view showing the steps for registration of a new user on the main server system, according to an exemplary embodiment.

FIG. 11 shows the steps performed on main server system 12 to register a new user device. The process begins in step 176 with commencement of the registration routine. In step 178, a new DeviceID data 30 is calculated by database server 24. In step 180, a new entry and/or record is created in a user profile table. The profile entry will associate DeviceID data 30 with the user information collected from the user. The method then proceeds to step 182. In step 182, database server 24 determines whether a "sync date" was provided from client system 14. This is a date that describes how "up-to-date" client system 14 is, particularly the PS-GM-C/L&SC/I-SN information and advertising information portions thereof. The use of the sync date has been described above in connection with FIG. 4. This "sync date" is automatically provided from client system 14 to database server 24 via the assigned handler 22. If a "sync date" was not provided by client system 14, then the method branches to step 184 where a nominal sync date based on the version of the software installed on the client system is used for downloading and updating purposes. Alternatively, if the answer to step 182 is "YES," then the method branches to step 186.

In step 186, the date provided by client system 14 is used as the "sync date" to synchronize the data on client system 14 relative to the master data on main server system 12. It should be emphasized that the "sync date" is not a date that client application software 28 solicits from the user, but rather, is simply a date available within client application software 28 relating to how "current" the data is (i.e., PS-GM-C/L&SC/I-SN information/advertising data, etc.). In either case, the method proceeds to and ends at step 188.

Figure 12:
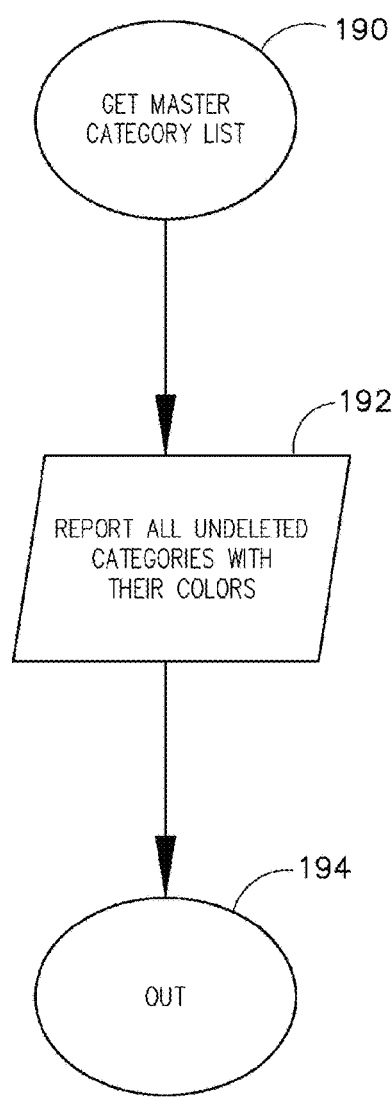
FIGS. 12-14 are simplified flowchart diagram views showing, in greater detail, the steps of updating the master category list, plugins, and brand logo information, respectively, that are shown in block diagram form in FIG. 4, according to an exemplary embodiment.

FIGS. 9, 10 and 11 show step 120 (FIG. 4) in greater detail. Referring to FIG. 12, step 190 represents a request to obtain a master category list (i.e., the up-to-date list). This request is made from client system 14 to the selected database server 24 via handler 22. Such a request is directed to the selected "virtual" IP address as described above. The master PS-GM-C/L&SC/I-SN information category list (e.g., "Athletics," "Automotive," "Internet Electronics," etc.) can be updated on main server system 12, particularly database server 24. That is, categories can be added, and/or categories can be deleted. In either case, such a change are reflected in user interface 62 of the respective client systems 14 when the next session is invoked by a user.

In step 192, all undeleted master PS-GM-C/L&SC/I-SN information categories, along with their display color (as displayed on display device 40 of client system 14) are reported out to client system 14 for use by client application software 28. Step 194 ends the master PS-GM-C/L&SC/I-SN information category list updating process.

Figure 13:
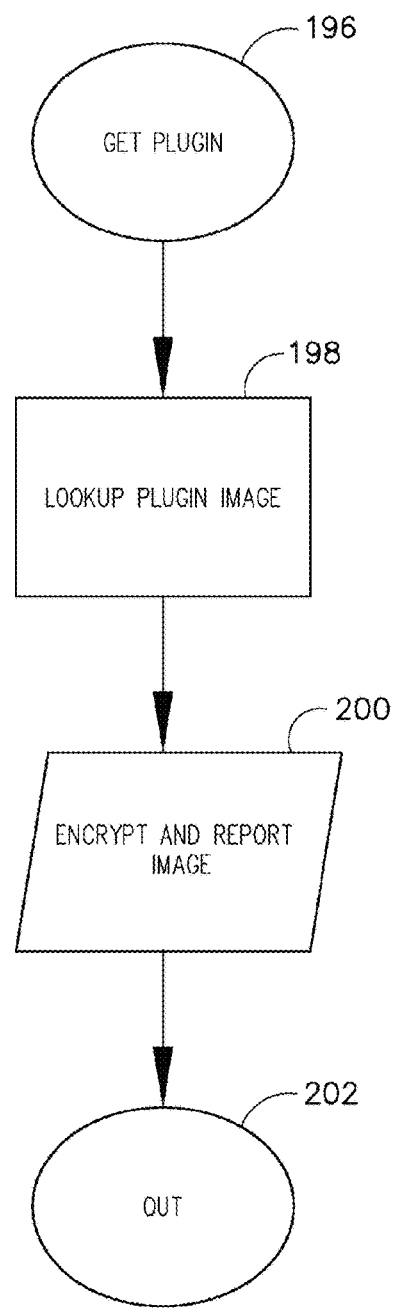

Referring now to FIG. 13, step 196 represents a request from client system 14 to database server 24 via handler 22 to obtain a new and/or an up-to-date plug-in(s). It should be understood that for an existing user, client system 14 can be executing a client script that includes a list containing needed plugins. The process outlined in FIG. 13 would be executed for each plug-in on the list. In step 198, database server 24 performs a look-up of the needed plug-in to locate the corresponding plug-in file (or image).

In step 200, an "image" and/or copy of the file of the sought-after plug-in is encrypted in accordance with a server system encryption strategy, and is reported and/or transmitted via Internet 16 to client system 14. In step 202, the plug-in update process is completed.

Figure 14:
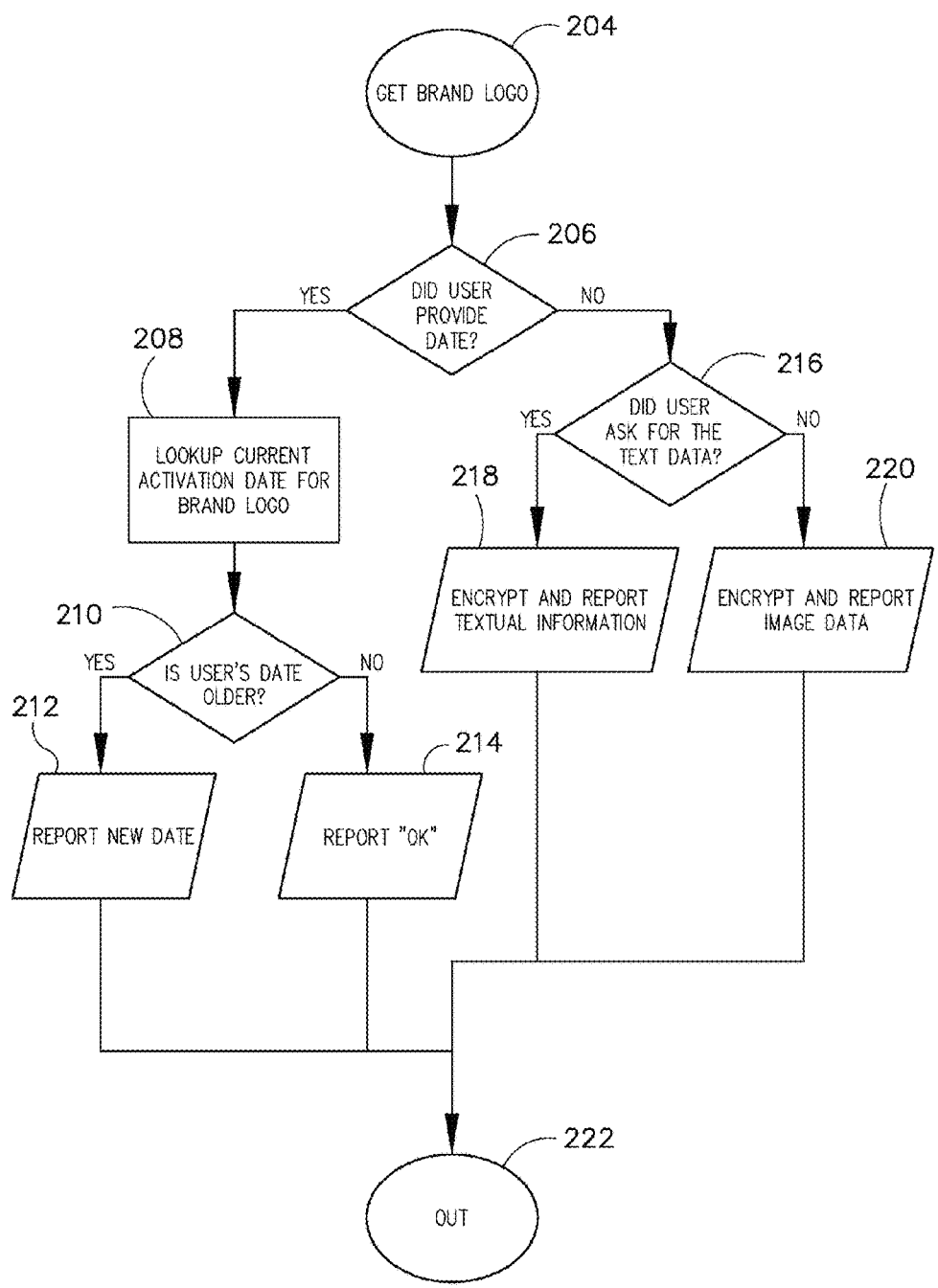

Referring now to FIG. 14, steps 204-222 illustrate the steps involved in determining whether to maintain a default brand logo in logo pane 74 (FIG. 3A), or, in the alternative, whether to download a different brand logo. While a default brand and/or company logo is associated with client system 14 initially, the default can be changed. For example, a user of Internet 16 can be informed of the existence of PS-GM-C/L&SC/I-SN information distribution system 10 by a third-party vendor who also maintains a website, and refers that Internet user to website server 18 of main server system 12. The referral mechanism, a hyperlink and/or the like to website server 18, appends the identification of the referring vendor to the HTTP reference (the ID herein referred to as the "cobrand ID"). Website server 18 is configured to recognize and respond to such appended data (the cobrand ID) by putting a "cookie" (i.e., a file used by Internet browser programs) on such Internet users and members' computer system that contains the cobrand ID. Then, if such potential user of PS-GM-C/L&SC/I-SN information distribution system 10 decides to download and install the client software, the client installation software will search for the "cookie." If it finds the "cookie," and certain other qualifying criteria are satisfied, then the cobrand ID are passed to main server system 12 upon installation with a request to download the text and/or image data of the other (non-default) brand logo.

Some client systems 14 are deployed with both a default brand logo, and an alternate brand logo (including text/images), in alternative embodiments. The following steps apply when client application software 28 determines that it should display an alternate brand logo. In step 204, client system 14 requests a brand logo (non-default). The process proceeds to step 206. In step 206, database server 24 determines whether client system 14 provided a date along with the request for the alternate brand logo. If so, then client system 14 already has the text/images corresponding to the brand logo and just needs to determine whether to turn the requested brand logo "on" at client system 14.

Thus, if the answer to step 206 is "YES," then the method branches to step 208. In step 208, database server 24 conducts a look-up to determine an activation date for the subject brand logo. The method then proceeds to step 210. In step 210, database server 24 determines whether the client-provided date is "older" than the current activation date. If "YES," then the method branches to step 212, where the new activation date is reported out to client system 14. Client system 14 will therefore defer activation of the alternate, non-default brand logo until such new date. Otherwise, the method branches to step 214, where database server 24 reports an "ok" to client system 14. Client system 14 will then implement (i.e., display) the brand logo corresponding to the cobrand ID.

When the method branches to step 216, (a "NO" to step 206), database server 24 performs another test to determine whether client system 14 asked for text corresponding to the cobrand ID. If "YES," then the method branches to step 218, where the textual information is encrypted according to a server system encryption strategy, and reported out to client system 14. Otherwise, step 220 is performed, where image data corresponding to the cobrand ID is encrypted (according to a server system encryption strategy), and reported to client system 14. The method ends in step 222.

Figure 15:
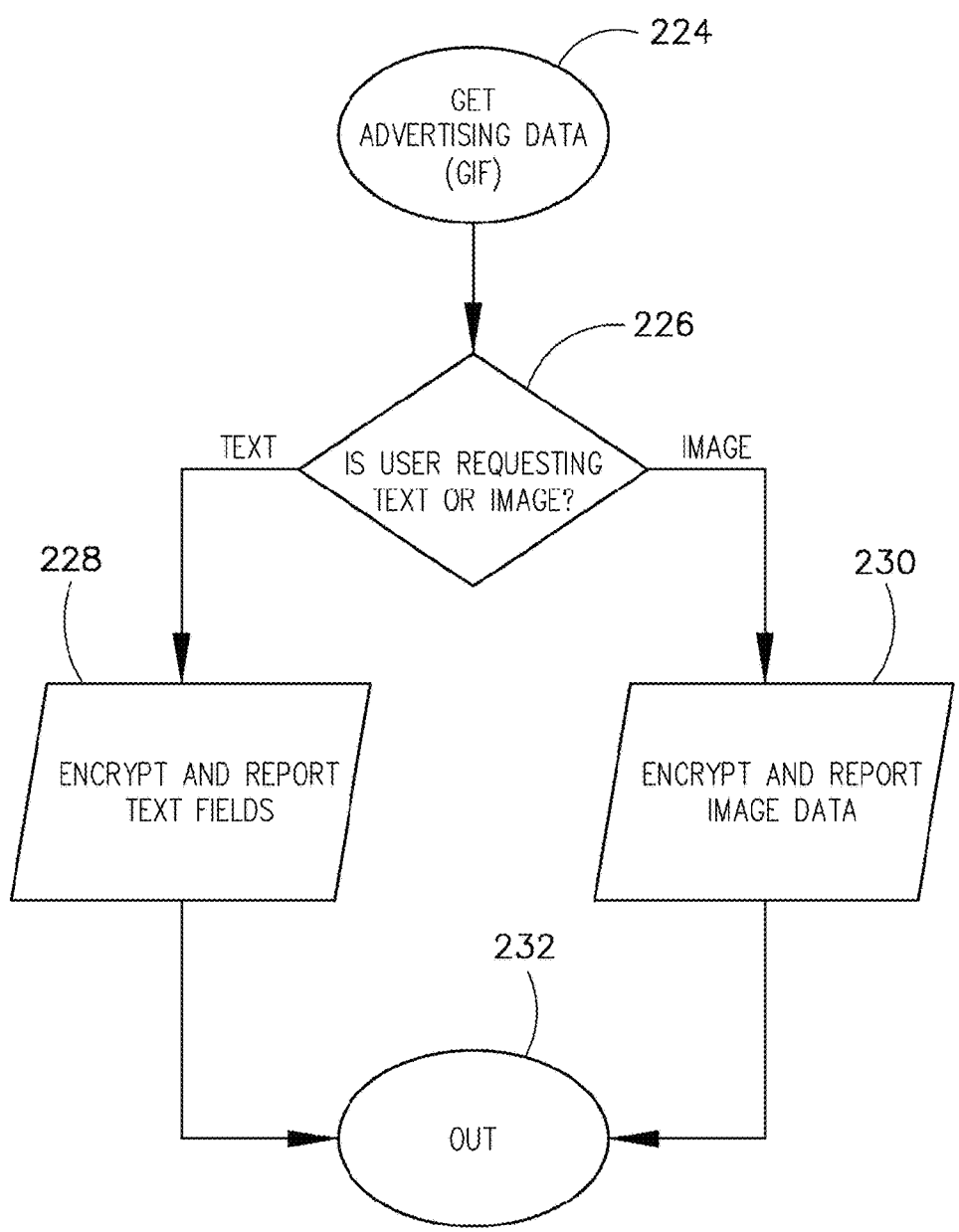
FIG. 15 is a simplified flowchart diagram view showing, in greater detail, the step of updating advertising data that is shown in block diagram form in FIG. 4, according to an exemplary embodiment.

FIG. 15 shows step 122 ("updating advertising data") of FIG. 4 in greater detail. In particular, steps 224-232 illustrate, in accordance with the present disclosure, that advertising text, and images are encrypted to thereby provide secure transmission to client system 14. It should be understood that for an existing user device, client system 14 can be executing a client script that includes a list containing needed advertising impressions. The process outlined in FIG. 15 would be executed for each advertising impression on the list. Step 224 marks the beginning of the advertising update method.

In step 226, main server system 12 determines whether the user, more particularly client system 14, is requesting "text" and/or "image" advertising data. If the answer is "text," then the method proceeds to step 228. In step 228, main server system 12, particularly database server 24, encrypts the text of the advertising data, and reports out the resulting encrypted advertising data. It should be understood this encryption occurs in accordance with a server system encryption strategy.

Otherwise, the method proceeds to step 230 when the advertising data requested is "image" data. In step 230, the advertising data ("image" data) is encrypted by main server system 12 according to a main server system encryption strategy, resulting in encrypted advertising image data. The encrypted ad image data is then reported out to client system 14. Step 232 defines the end of the advertising update process.

Figure 16:
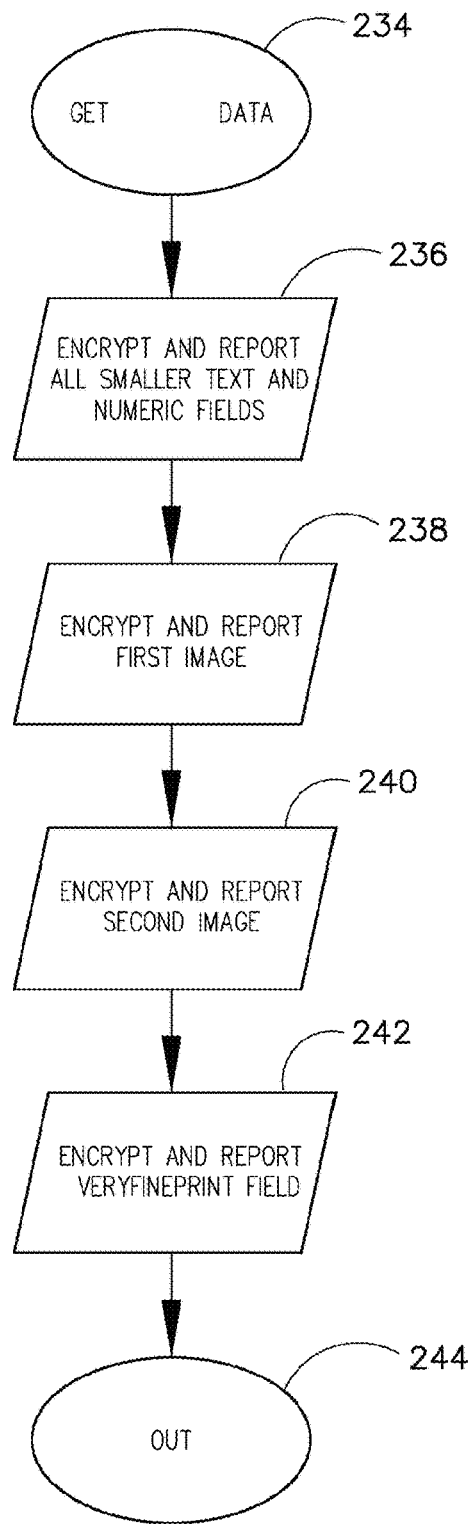
FIG. 16 is a simplified flowchart diagram view showing, in greater detail, the step of updating PS-GM-C/L&SC/I-SN information data that is illustrated in block diagram form in FIG. 4, according to an exemplary embodiment.

FIG. 16 illustrates, in greater detail, step 124 in FIG. 4 ("updating PS-GM-C/L&SC/I-SN information data"). It should be understood that for an existing user device, client system 14 can be executing a client script that includes a list containing needed PS-GM-C/L&SC/I-SN information data. The process outlined in FIG. 16 would be executed for each PS-GM-C/L&SC/I-SN information on the list.

Steps 234-244 illustrate that PS-GM-C/L&SC/I-SN information text and image data are encrypted in accordance with a server system encryption strategy prior to transmission to client system 14, resulting in encrypted PS-GM-C/L&SC/I-SN information data. It bears emphasizing that the steps 234-244 in FIG. 16, occur at main server system 12. Since the PS-GM-C/L&SC/I-SN information data is encrypted, even if intercepted, the actual PS-GM-C/L&SC/I-SN information cannot be easily recovered and reprinted. This reduces the occurrence of fraud. In step 234, client system 14 issues a request to get a particular PS-GM-C/L&SC/I-SN information. In step 236, database server 24 encrypts and reports (to client system 14) all smaller text and numeric fields. In steps 238 and 240, database server 24 encrypts and reports, respectively, first and second images associated with the requested PS-GM-C/L&SC/I-SN information. In step 242, the very fine print portions of the requested e-PS-GM-C/L&SC/I-SN information and/or e-coupon in encrypted and reported out to client system 14. Step 244 is an exit step.

Figure 17:
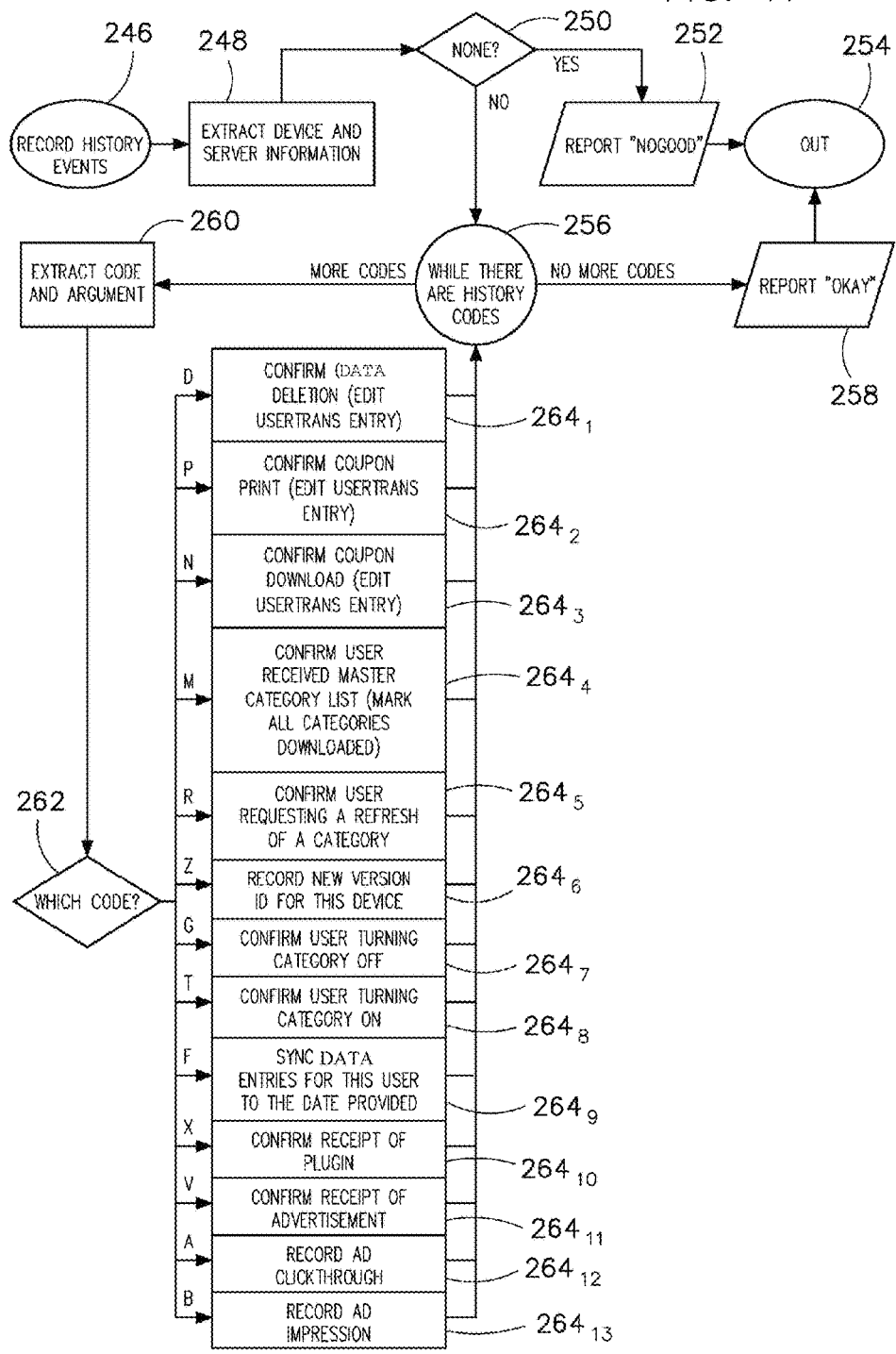
FIG. 17 is a simplified flowchart diagram view showing, in greater detail, the step of updating the main server system with a user history file that is shown in block diagram form in FIG. 4, according to an exemplary embodiment.

FIG. 17 shows, in greater detail, step 116 of FIG. 4 ("transmitting to the server system user history information"). Steps 246-264 occur principally on main server system 12, more particularly, between handler 22 and database server(s) 24. Prior to step 246, client system 14 sends a message to database server 24 containing the user history data 34. Step 246 marks the beginning of the process used by main server system 12 in recording the events contained in the user history data 34.

In step 248, the user and server information is extracted from the user history data 34. This information is used in updating the user transaction records associated with the identified user of PS-GM-C/L&SC/I-SN information distribution system 10. The information developed in this process is also used to generate a client script that are described in further detail. In step 250, a test is made to determine whether there is any user and server information in the user history file. If the answer to this inquiry is "NONE," then flow of the process proceeds to step 252 where an indictor "NO GOOD" is reported out. Flow of the process then continues to step 254 where the process exits. On the other hand, if user and server information is successfully extracted from the user history file, flow of the process continues at step 256. In step 256, a "WHILE DO" process structure is established. Method steps 256, 260, 262, and 264 are continuously repeated while there are new history codes remaining to be read-out and extracted from the user history data 34.

In step 260, the next history code is extracted along with any arguments pertaining thereto. Flow of the process then proceeds to step 262, and 264 where the extracted user history codes are decoded. For example, a user history code designated "F" indicates that PS-GM-C/L&SC/I-SN information entries should be synchronized, for this user to the date so provided as the argument (i.e., to the so-called "sync date"). This is shown in block 2649. As another example, a user history code "B," specifies that an advertising impression described in the argument should be recorded in a user transaction record. This is shown in block 26413. The ad impression, when recorded, can be used thereafter to prepare reports for the sponsor of the advertising impression. Other user history codes involve modification of a user transaction entry. For example, the code "N" indicates a positive confirmation by client system 14 that certain PS-GM-C/L&SC/I-SN information were downloaded successfully. Accordingly, the user transaction entry should be edited to so indicate. In this way, positive feedback is provided as to what PS-GM-C/L&SC/I-SN information have been safely received at the remote client system 14. FIG. 17 specifically identifies thirteen codes, and corresponding responses, respectively designated 264.sub.1-264.sub.13.

Figure 18:
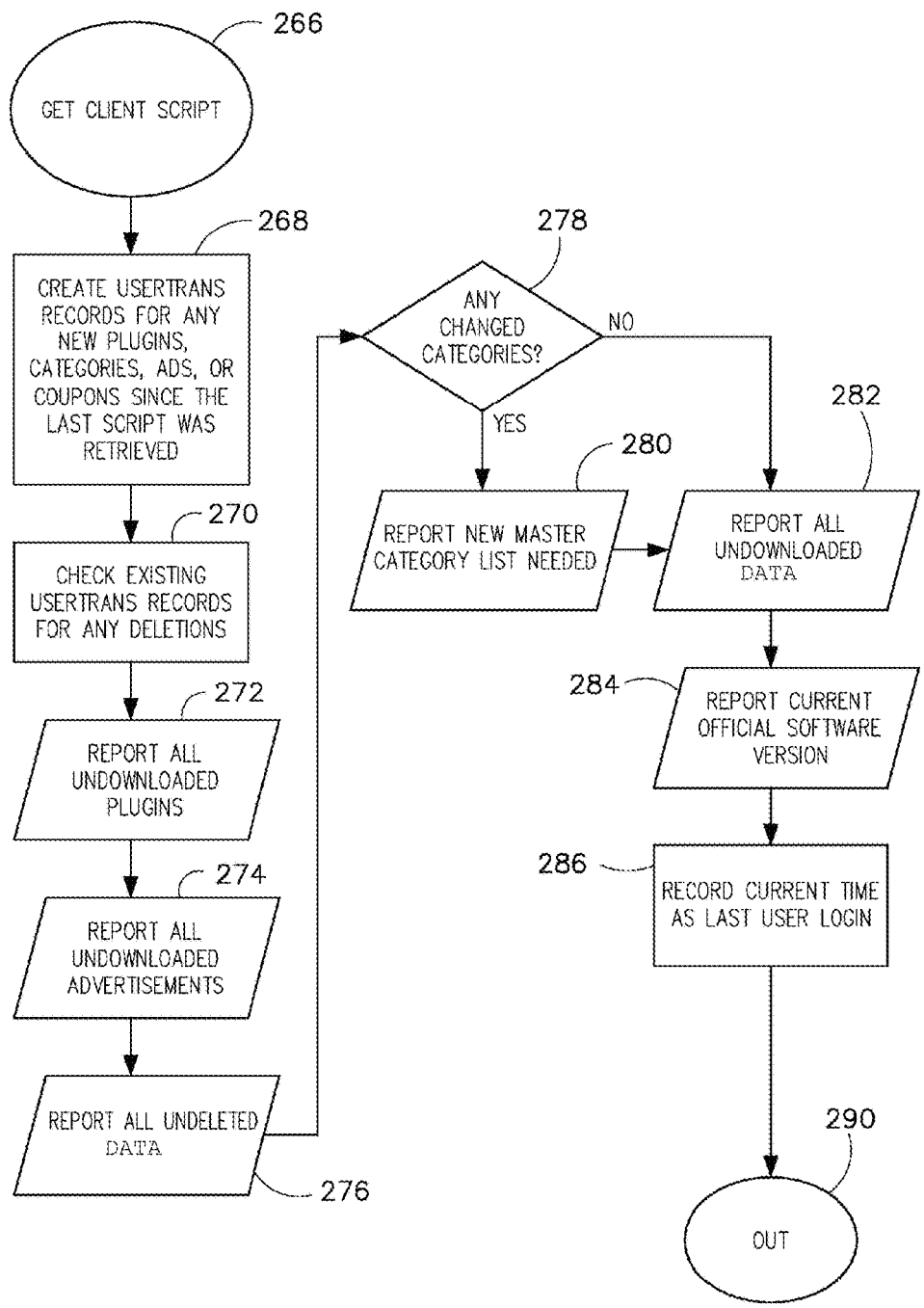
FIG. 18 is a simplified flowchart diagram view showing the steps involved in obtaining a client script, according to an exemplary embodiment.

When the last remaining history code has been extracted and decoded, the "WHILE DO" loop at step 256 fails, and flow of the process proceeds to step 258. In step 258, database server 24 reports an "Okay" message to handler 22. Flow of the process then proceeds to an exit step, designated step 254. Referring now to FIG. 18, after the user history codes from user history data 34 have been extracted and decoded, a "client script" is built by client system 14 based on information (e.g., lists) from handler 22 in cooperation with database server 24. The client script provides instructions for main server system 12 to execute. In step 266, client system 14 issues a request to handler 22 to obtain the "user" and/or "client" script. The client script is then returned to client system 14. Step 268 show the execution of the client script by client system 14, which issues the commands shown in the steps 268-290. In step 268, client system 14 issues commands via handler 22 to database server 24 to create user transaction records for any new plugins, main PS-GM-C/L&SC/I-SN information categories, advertising data, and/or PS-GM-C/L&SC/I-SN information data received by client system 14 since the last client script was retrieved. In step 270, client system 14 issues commands via handler 22 to database server 24 to check existing user transaction records for any deletions. Any deletions are processed whereby the affected user transaction record are modified to indicate that the client PS-GM-C/L&SC/I-SN information has been deleted. In step 272, client system 14, in execution of the client script, issues a command via handler 22 to database server 24 to report all undownloaded plugins. Database server 24, through handler 22, returns a message containing a listing of all undownloaded plugins. This list is processed by client system 14 after the client script has been completed. In step 274, client system 14, in execution of the client script, issues a command via handler 22 to database server 24 to report all undownloaded advertising impressions. Database server 24 returns a list of all undownloaded ad impressions. In step 276, client system 14, in execution of the client script, issues a command via handler 22 to database server 24 to report all undeleted PS-GM-C/L&SC/I-SN information. In step 278, client system 14, in execution of the client script, issues a command via handler 22 to database server 24 to determine whether any of the main PS-GM-C/L&SC/I-SN information categories have been changed. If the answer to this inquiry is "YES," then flow of the process continues at step 280, wherein the database server 24 reports to client system 14 that a new master category list is needed. Flow then proceeds to step 282.

If the answer to the inquiry in step 278 is "NO," then flow of the process proceeds to step 282. In step 282, client system 14, in execution of the client script, issues a command via handler 22 to database server 24 to report all undownloaded PS-GM-C/L&SC/I-SN information. Database server 24 returns a listing of all undownloaded PS-GM-C/L&SC/I-SN information. In step 284, client system 14, in execution of the client script, issues a command via handler 22 to database server 24 to report the current official software version. Database server 24 returns the latest version number. In step 286, database server 24 is requested to record the current time as the last user login. Flow of the process then continues to step 290, which marks the end of the client script execution.

Referring now to FIGS. 16 and 17, upon initial execution of client application software 28, taskbar icon 102 is created, as illustrated in FIG. 3B. Referring particularly now to FIG. 19, steps 292-298 illustrate the steps that client application software 28 performs when the taskbar icon 102 is left double clicked. Step 292 marks the beginning of the process that initiates the display of user interface 62. Step 292 is performed when it is detected that the user has left-double-clicked on taskbar icon 102. In step 294, client application software 28 creates an interface thread, unless user interface 62 has already been created by a preexisting interface thread. In step 296, a user interface open dialog message is sent to interface thread by client application software 28. The result of the execution of steps 294, and 296 results in the display shown in FIG. 3A. In step 298, the process that creates user interface 62 via an interface thread exits.

Referring now particularly to FIG. 20, in step 300, main client application software 28 determines (via the OS, for example) when taskbar icon 102 has been right double clicked and enters the process of steps 300-308. In step 302, the "window" in which main user interface 62 would generally be displayed is hidden from the user (i.e., disappears from the display as viewed on display device 40 of client system 14). In step 304, client application software 28 sends a user interface-end message to the interface thread portion of client application software 28. In step 306, client application software 28 flushes the history (i.e., any unsaved user history actions and/or events are encrypted and written to the user history file). In step 308, client application software 28 shuts down. This removes client application software 28 from client system 14.

Figure 21:
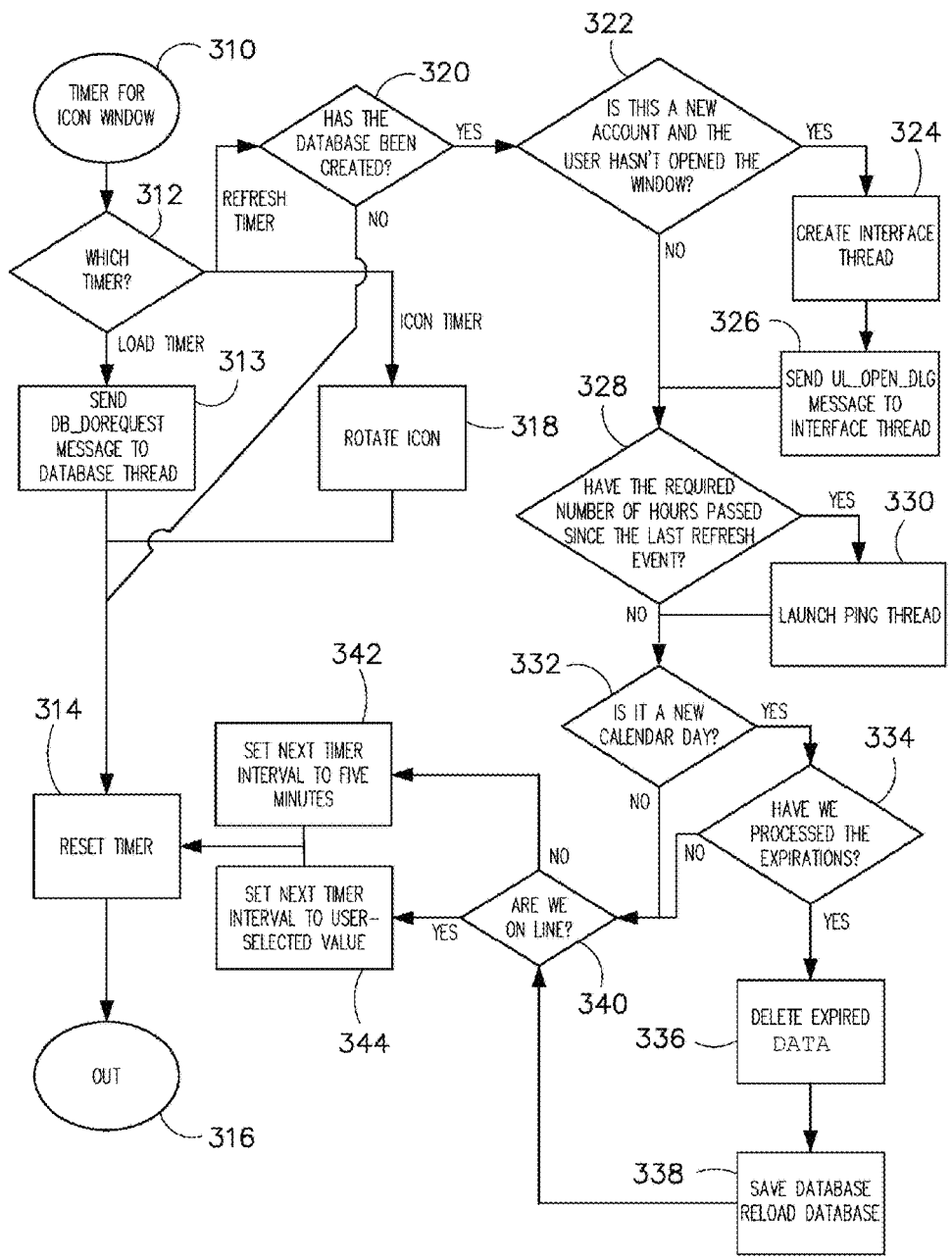
FIG. 21 is a simplified flowchart diagram view showing timing mechanisms for automatically updating PS-GM-C/L&SC/I-SN information and/or data without user intervention, according to an exemplary embodiment.

FIG. 21 illustrates a portion of the timing loops executing on main client application software 28. The flow chart illustrates the operation of three timers: the "load" timer, the "icon" timer, and the "refresh" timer. The steps in FIG. 21 can hereafter be referred to as the timing loop thread. Step 310 marks the beginning of the processing for evaluating the various timing loops illustrated in FIG. 21. In step 312, a decision is made by client application software 28 as to which timer is being evaluated. If the "load" timer is being evaluated in the timing loop thread illustrated in FIG. 21, then flow of the process continues at step 313. In step 313, the timing loop thread sends a message to the database thread. In particular, the DB_DOREQUEST is the event the database thread uses to perform the delayed downloading. Client system 14 feeds a DB_DOREQUEST event to the database thread while there are any PS-GM-C/L&SC/I-SN information, plugins, and/or ad impressions remaining to download. In response to this event, the database thread pops the top download request off the download queue and retrieves that item. Flow of the process then proceeds to step 314, wherein the "load" timer is reset. Flow of the process then proceeds to step 316, where the timing loop thread exits. On the other hand, if the timer being evaluated is the "icon" timer, as determined in step 312, then flow of the process proceeds to step 318. In step 318, client application software 28 rotates taskbar icon 102. This is done only when there are new PS-GM-C/L&SC/I-SN information and/or offers available to the user on PS-GM-C/L&SC/I-SN information distribution system 10. That is, this is the loop that causes the taskbar icon 102 to change display states so as to present a "flashing" effect to alert the user to the availability of new PS-GM-C/L&SC/I-SN information and/or offers. The flow of the process then proceeds through steps 314-316, wherein the "icon" timer is reset and the timing loop thread is exited.

Finally, if the timer being evaluated in the timing loop thread is the "refresh" timer, as determined in step 312, then flow of the process proceeds to step 320. In step 320, the timing loop determines whether the PS-GM-C/L&SC/I-SN information database has been created. If the answer is "NO" then the process proceeds through steps 314-316, where the refresh timer is reset, and the timing loop is exited. On the other hand, if the answer to the inquiry in step 320 is "YES," then flow of the process proceeds to step 322. In step 322, if a user has not opened the user interface window containing user interface 62 (FIG. 3A), and, the account is a new account, then flow of the process proceeds to step 324, wherein the "create interface" thread is invoked to create user interface 62 (best shown in FIG. 3A). The process then proceeds to step 326, wherein a user interface open dialog message is sent to the interface thread, which displays user interface 62 in a window. Flow then proceeds to step 328. If the answer to the inquiry in step 322 is "NO," then flow of the process also proceeds to step 328.

In step 328, the timing loop determines whether the predetermined, number of hours has passed since the last refresh event. In accordance with the disclosure, the user can select, as described above, from a number of different refresh intervals (e.g., one-hour, two-hours, etc.). The value of this parameter is what is being tested in step 328. If the answer to this inquiry is "YES," then the process branches to step 330, where the echo-request/ping-the-net thread is invoked (FIG. 9). If the answer to step 328 is "NO," then the process branches to step 332. In step 332, the timing loop thread determines whether the present day is a new calendar day. This parameter needs to be tested because some PS-GM-C/L&SC/I-SN information can now be "expired" that were not "expired" on the prior calendar day. If the answer to this inquiry is "YES," then the process branches to step 334. In step 334, the timing loop thread determines whether client application software 28 has processed the PS-GM-C/L&SC/I-SN information expirations arising because of the new calendar day. If the answer to this inquiry is "YES," then the process branches to steps 336, and 338, where expired PS-GM-C/L&SC/I-SN information are deleted from the database (memory), the database is saved (file), and the database is thereafter reloaded into the memory of the client application software 28. The method proceeds to step 340.

If the answer to the inquiry in step 332 and/or step 334 is "NO" then the method branches to step 340. In step 340, the timing loop thread determines whether client system 14 is "online." It can make this determination based on the response from the "ping" thread, invoked in step 330. If the answer to this inquiry is "NO," then the process branches to step 342. In step 342, the next timer interval is set to five minutes (i.e., try again in five minutes to see if the user is "online"). According to an exemplary embodiment, client application software 28 will not force the user device to connect to Internet 16 to refresh client system 14, but will simply wait a preselected time (e.g., five minutes) and check again to see if the user is connected.

Otherwise, if the answer to step 340 is "YES," then the process branches to step 344, in which the next timer interval is set to the user-selected value (i.e., the one hour, two hour, etc. that the user chooses as the selected refresh interval). Flow then proceeds from both steps 342 and 344 to step 314 where the "refresh" timer is reset. The process exits in step 316.

In FIG. 22, steps 346-350 illustrate the response of client application software 28 when a user "clicks" and/or otherwise selects logo pane 74 of user interface 62 (best shown in FIG. 3A). Step 346 marks the beginning of the routine. Step 346 is entered when client application software 28 (via the OS) detects that the user has "clicked" on and/or otherwise selected a portion of logo pane 74.

In step 348, client application software 28 invokes an Internet browser registered with the operating system of client system 14 as the default browser and passes thereto a URL. The Internet browser then connects to a website server resource corresponding to the specified URL. This "click" action, therefore, takes the user to the website of the company displayed in logo pane 74. Step 350 marks the end of this routine.

FIG. 23 shows the response of client application software 28 when a user "clicks" on and/or otherwise selects a portion of advertising pane 72 (best shown in FIG. 3A). Step 352 marks the beginning of the routine. In step 354, client application software 28 creates a click-through history record indicative of the fact that the user has "clicked" and/or otherwise selected the advertiser displayed in advertising pane 72. This are included in user history data 34, which will thereafter be encrypted and transmitted to main server system 12 for processing.

In step 356, the client application software 28 launches an Internet browser registered with the operating system of client system 14, and passes thereto a URL corresponding to the advertiser displayed in advertising pane 72. When the Internet browser executes, it connects to a website server resource defined by the URL. In-effect, the foregoing actions take the user to the advertisers website specified in the URL. Step 358 marks the end of this routine.

FIG. 24 illustrates a response taken by client application software 28 when a user "clicks" on and/or otherwise selects an item appearing in PS-GM-C/L&SC/I-SN information subcategory list 68 (best shown in FIG. 3A). Step 360 marks the beginning of the process. Step 360 is entered when client application software 28 (via the OS) determines that an item in PS-GM-C/L&SC/I-SN information subcategory list 68 has been "clicked" on. In step 362, client application software 28 determines whether the selection was a "click" and/or a "double-click." Depending on which of these events occurred, client application software 28 will take alternative courses of action. If the action is a single-click, then the method branches to step 364.

In step 364, the local PS-GM-C/L&SC/I-SN information database is locked by client application software 28. The process proceeds to step 366. In step 366, the selected subcategory item is retrieved from the local database on client system 14. In step 368, the contents of PS-GM-C/L&SC/I-SN information list 70 is reset by client application software 28 according to the contents of the new subcategory. For example, if the new subcategory pertains to PS-GM-C/L&SC/I-SN information, then the new PS-GM-C/L&SC/I-SN information associated with the new selected subcategory are displayed in PS-GM-C/L&SC/I-SN information list 70 (best shown in FIG. 3A). In step 370, client application software 28 determines and/or otherwise selects an advertising impression to be displayed in advertising pane 72 in accordance with a predetermined advertising impression selection strategy. In the illustrated embodiment, the selection criteria includes the identity of the selected PS-GM-C/L&SC/I-SN information subcategory. In step 372, a test is performed by client application software 28 to determine whether the newly selected advertising impression is different from the advertising impression currently being displayed. If the answer is "YES," then the process branches to step 374, where the new advertising impression is displayed in advertising pane 72, and an advertising impression history record is created for inclusion in the user history data 34. The method proceeds to step 376, which exits the thread shown in FIG. 24.

If the answer to step 372 is "NO," however, then the process branches to step 376, which is an exit step. If the action evaluated in step 362 is determined to be a "double click," then the process branches to step 378. "Double clicking" PS-GM-C/L&SC/I-SN information subcategory is a user request to refresh the contents of that subcategory. In step 378, client application software 28 creates a refresh history event for that subcategory. In step 380, client application software 28 sends to the database thread a request to flush the current history. The contents of that subcategory are then downloaded (available on display device 40) as if they were new. In step 382, a message is sent to the database thread to do idle processing.

FIG. 25 illustrates the response by client application software 28 when a user "clicks" on an item from PS-GM-C/L&SC/I-SN information list 70. The process begins in step 384. Step 384 is entered when client application software 28 detects that an item in the PS-GM-C/L&SC/I-SN information list 70 (VIA the OS) has been "clicked" on. In step 386, client application software 28 locks the local PS-GM-C/L&SC/I-SN information database for the interface thread. In step 388, client application software 28 obtains from the local PS-GM-C/L&SC/I-SN information database the item corresponding to that selected in PS-GM-C/L&SC/I-SN information list 70. In step 390, client application software 28 determines whether the item in PS-GM-C/L&SC/I-SN information list 70 that was clicked on was actually "selected." If the answer to this inquiry is "NO," then the method branches to step 392, which is an exit.

If the answer to step 390 is "YES," then the process branches to step 394. In step 394, client application software 28 sets the shown PS-GM-C/L&SC/I-SN information to correspond to the item selected in PS-GM-C/L&SC/I-SN information list 70. The process then proceeds to step 396. In step 396, client application software 28, by way of the interface thread, displays the PS-GM-C/L&SC/I-SN information in PS-GM-C/L&SC/I-SN information display area 76. The method then proceeds to step 392, which is an exit step.

FIG. 26 illustrates the process carried out by client application software 28 when the "Add to Cart" button 78 is "clicked" on and/or otherwise selected by the user. Step 398 is invoked when client application software 28 (VIA the OS) determines that the Add to Cart button has been "clicked" on. The process then proceeds to step 400. In step 400, client application software 28 performs a test to determine whether there is PS-GM-C/L&SC/I-SN product, service, or service provider information currently displayed in PS-GM-C/L&SC/I-SN information display area 76. If the answer to step 400 is "NO," then the method branches to step 414, which is an exit step. If the answer to step 400 is "YES," then the method branches to step 402. In step 402, client application software 28 determines whether the PS-GM-C/L&SC/I-SN product, service, or service provider information currently being displayed in PS-GM-C/L&SC/I-SN product, service, or service provider information display area 76 is already in the cart. If the answer to this inquiry is "YES," then the method branches to step 404. In step 404, client application software 28 causes a predetermined message to be displayed in message display area 94 advising, for example, the user that the PS-GM-C/L&SC/I-SN product, service, or service provider information is already in queue of the cart. This insures that PS-GM-C/L&SC/I-SN product, service, or service provider information is not added to the shopping cart more times than the user desires. If the user in-fact wishes to make multiple entries of a product, service, or service provider into the shopping cart, the user can alternatively click on the "add to cart" button to add more than one product, service, or service provider to the shopping cart. The process then proceeds to step 414, which is an exit step.

If the answer to step 402 is "NO," then the method branches to step 406. In step 406, client application software 28 determines whether the proposed adding to the cart of the product, service, or service provider corresponding to the PS-GM-C/L&SC/I-SN information displayed is confirmed as an error by the user. If the answer to this step is "YES," then the method branches to step 408. In step 408, an appropriate message is displayed to the user in message display area 94, advising that the selected product, service, or service provider has been removed from the cart. The method then proceeds to step 414, which is an exit step.

If the answer to step 406 is "NO," then the method branches to step 410. In step 410, the PS-GM-C/L&SC/I-SN information currently being displayed in PS-GM-C/L&SC/I-SN information display area 76 is used to add a selected product, service, or service provider to the cart. The method proceeds to step 412, wherein message display area 94 is cleared, thereby clearing any pre-existing message displayed therein. The process then proceeds to step 414, which is an exit step. For some PS-GM-C/L&SC/I-SN information displayed, it is of value to limit the number of times a specific user can access the PS-GM-C/L&SC/I-SN information. For example, a particular vendor can wish to limit the number of PS-GM-C/L&SC/I-SN information available to a user to a specific amount. Similarly, for clickable links from advertisers (i.e., clickable advertisements, it is also of value to limit the number of times a specific user can click on the advertisement. In response to a click on a clickable advertisement, a user is typically transferred to another website that relates to the information present in the clickable advertisement. By being able to limit the number of times a specific user can click on the advertisement, the advertiser can be more certain that the click on the advertisement was a true access and/or intended click by a particular user.

Limiting the clicking of clickable advertisements is particularly useful to avoid click fraud. Click fraud can occur, for example, in pay per click online advertising when a person, automated script, and/or computer program imitates a legitimate user of a web browser clicking on an ad for the purpose of generating a charge per click without having actual interest in the target of the ads link. Pay per click advertising is an arrangement in which webmasters (operators of web sites), acting as publishers, display clickable advertisements from advertisers, in exchange for a charge per click. By limiting the number of times a particular client system 14 can click on a clickable advertisement to a set amount, e.g., three, the ability to commit click fraud is significantly reduced. Moreover, if an advertiser can control the number of clicks to a clickable advertisement from a particular client system 14, the advertiser is more likely to increase the amount it will pay for each unique click of the clickable advertisement. To promote control over the clicking on of clickable advertisements, each clickable advertisement can include an access limit, which defines the number of times any client system can click on the clickable advertisement. For example, if the access limit for a clickable advertisement is three, then client application software 28 of a particular client system 14 would only be able to click on that clickable advertisement three times. In an exemplary embodiment, client application software 28 can be configured to allow access to the advertisement but not increment the count for revenue generation purposes (e.g., search engine revenue, etc.).

The system for displaying an advertisement from an advertisement database on a client mobile device on a network can include processing circuit 502 configured to receive a display request for an advertisement and to provide access to display the advertisement. Processing circuit 502 can be further configured to determine a revenue counting display limit and a number of times the advertisement has been displayed. Processing circuit 502 can also be configured to increment a revenue account and/or revenue counter based on a comparison of the number of times the advertisement has been displayed to the revenue counting display limit.

The system for displaying an advertisement from an advertisement database on a client mobile device on a network can also not increment the revenue account if the number of times the advertisement has been displayed exceeds the revenue counting display limit. The system for displaying an advertisement from an advertisement database on a client mobile device on a network can also increment the revenue account if the number of times the advertisement has been displayed does not exceed the revenue counting display limit.

The system for displaying an advertisement from an advertisement database on a client mobile device on a network can also include processing circuit 502 and/or components thereof being configured to be partially operated on main server system 12. Processing circuit 502 and/or components thereof can also be configured to be partially operated on client system 14 and/or client computing device. The system for displaying an advertisement from an advertisement database on a client mobile device on a network can also include the revenue counting display limit being stored on main server system 12.

The access limit for each clickable advertisement could be stored, for example, in database server 24, and/or in a secure area of client system 14. In addition, for each clickable advertisement, a counter can be maintained in the database server 24 for each DeviceID data 30. The counter counts the number of times a particular DeviceID data 30 has clicked on the associated clickable advertisement.

The method for controlling access to PS-GM-C/L&SC/I-SN information can include assigning an identifier (e.g., DeviceID data 30) to a client mobile device and receiving a request from client application software 28 operating on the client mobile device to view PS-GM-C/L&SC/I-SN information image data for the PS-GM-C/L&SC/I-SN information. The method can also include displaying the PS-GM-C/L&SC/I-SN information image data on the client mobile device and receiving a request to access the PS-GM-C/L&SC/I-SN information from client application software 28. The request can include the identifier assigned to the client mobile device. The method can also include determining an access limit for the PS-GM-C/L&SC/I-SN information. The access limit being a number of times that the client mobile device is permitted to access the PS-GM-C/L&SC/I-SN information. The method can also include determining the number of times the PS-GM-C/L&SC/I-SN information has been accessed based on the identifier and controlling access to the PS-GM-C/L&SC/I-SN information based on the number of times the PS-GM-C/L&SC/I-SN information has been accessed and the access limit.

The method can further include transmitting the PS-GM-C/L&SC/I-SN information to the client mobile device based on the controlling step. The method can also include transferring the user to a website corresponding to the PS-GM-C/L&SC/I-SN information in response to a request for more information from the client mobile device. The method can also include incrementing a counter associated with the PS-GM-C/L&SC/I-SN information in response to the request wherein the counter corresponding to the number of times the PS-GM-C/L&SC/I-SN information has been accessed. The method can also include transmitting the PS-GM-C/L&SC/I-SN information access report to a remote device. The method can further include that the PS-GM-C/L&SC/I-SN information image data comprises a thumbnail image and an overlay information.

It should be noted that access can include transmitting data to a print queue, transmitting data based on clicking on and/or any other method of activating a hyper link, initiating a search (e.g., an internet search engine, an intranet search engine, a local computing device search, and/or any other search known to a person skilled in the art), displaying data, receiving data, transmitting data and/or any combination thereof. Access as used herein can refer to any of a number of ways that client system 14 can be configured to provide access to the user, in various alternative embodiments. It should also be noted that access limit can include number of times client system 14 can print an advertisement, number of times client system 14 can send an advertisement to a print queue, number of times client system 14 can be allowed to display an advertisement, the number of times client system 14 can be allowed to click thorough a clickable link to display an advertisement, the number of times client system 14 can be allowed to download an advertisement from the advertisement server, the number of times a user can click on a link which is a result of a search performed on an internet search engine, and/or any other way client system 14 can be allowed to access an advertisement. The access limit can be limits on other user accesses to advertisement. Accordingly, providing access, limiting access, and/or requesting access as used herein can refer to steps relating to any of the above mentioned types of access.

FIGS. 27A and 27B are flow diagrams of processes for controlling the number of clicks to a clickable advertisement. As shown in FIG. 27A, in step 420, a request is received from client application software 28 of a particular client system 14 to view clickable advertisements. The request preferably includes DeviceID data 30, which is a unique identifier assigned to the client system 14 that uniquely identifies client system 14 making the request. The request can be made in response to linking and/or accessing a particular website and/or by submitting the request through user interface 62.

In step 422, an access limit is identified for each of the clickable advertisements that are responsive to the received request. Based on the received request, main server system 12 can identify an appropriate handler 22 and database server 24 for servicing the request. Handler 22 accesses database server 24, which can includes a list of available clickable advertisements, to identify the clickable advertisements (including PS-GM-C/L&SC/I-SN information) responsive to the request and to identify the access limits associated with those clickable advertisements. In step 424, for each of the clickable advertisements responsive to the request, it is determined how many times each clickable advertisement has been clicked on by client application software 28 and/or client system 14 based on the associated DeviceID data 30. This information can be determined by checking the values of the counters held in database server 24 for each clickable advertisement corresponding to DeviceID data 30 provided in the request.

In step 426, clickable advertisements are made available to the requesting client system 14 that have been accessed (i.e., clicked on) by client system 14 fewer times than the access limit. To determine if a clickable advertisement should be made available, main server system 12 compares the identified access limit to the determined number of accesses set in the corresponding counter. If the access limit is greater than the determined number of accesses set in the corresponding counter, then the clickable advertisement is made available to the requesting client system 14. On the other hand, if the access limit is equal to (or less than) the determined number of accesses set in the corresponding counter, then the clickable advertisement is not made available to the requesting client system 14. The clickable advertisements made available to the client system 14 can be viewed, for example, in advertising pane 72 and/or logo pane 74. Each of the clickable advertisements made available to client system 14 can be accessed, i.e., clicked on, by the user at client system 14.

In step 428, in addition to making the clickable advertisement available to be clicked on by the user at client system 14, if the clickable advertisement is PS-GM-C/L&SC/I-SN information, then the user is permitted to print PS-GM-C/L&SC/I-SN information as well. To print PS-GM-C/L&SC/I-SN information, the user can select the "Print Now" button 80 which prints the PS-GM-C/L&SC/I-SN information currently being viewed on printer 46. In step 430, in response to the click of the clickable advertisement, the counter associated with that clickable advertisement and corresponding to DeviceID data 30 of client application software 28 and/or client system 14 is incremented. More specifically, client application software 28 can generate a signal to main server system 12 indicating that the clickable advertisement has been clicked on, and based on that signal the server increments the applicable counter in database server 24. The signal can include information identifying the clickable advertisement, as well as DeviceID data 30 of client system 14. Accordingly, each time a clickable advertisement is clicked on, the counter associated with the clickable advertisement is incremented, and once the count in the counter reaches the access limit, the user at that client system 14 is no longer permitted to click on that clickable advertisement. It should be noted that client system 14 can be a client mobile device.

The method for controlling access to advertisement in a network can include assigning an identifier to a client mobile device and receiving a request from client application software 28 operating on the client mobile device to access the advertisement. The request can include the identifier assigned to the client mobile device. The advertisement can have an access limit. The method can also include determining the number of times that the advertisement has been accessed by the client mobile device based on the identifier. The method can further include comparing the number of times the advertisement has been accessed to the access limit and providing the client mobile device with access to the advertisement based on the comparison. The method can also include sending to the client mobile device the advertisement if the access limit has not been exceeded. The method can further include transferring the user to a website corresponding to the advertisement if the access limit has not been exceeded. The method can further include refusing access for the client mobile device to the advertisement if the access limit has been met and/or exceeded. The method can also include sending to the client mobile device a message indicating that access has been refused. The method can also include incrementing the access counter based on receiving the request from the client application operating on the client mobile device to access the advertisement. The method can further include transmitting an advertisement access report to a remote server. The method can further include the identifier being assigned to the client mobile device by the client application. The method can also include that the identifier being assigned to the client mobile device is not one of a DeviceID data 30 and/or an internet protocol address. The method can also include encrypting the advertisement at a server to generate a first encrypted advertisement and further encrypting the first encrypted advertisement at the client mobile device to generate a second encrypted advertisement.

The system for monitoring access to an advertisement can include processing circuit configured to determine an advertisement access limit and the number of times the advertisement has been accessed, according to an exemplary embodiment. The system can further include processing circuit being configured to be partially operated on a server, according to an exemplary embodiment. The system can also include processing circuit being configured to be partially operated on a client computing device, according to an exemplary embodiment. The system can further include processing circuit being configured to receive a request to access an advertisement, according to an exemplary embodiment. The request can include an identifier assigned to the computing device, according to an exemplary embodiment. Processing circuit can determine the number of times that the advertisement has been accessed by the computing device based on the identifier, according to an exemplary embodiment. Processing circuit can generate a comparison based on an access counter module/circuit data and an access limit module/circuit data, according to an exemplary embodiment. Processing circuit can transmits an access control signal based on the comparison, according to an exemplary embodiment. The system can also include processing circuit determining that the access limit has not been exceeded based on the comparison and transmits the advertisement to the computing device, according to an exemplary embodiment. The system can further include the user being transferred to a website corresponding to the advertisement based on a request for more information, according to an exemplary embodiment. The system can also include processing circuit determining that the access limit has been exceeded and the advertisement is not sent to the computing device, according to an exemplary embodiment.

FIG. 27B illustrates a process similar to the one in FIG. 27A. Like the process of FIG. 27A, in step 432 of FIG. 27B, a request is received from the client application software 28 to view clickable advertisements, the request including DeviceID data 30 that uniquely identifies client system 14 making the request. However, instead of checking the access limit of responsive clickable advertisements, all clickable advertisements that are responsive to the request are made available to the requesting client system 14 in step 434. To determine which clickable advertisements are responsive, main server system 12 can identify an appropriate handler 22 and database server 24 for servicing the request. Handler 22 can access database server 24 to identify the clickable advertisements responsive to the request. The user at client system 14 can try to click on any of the clickable advertisement made available to client system 14. In step 436, in response to clicking on a selected clickable advertisement, a request is received by main server system 12 for access to that clickable advertisement. The request can include information identifying the selected clickable advertisement, as well as DeviceID data 30 of the requesting client system 14. In step 438, in response to the received request, an access limit is identified for the selected clickable advertisement. More particularly, main server system 12 can identify an appropriate handler 22 to access database server 24 and identify the access limits associated with the selected clickable advertisement. In step 440, it is determined how many times the selected clickable advertisement has been clicked on by client application software 28 and/or client system 14 based on the associated DeviceID data 30. This information can be determined by checking the values of the counter held in database server 24 for the selected clickable advertisement corresponding to DeviceID data 30 provided in the request.

In step 442, the user is permitted to click on and access the selected clickable advertisement if it is determined that the clickable advertisement has been accessed by client system 14 fewer times than the access limit. To determine if a clickable advertisement should be made available, main server system 12 compares the identified access limit to the determined number of accesses (i.e., clicks) set in the corresponding counter. If the access limit is greater than the determined number of accesses set in the corresponding counter, then the user is permitted to click on and access the clickable advertisement at the requesting client system 14. On the other hand, if the access limit is equal to (or less than) the determined number of accesses set in the corresponding counter, then the user is not permitted to click on and access the clickable advertisement at client system 14. If permitted to click on and access the clickable advertisement, and the clickable advertisement is PS-GM-C/L&SC/I-SN information, then the user can print or add to a cart the PS-GM-C/L&SC/I-SN information, for example, by selecting the "Print Now" button 80, which prints the PS-GM-C/L&SC/I-SN information currently being viewed on printer 46.

In step 444, in response to the click of a clickable advertisement, the counter associated with that clickable advertisement and corresponding to DeviceID data 30 of client application software 28 and/or client system 14 is incremented. More specifically, client application software 28 can generate a signal to main server system 12 indicating that the accessed clickable advertisement has been clicked on, and based on that signal main server system 12 increments the applicable counter in database server 24. The signal can include information identifying the clickable advertisement, as well as DeviceID data 30 of client system 14. Accordingly, each time a clickable advertisement is clicked on and accessed, the counter associated with the clickable advertisement is incremented, and once the count in the counter reaches the access limit, no user at that client system 14 is permitted to click on and access that clickable advertisement.

The method for controlling access to a clickable advertisement in a network includes assigning a computer identifier to a client mobile device and receiving a request from client application software 28 operating on the client mobile device to access the clickable advertisement. The request includes the computer identifier assigned to the client mobile device. The clickable advertisement having an access limit. The access limit being the number of times that the client mobile device is permitted to access the clickable advertisement. The method can include determining the number of times that the clickable advertisement has been accessed by the client mobile device based on the computer identifier. The method also can include comparing the number of times the clickable advertisement has been accessed to the access limit. The method can include providing the client mobile device with access to the clickable advertisement based on the comparison and storing the comparison. The method can further include sending to the client mobile device the clickable advertisement based on the comparison because the comparison determined that the access limit has not been exceeded.

The method can further include transferring the user to a website corresponding to the clickable advertisement based on the comparison because the comparison determined that the access limit has not been exceeded. The method can further include refusing access for the client mobile device to the clickable advertisement based on the comparison because the comparison determined that the access limit has been exceeded. The method can also include sending a message to the client mobile device indicating that access has been refused. The method can further include incrementing an access counter based on receiving the request from client application software 28 operating on the client mobile device to access the clickable advertisement. The method can further include transmitting a clickable advertisement access report.

Figure 28:
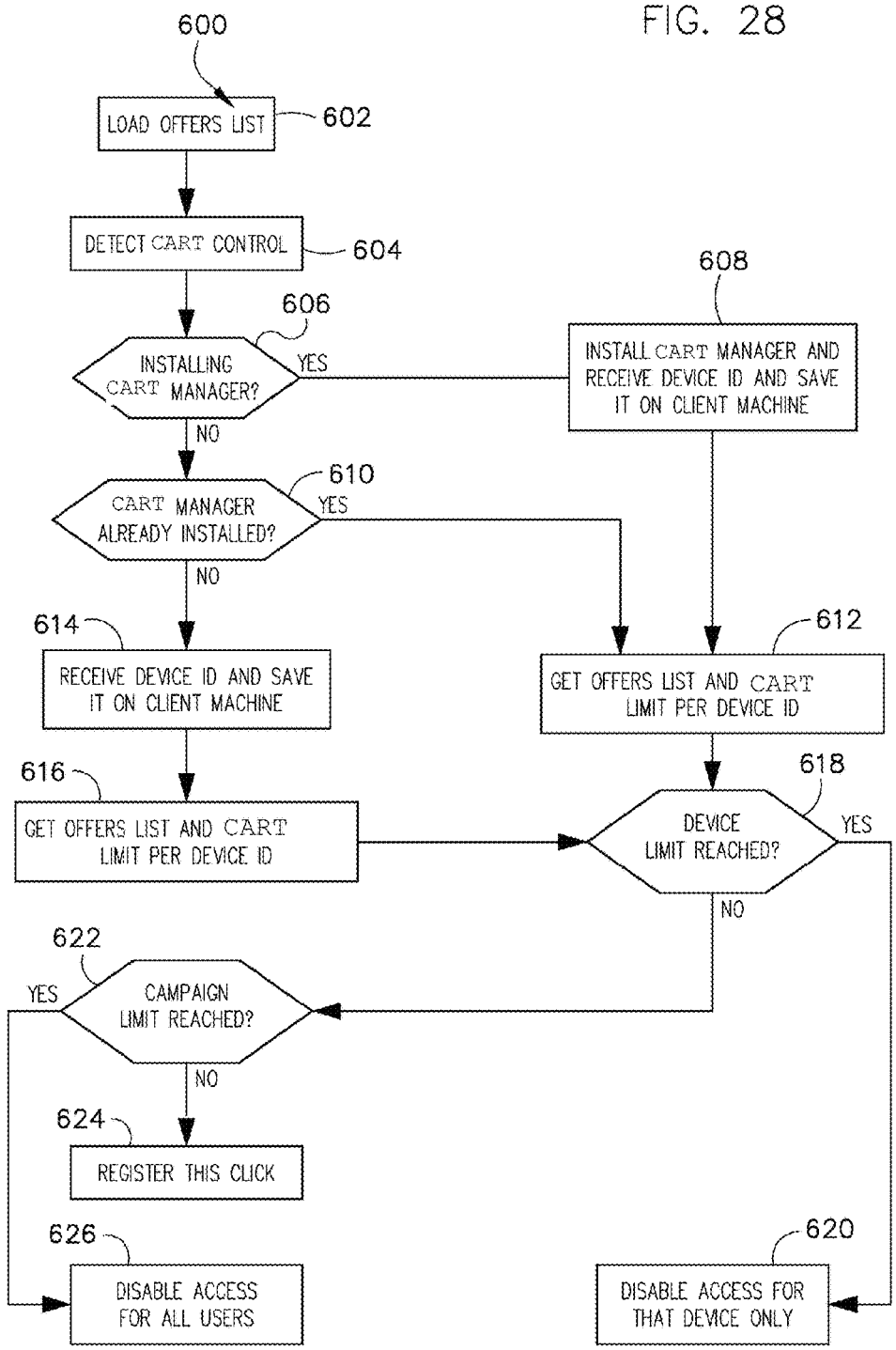
FIG. 28 is another flow diagram of the process for controlling the number of clicks to a clickable advertisement, according to an exemplary embodiment.

Referring to FIG. 28, a flow diagram 600 of the process for controlling clicks to a clickable advertisement is shown, according to an exemplary embodiment. In step 602, the system loads an offers list onto the client device, a server, and/or another computing device. An offers list is a set of advertisements, PS-GM-C/L&SC/I-SN information, websites, and/or any other offers. In step 604, the system detects the cart control of the client device, server, and/or another computing device. In step 606, the system determines whether the cart manager are installed. If the cart manager are installed, then the process moves to step 608. In step 608, the system installs the cart manager and receives DeviceID data 30 and save it on client device, server, and/or another computing device. After installing cart manager and receiving DeviceID data 30 (step 608), the process moves to step 612. If the print manager will not be installed, then the process moves to step 610. In step 610, the system determines whether the cart manager is already installed. If the cart manager is not already installed, the process moves to step 614. In step 614, the system receives DeviceID data 30 and saves it on client device, server, and/or another computing device. In step 616, the system receives the offering lists, limits per DeviceID data 30 and click limits per DeviceID data 30. If the cart manager is already installed, the process moves to step 612. In step 612, the system receives the offering lists per DeviceID data 30 and click limits per DeviceID data 30. In step 618, the system determines whether the device limit has been reached. If the device limit has been reached, then in step 620 the system disables access to the data requested by that device. If the device limit has not been reached, then the process moves to step 622. In step 622, the system determines whether the campaign limit has been reached. A campaign limit can be a promotional limit, a budget limit, a sales limit and/or any other limit placed on the advertisement. If the campaign limit has been reached, then the system in step 626 disables access to the data for all devices. If the system determines that the campaign limit has not been reached, then the system in step 624 registers the access to the data.

Figure 29:
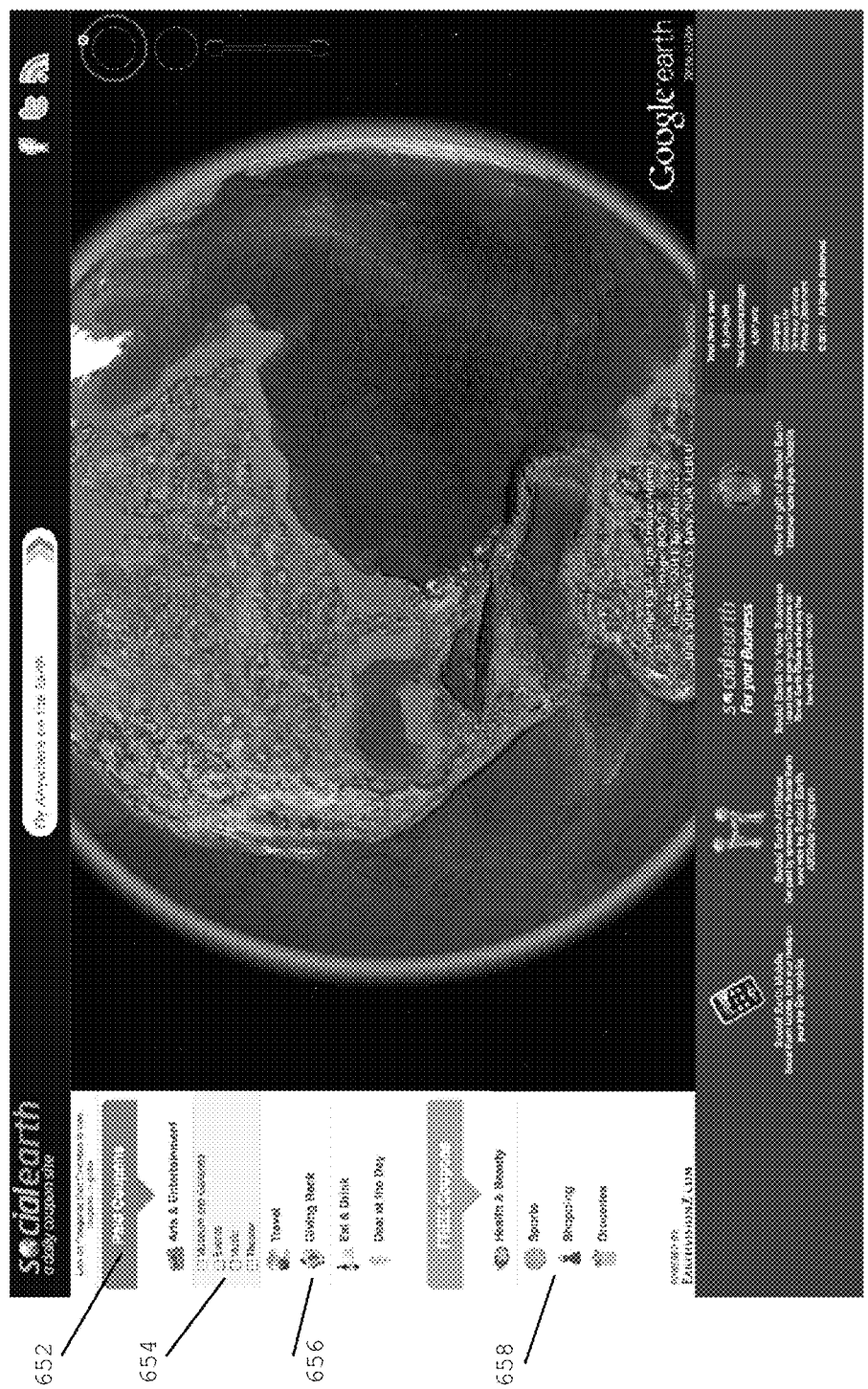
FIG. 29 illustrates a screen display defining an interface associated with a client system portion, according to an exemplary embodiment.

Referring to FIG. 29, illustrations of a screen display defining an interface associated with a client system portion are shown, according to exemplary embodiments, e.g., as Social Earth™. FIG. 29 is similar to FIGS. 3A and 3B with the added feature of being able to utilize a pull down menus 652, 654, 656, and 658 to retrieve PS-GM-C/L&SC/I-SN information data. It is to be understood that the above description is merely exemplary rather than limiting in nature, the disclosure being limited only by the appended claims. Various modifications and changes can be made thereto by one of ordinary skill in the art which embody the principles of the disclosure and fall within the spirit and scope thereof. For example, one and/or more steps described herein as being performed by client system 14 and/or main server system 12 can be performed by the other of client system 14 and/or main server system 12, and/or by both.

For example, a thin client can be operable on client system 14 to interface with main server system 12. A thin client is a client mobile device and/or client software in client-server architecture networks which depends primarily on the central server for processing activities, and mainly focuses on conveying input and output between the user and the remote server. In contrast, a thick and/or fat client does as much processing as possible and passes only data for communications and storage to the server. Many thin client devices run only web browsers and/or remote desktop software, meaning that all significant processing occurs on the server.

Geospatial Mapping, Web Mapping, Mobile Mapping and Use for Mobile Advertising, Mobile Device, Mobile Banking, Mobile Payment, Mobile Wallet and/or Electronic Payments, Mobile Wallet, Mobile Express Checkout, Mobile Money Transfer, Mobile Social Media Widgets, Mobile Keywords, Mobile Coupons, Mobile Instant Messaging Marketing, Mobile Voting, Mobile ecards, Mobile Short Codes, Mobile Commerce, Mobile Shopping, Mobile Push Content, Geo-Mobile, Geo-Social, Coupons, Mobile Services, Products & Services, Clickable Advertisements & Mobile Advertisements by Geo-Target Location, Coupons, Products & Services from Merchants, Business Owners, B2B Business Directory, Retailers and Major Brands Around the World, a Multidue of and Allows Users to Engage in Geo-Target Location-Based Social Networking Integration & Mobile Services, Online Auctions, Daily Deal Coupons & Free or Discounted Printable Coupons, Products & Services from Major Brands Around the World, E-Commerce, Media and Entertainment, Sports, Personal & Financial Network, Real Estate, Service Providers, Social Networking, Online Dating, Gaming, Retail Stores, Virtual Communities and Virtual Goods, Microloans or Microcredit, Humanitarian Aid and Support Other Worldly Causes Through Charitable Donations or Sustainable Gifts on a Three Dimensional Geospatial Platform Using Geospatial Mapping, Web Mapping, Mobile Mapping & Layers of Geographic Information Technology, Company-Local, Global and Socially-Conscious Information and Social Networking (PSR-GM-C/L&SC-SN) Information The present invention provides in one aspect a delivery system for a geospatial website for a multidimensional representation of information and/or scalable versions of web content for the delivery of coupons, mobile services, products & services, clickable advertisements & mobile advertisements by geo-target location, search and pay for coupons, mobile services, products & services, clickable advertisements & mobile advertisements by geo-target location combined with /Geospatial Mapping/Web Mapping/Mobile Mapping/Company-Local & Socially Conscious Information/Location-Based Social Networking Integration & Mobile Services ("PS-GM-C/L&SC/I-SN") on a three dimensional geospatial platform using geospatial mapping technology. One example of an aspect of the invention is a geospatial website that aggregates, inter alia, coupons, mobile services, products & services, clickable advertisements & mobile advertisements by geo-target location, daily deal coupons and free or discounted printable coupons, products & services, clickable advertisements & mobile advertisements by geo-target location from merchants, business owners, B2B business directory, retailers and major brands around the world, and allows users to engage in geo-target location-based social networking integration & mobile services, mobile advertisements, mobile text, mobile SMS marketing, mobile search, mobile multimedia, mobile operating system, mobile device, mobile banking, mobile payment, mobile wallet and/or electronic payments, mobile wallet, mobile express checkout, mobile money transfer, mobile social media widgets, mobile keywords, mobile coupons, mobile instant messaging marketing, mobile voting, mobile eCards, mobile short codes, mobile commerce, mobile shopping, mobile push content, geo-mobile, geo-social, (collectively "Mobile Services" as any product, service, or service provider or subgroup thereof) in connection with server and cloud based internet with access to coupons, mobile services, products & services, clickable advertisements & mobile advertisements by geo-target location, daily deal coupons and free or discounted printable coupons, products & services, clickable advertisements & mobile advertisements by geo-target location from merchants, business owners, B2B business directory, retailers and major brands around the world (collectively "Coupons" as any product, service, or service provider or subgroup thereof), media and entertainment, sports, personal & financial, social networking, online dating, gaming, retail stores, virtual communities and virtual goods, microloans or microcredit, humanitarian aid and support other worldly causes through charitable donations or sustainable gifts to those in need from around the world and/or showcases them in their actual, physical location on the websites live view of a virtual Earth in combination with social networking and/or socially conscious information and/or activities. The present invention addresses problems and/or shortcomings of mobile services to search and purchase online coupons, mobile services, products & services, clickable advertisements & mobile advertisements by geo-target location, which should also provide socially conscious information about the companies that supply the coupons so that consumers can see where the companies and/or stores are located and can find out information about the companies, communities they are located in, what interaction and help they provide to communities and/or other economic and/or socially responsible activities, and to associate the geographical and other geospatially available information connecting also by the use of integrated social media, which combination is not current provided and/or available.

As users and members and/or subscribers of the website, (e.g., "Social Shoppers") shop the world for bargains, they can view coupons, mobile services, products & services, clickable advertisements & mobile advertisements by geo-target location, search and pay for coupons, mobile services, products & services, clickable advertisements & mobile advertisements by geo-target location e.g., but not limited to, family fun, spoils, restaurants, events and/or hundreds of top consumer packaged goods brand/ors for, e.g., but not limited to, groceries, apparel, beauty products, beverages, books & magazines, foods, health care, household, office, personal care, pet care, photography, skincare & cosmetics and/or the like. Such users and members and/or subscribers (e.g., "Social Shoppers") can find great product or services deals from leading restaurant, toy and/or entertainment companies and/or top retailers around the world. The delivery system for a host geospatial website can provide for a multidimensional representation of information and/or scalable version of web content for an infrastructure and global platform that provides users and members and businesses of all types and sizes with access to broad markets and connect buyers and sellers and to reach people at the point of shopping—a benefit both to shoppers and merchants and delivery of coupons, mobile services, products & services, clickable advertisements & mobile advertisements by geo-target location, search and pay for coupons, mobile services, products & services, clickable advertisements & mobile advertisements by geo-target location on a three dimensional geospatial platform using geospatial mapping, web mapping, mobile mapping & layers geographic information technology. A host geospatial website can include realistic virtual landscape using satellite and/or aerial photography that can include many content layers of web based information, online auctions, e-commerce or m-commerce and mobile banking, mobile payment, mobile wallet and/or electronic payments links, social networking and/or virtual advertisements for a richer user experience. A host website shall store images, web-based content, social data and/or share live social feeds from social networks and/or other communications in real-time. Connecting coupons, mobile services, products & services, clickable advertisements & mobile advertisements by geo-target location, search and pay for coupons, mobile services, products & services, clickable advertisements & mobile advertisements by geo-target location with users and members known as "Social Shoppers" in real-time on a geographical area across multiple social layers that are displayed as graphic animated color overlays on a three dimensional geospatial platform using geospatial mapping, web mapping, mobile mapping & layers geographic information technology." The invention can also provide mobile payment method and/or system for effectuating an online payment through a mobile device or portable device (e.g. mobile device, telephone, smart phone, PDA, laptop computer, Android, iOS devices, iPhone, 3G, 3GS, iPhone, iPad, iPad Touch, etc.) to complete an online auctions, e-commerce or m-commerce and mobile banking, mobile payment, mobile wallet and/or electronic payments transaction on a three dimensional geospatial platform using geospatial mapping, web mapping, mobile mapping & layers geographic information technology.

The invention can further provide in one aspect geospatial website aggregates coupons, mobile services, products & services, clickable advertisements & mobile advertisements by geo-target location, and allows users to engage in geo-target location-based social networking integration & mobile services, search and pay for coupons, mobile services, products & services, clickable advertisements & mobile advertisements by geo-target location from around the world and/or showcases them in their actual, physical location on the websites unique live view of a virtual Earth. As users and members and/or subscribers shop the world for bargains, they can view coupons, mobile services, products & services, clickable advertisements & mobile advertisements by geo-target location, daily deal coupons and free or discounted printable coupons, products & services, clickable advertisements & mobile advertisements by geo-target location from merchants, business owners, B2B business directory, retailers and major brands around the world, and allows users to engage in geo-target location-based social networking integration & mobile services, Clickable advertisements & mobile advertisements by geo-target location, search and pay for coupons, mobile services, products & services, clickable advertisements & mobile advertisements by geo-target location for family fun, sports, restaurants, events and/or hundreds of top consumer packaged goods brand/ors for groceries, apparel, beauty products, beverages, books & magazines, foods, health care, household, office, personal care, pet care, photography, skincare & cosmetics and/or more! Social Shoppers can to find great product or services deals from leading restaurant, toy and/or entertainment companies and/or top retailers around the world. Social Shoppers can to use "a mobile device payment method and/or system for effectuating an online payment through a mobile device equipped carrier and/or a mobile device equipped bank using a mobile users and members device in connection with online auctions, e-commerce or m-commerce and mobile banking, mobile payment, mobile wallet and/or electronic payments transactions on the host geospatial website via a mobile device or portable device (e.g. mobile device, telephone, smart phone, PDA, laptop computer, Android, iOS devices, iPhone, 3G, 3GS, iPhone, iPad, iPad Touch, etc.); wherein users and members create and/or maintain a rich-media application via a geospatial mapping, web mapping, mobile mapping & layers geographic information platform via the Internet comprising: mobile banking, mobile payment, mobile wallet and/or electronic payments. The delivery system for a host geospatial website can provide for a multidimensional representation of information and/or sealable version of web content for the delivery of coupons, mobile services, products & services, clickable advertisements & mobile advertisements by geo-target location, Search and pay for coupons, mobile services, products & services, clickable advertisements & mobile advertisements by geo-target location on a three dimensional geospatial platform using geospatial mapping, web mapping, mobile mapping & layers geographic information technology. A host geospatial website can include realistic virtual landscape using satellite and/or aerial photography that can include many content layers of web based information, online auctions, e-commerce or m-commerce and mobile banking, mobile payment, mobile wallet and/or electronic payments links, social networking and/or coupons, mobile services, products & services, clickable advertisements & mobile advertisements by geo-target location for a richer user experience.

A host geospatial website shall store images, web-based content, social data and/or share live social feeds from social networks and/or other communications in real-time. Connecting coupons, mobile services, products & services, clickable advertisements & mobile advertisements by geo-target location, search and pay for coupons, mobile services, products & services, clickable advertisements & mobile advertisements by geo-target location with users and members known as "Social Shoppers" in real-time on a geographical area across multiple social layers that are displayed as graphic animated color overlays on a three dimensional geospatial platform using geospatial mapping, web mapping, mobile mapping & layers geographic information technology. More specifically, it relates to a method for users and members known as "Social Shoppers" to effectuate banking and/or electronic payments; accessing a user account, engaging in mobile social activities and/or viewing available options via a three dimensional geospatial mapping platform using geospatial mapping, web mapping, mobile mapping & layers geographic information technology.

The foregoing description of exemplary embodiments of the disclosure has been presented for purposes of illustration and description. It is not intended to be exhaustive and/or to limit the disclosure to the precise form disclosed, and modifications and variations are possible in light of the above teachings and/or can be acquired from practice of the disclosure. The embodiments (which can be practiced separately and/or in combination) were chosen and described in order to explain the principles of the disclosure and as a practical application to enable one skilled in the art to make and use the disclosure in various embodiments and with various modifications suited to the particular uses contemplated. It is intended that the scope of the disclosure is not limited to the disclosure herein, but covers any embodiment expressed to one of ordinary skill in the relevant arts in combination with what is known in the art, and their equivalents.

A geographic information system (GIS) (also called geographic mapping and/or "GM") is a computer technology that provides an analytical framework for managing and integrating data, solving problems, and/or understanding past, present, and/or future situations. A GIS can link information and/or attributes to location data (hereinafter referred to as a "feature"), for example, people to addresses, buildings to parcels, and/or streets within a network. GIS and/or GM can further layer such information to present a better and/or clearer understanding of how many different variables interrelate and/or work together. Layers can be in the form of colored and/or textured overlays, graphics, icons, graphs, and/or other visual indicators of data in context with a geographic location associated with the data.

A GIS and/or GM is most often associated with maps formed within a framework of a common coordinate system, such as the World Geodetic System 1984 (WGS84). Reference locations within the framework can be specified by and/or translated to and/or from locations defined within a common coordinate system, so as to allow integration of disparate data and functionality with a geospatial browser. A map, however, is only one way a user can work with geographic data in a GIS and/or GM and is only one type of output generated by a GIS and/or GM. Furthermore, a GIS and/or GM can provide many more problem-solving capabilities than using a simple mapping program and/or adding data to an online mapping tool (e.g., in a "mash-up").

Generally, a GIS and/or GM can be viewed in at least three ways, (1) as a database; (2) as a map; and/or (3) as a model. As a database, a GIS provides a unique kind of database relating to the Earth and/or other mapped region, such as a geographic database and/or geo-database. Fundamentally, a GM is based on a structured database that describes the mapped region in geographic terms. GM maps can be either two and/or three dimensional in presentation. GM maps are generally constructed of "tiles" that are unit areas of a geographic region. Tiles can be identified in the database by coordinate boundaries and/or individual reference identifications allocated to each tile. The number of tiles covering a particular geographic region will vary depending upon the resolution of the map requested; a high resolution map (e.g., 1 m) of a geographic area will have substantially more tiles than a lower resolution map of the same area. Maps combining the underlying geographic information with overlays of associated data can be constructed and used as "windows into the database" to support queries, analysis, and editing of the information in a process called "geo-visualization." As a model, a GM is a set of information transformation and/or "geo-processing" tools that derive new geographic datasets from existing datasets. This geo-processing functionality can take information from existing datasets, apply analytic functions, and write results into new derived datasets that show features and feature relationships with the mapped region and present the results to a user.

A GM allows mapping of locations and things and identification of places with requested features. GIS mapping can provide information about individual feature and/or present a distribution of features on a map to identify patterns. GM and/or GIS mapping can be based upon and/or filtered by quantities, for example, locations of most and least of a feature. GM and/or GIS mapping can also find and establish relationships between places, features, conditions, and/or events and determine where certain criteria are met and/or not met. GM and/or GIS mapping can also present densities to view concentrations. A density map allows measurement of a number of features using a uniform area unit, such as acres and/or square miles, to clearly present the distribution. This functionality provides an additional level of information beyond simply mapping the locations of features.

GM and/or GIS can also be used to depict events occurring within and/or nearby an area. For example, a district attorney might monitor drug-related arrests to find out if an arrest is within 1,000 feet of a school; if so, stiffer penalties can apply. GM and/or GIS can be used to determine items within a set distance of a feature by mapping an area within a range of the feature. GM and/or GIS can also be used to map the change in an area to anticipate future conditions, decide on a course of action, and/or to evaluate the results of an action and/or policy. By mapping where and how things move over a period of time, insight into trends and/or behaviors can be gained.

GM and/or GIS can be used to map changes to anticipate future needs. For example, a police chief might study how crime patterns change from month to month to help decide where officers should be assigned. GM and/or GIS can also be used to map conditions before and after an action and/or event to see the impact. For example, a retail analyst might map the change in store sales before and after a regional ad campaign to see where the ads were most effective.

Figure 30:
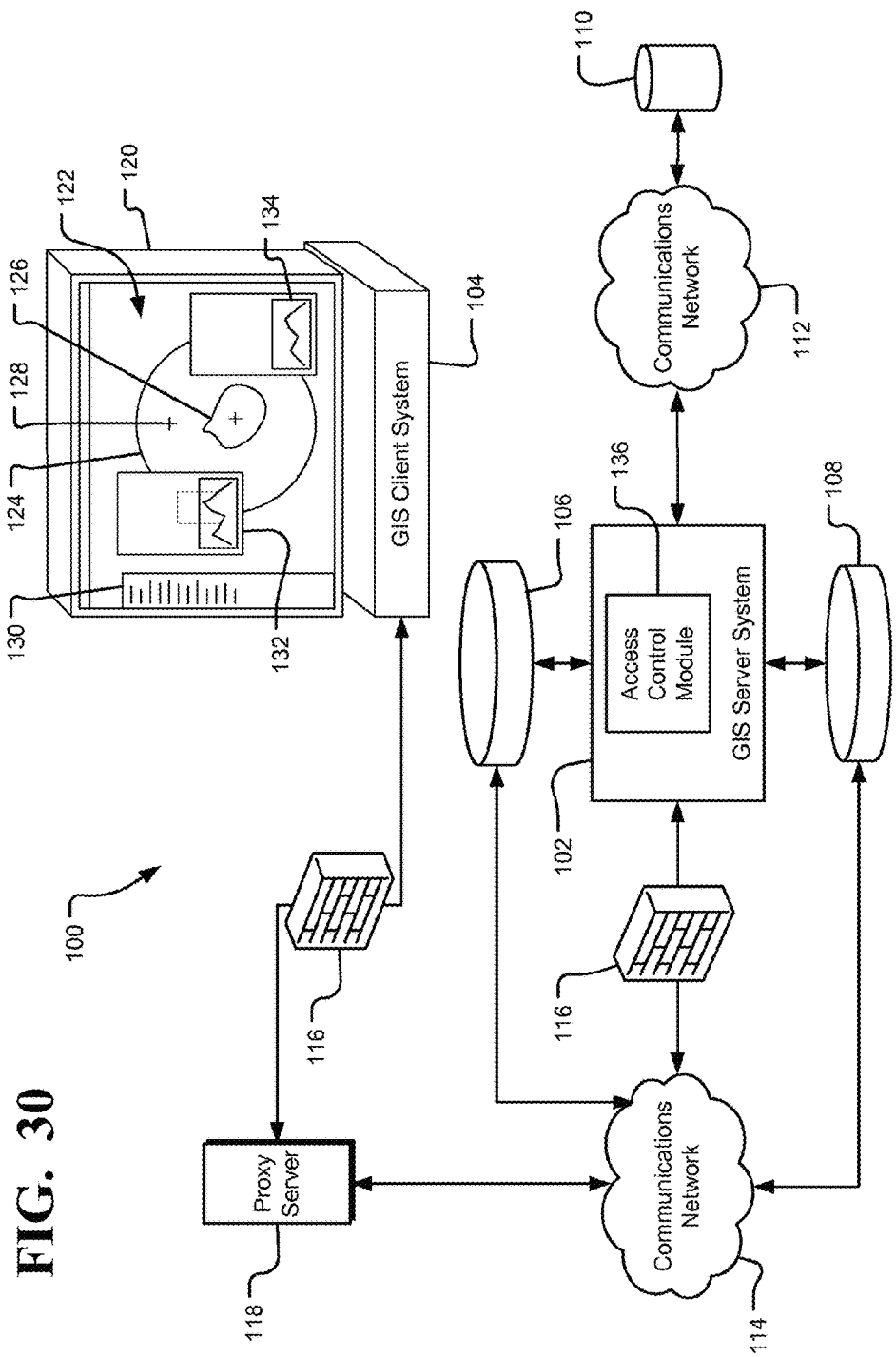
FIG. 30 is a schematic diagram of an exemplary implementation of a geospatial decision management system for implementing a geographic information system over a network.

A GM and/or GIS can be implemented in a geospatial decision management system (GDMS) 100, shown in FIG. 30 to provide the geo-processing power and infrastructure to process the data and render geo-visualizations of the data in a user interface. The GDMS 100 of FIG. 30 can be implemented in a combination of a server computer system 102, one and/or more client mobile device systems 104, and various data sources 106, 108, and 110. GDMS data can be saved in the GDMS server system 102 and/or in a datastore 106, 108, and 110 at a local and/or remote location. The data sources 106 and 108 are depicted as local to the server system 102, whereas the data source 110 is depicted as coupled remotely to the server system 102 via a communications network 112. GDMS data can also be cached in a proxy server.

The client system 104 can be coupled remotely to the server system 102 via a communication network 114 (or alternatively, the same communications network 112), although a local connection between the client system 104 and the server system 102 can be employed. It should be understood that multiple client systems can be coupled with the server system 102 concurrently. It should also be understood that the client system 104 and server system 102 can be implemented in an integrated system. The network connection 114, such as an Internet connection, can be used by GDMS client systems 104 to access the data (e.g., data defining layers and/or providing financial information, chemical concentrations, test results, project state reports, etc.) at the remote data sources 106, 108, 110, directly and/or through an intermediate computing system (e.g., a proxy server and/or GDMS server).

The client mobile device 104 can be coupled to an intermediate server, such as a proxy server 118. The proxy server 118 can be positioned between the client mobile device 104 and the server system 102. The proxy server 118 intercepts all requests to the server system 102 to see if it can fulfill the requests itself with cached data from prior requests. If not, the proxy server 118 forwards the request to the server system 102 to be fulfilled. The proxy server 204 can also be coupled to the communications network 114 and accessed by the client mobile device 104 and the server system 102 via the network 114. Firewalls 116 can also be implemented between the server system 102 and the client mobile device 104 and the network 114 for an added layer of security.

The connection can be established as a secure connection between the client system 104 and the server 102 and/or the remote data sources 106, 108 and 110. The secure connection can be accomplished by a variety of different methods including, but not limited to, authentication codes and passwords, secure user management tools, firewalls, user authentication, secure user management tools, user pathway mapping and/or encryption, etc. In another example, the server system 102 can include an administrative website that can allow authorized users and members to manipulate and assign user rights (e.g., an administrative tier). The server system 102 can also include a security feature, for example, an access control module 136 to establish, control, and monitor access by client mobile devices 104 to certain data stored within and/or accessible within the GDMS 100. Access control can be governed by an administrator and/or it can be an automated function of the access control module 136 based upon attributes of the data requested and permissions held by the user as further described below.

The server system 102 can represent one and/or more hardware and software servers providing multiple server functions. In addition, one and/or more of the server system 102, the client system 104, and the databases 106, 108 and 110 can form an N-tier system. The server system 102 can also include a web server application subsystem, whereby World Wide Web-enabled applications can provide various aspects of functionality of the GDMS 100. For example, the server system 102 can provide a website where content creators and/or generators can upload geospatially-related data that can be transformed into features referenced to locations within a map of the GDMS 100 for access through the client system 104 connected to the GDMS 100 for geo-visualization of the information. In an alternative implementation, the client system 104 can be implemented as a "thick" client and execute client-installed software for some and/or all of the functionality of the GDMS 100.

A monitor 120, coupled to the client system 104, presents a GDMS interface 122 constructed from data and functionality received through the server system 102. When a user is working within a GDMS 100, s/he is said to be in a GDMS session. The GDMS interface 122 can be generated by a GDMS application executing on the client system 104 and/or alternatively through a server-executed GDMS application that provides the interface components over the network to a dumb terminal and/or a browser application running on the client system 104. The GDMS interface 122 can be a geospatial browser window including a map 124 (e.g., a globe in this illustration), a geo-visualization of data as a layer 126 and individual features 128 on the map 124, a layer manager 130 for selecting data and other features from the databases 106, 108, 110. The GDMS view can also include tool palettes 132 and 134, which can be distinct features of the browser interface, browser plug-ins, and/or separate utilities and/or applications.

In one implementation, the GDMS interface 122 can be in the form of a geospatial browser window and one and/or more geospatially-referenced tools. Access to the data and/or functionality is provided by geospatially-referenced tools (e.g., tool palettes 132 and 134) that are associated with and triggered in relation to a specific location in a common coordinate system (e.g., WGS84 and/or some other shared coordinate system) shared by the tools and the geospatial browser. For example, a tool can provide chemical analysis results pertaining to soil samples taken from the location over time. In another example, a tool can retrieve and analyze financial data pertaining to a construction project on a specified region on the map (e.g., a geo-target location). The data available to such tools is provided from a variety of data sources and associated with each geo-target location within the common coordinate system of the GDMS system 100, such as through specified coordinates (e.g., longitude and latitude), other geographic constraints, and/or organizational constraints (e.g., a project identifier of a project having a specific geographic location and/or constraint, a feature identifier of a feature having a specific geographic location and/or constraint, etc.). In this manner, the user can view a geo-target location through the geospatial browser and access data and/or functionality associated with a geo-target location that is accessible through the tools in the browser. These geo-target locations can be the same location and/or distinct locations.

Figure 31:
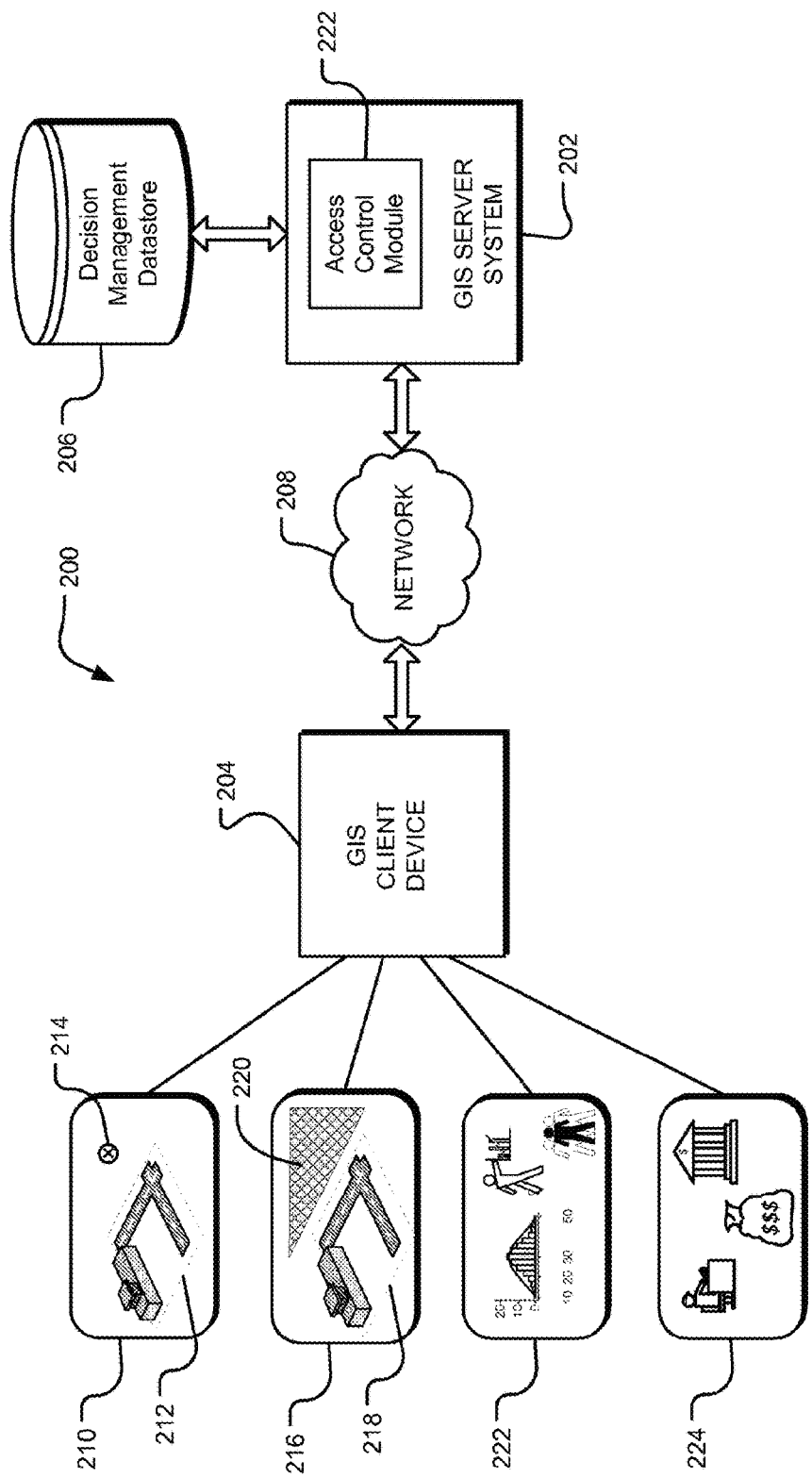
FIG. 31 is a schematic diagram of a geospatial decision management system depicting exemplary implementations of technical and management interface tools available to a client user.

FIG. 31 further illustrates an example of a GDMS 200 for accessing specific data and/or information within a database based on the association of the information with geospatial coordinates. Again, the GDMS 200 can be implemented by a GM and/or GIS server system 202 in communication with a GM and/or GIS client mobile device 204 over a communication network 208, e.g., the Internet. The GM and/or GIS client mobile device 204 can be used to access information in a decision management datastore (DMD) 206 connected with the GM and/or GIS server system 202. The communication network 208 ideally provides the GM and/or GIS client mobile device 204 with high-speed access to indexed data on the DMD 206.

The GM and/or GIS server system 202 can also include a security feature, for example, an access control module 222 to establish, control, and monitor access by GM and/or GIS client mobile devices 204 to certain data stored within and/or accessible via the DMD 206. Access control can be governed by an administrator and/or it can be an automated function based upon attributes of the data requested and permissions held by the user as further described below The data retrieved from the DMD 206 can be presented in a user interface 210, 216, 222, 224 (of which four exemplary configurations are presented in FIG. 31 at the GM and/or GIS client mobile device 204. A feature presented in the user interface 210 (e.g., a geospatial coordinate and/or geographic location) on the client mobile device 204 can be used to access information indexed by features using the DMD 206.

The GM and/or GIS client mobile device 204 can access the indexed data in the DMD 206 by using applications and/or plug-ins, such as technical interfaces 210, 216 and management interfaces 222, 224. The technical interfaces 210, 216 can be used to access technical data associated with particular features. In exemplary implementations such technical data might be biochemical, geochemical, hydro-geological, and/or other physical data on analytes. The management interfaces 118, 120 can be used to access business management data. In exemplary implementations such management data might be business and organizational documents and data associated with particular features. Several examples of the use of such tools to interface with the DMD 206 and extract the data are presented below.

As shown in the first technical interface 210 in FIG. 31, if the GM and/or GIS client mobile device 204 requests information about a particular feature, such as a ground water well located near an airport 212, the GM and/or GIS client mobile device 204 can select the feature 214, i.e., the ground water well, to receive information related to that feature 214. The first technical interface 210 can include a concentric area data tool that can provide technical data related to the ground water well feature 214, for example, latitude and longitude, physical inspection data, water level information, and water contamination information, in a the form of information windows and visual geographic information overlays on a base location map. In an alternate implementation shown in the second technical interface 216, technical data concerning an area of land 220 around, adjacent, and/or near the airport 218 at the location of the feature 214, for example, landscaping, slope, soil composition, and/or grading information can be presented. In a further implementation shown in a first management interface 222, a contract management concentric data tool can provide management data based upon the selected feature 214, for example, information on construction and/or work in progress, zoning and/or easement information, and/or information on any contracts applicable to the feature 214. In a further implementation shown in a second management interface 224, a finance management concentric data tool 120 can also provide management data relating to financial information applying to the feature 214 selected, for example, costs of past repairs and/or current maintenance fees. In some implementations the management interfaces 222, 224 can further comprise a real-time link to a video camera providing a view of the selected feature 214 and any construction and/or activity occurring at the selected feature 214.

Figure 32:
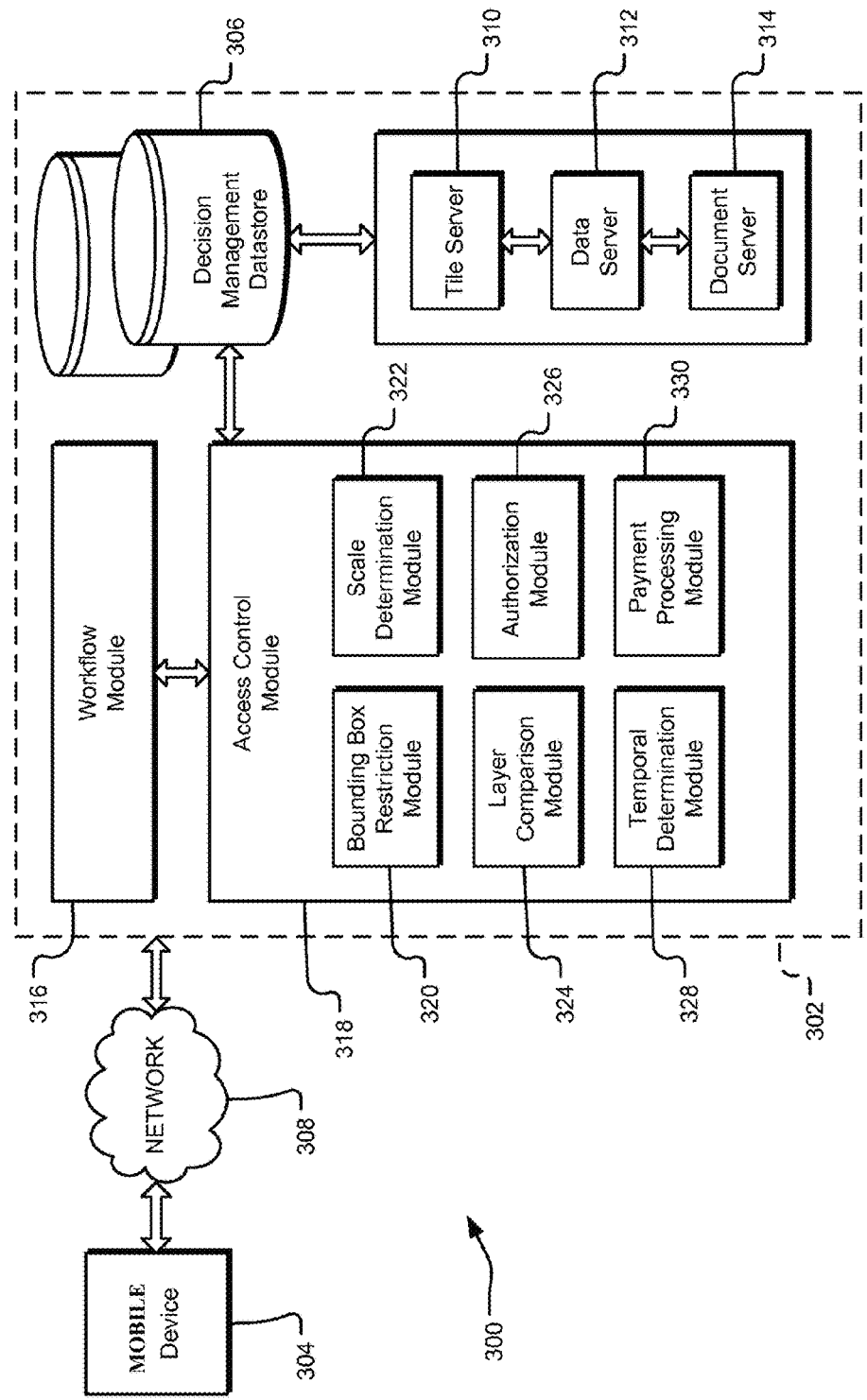
FIG. 32 is a schematic diagram of additional components of a geospatial decision management system for implementing access control to presentation of geospatial attributes within a network.
Figure 33:
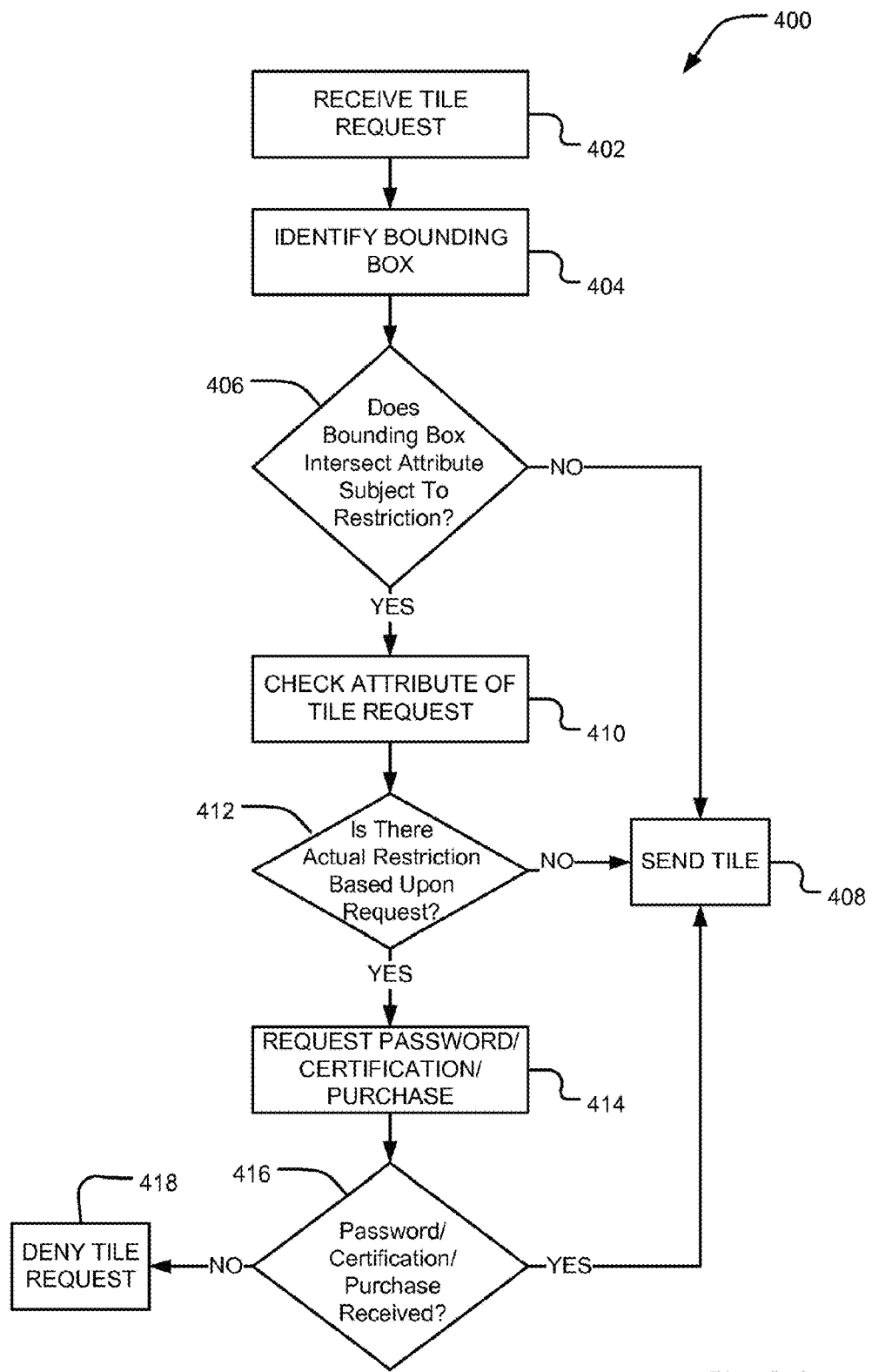
FIG. 33 is a flow diagram of exemplary operations for implementing access control to presentation of geospatial attributes within a geospatial decision management system.

The GDMS shown in FIGS. 32 and 33 is an innovative, GM and/or GIS-based management decision support tool that optimizes the geo-processing and geo-visualization of available GM and/or GIS data, for example, natural resources, building resources, time-management resources, personnel resources, financial resources, and information resources, and others. The GDMS can enable a GM and/or GIS client to easily visualize and interpret large, multifaceted, and complex information sets in order to make comparative analyses of alternatives, identify potential liabilities and opportunities, and optimize program strategies.

The GDMS provides full convergence, and/or integration, of multiple (essentially limitless) disparate data sets within a single virtual three-dimensional (geospatial) model. The disparate data sets, and even sub-data sets within them, can be organized by association with relevant features on the model. For example, groundwater analytical data can be associated with a given groundwater well; building data can be associated with a given building; installation information can be associated with the installation; and command information can be associated with the command. The GDMS full data convergence allows data to be accessed relative to position, scale, resolution, time, and other geospatial attributes and serves as an extremely intuitive and efficient way to organize and access essentially limitless quantities of information.

The GDMS allows queries, filters, and comparisons of data to be completed at the GM and/or GIS server system and then visually represented in three dimensions in near real time at the GM and/or GIS client device. The three-dimensional representation of data helps users and members gain a better understanding of the meaning contained within the data more rapidly than using traditional tabular and/or two-dimensional representations of data. The GDMS thus allows the meaning represented in the three-dimensional data to be rapidly communicated to users and members.

The GDMS improves on traditional closed and/or organization-specific GM and/or GIS by affording live connections to multiple databases. As the databases are updated, the representations afforded by GDMS can thus be current. This allows a fourth dimension, time, to be factored into resource management decisions. Time is an important additional data factor because previous "views" of the data can be compared to current "views" of the data, in order to gain an understanding of the rates of change (or dynamics) of the real system. In other words, the GDMS allows for differences between time states to be understood and factored into a decision process.

In FIG. 30 a GDMS 100 can be used to provide access to specific sections within documents which are associated with a particular geographic coordinate, e.g., Product/Service/Retail-Geographic Mapping-Company/Local & Socially Conscious Information-Social Networking (PSR-GM-C/L&SC-SN) information. More specifically, a GDMS 100 user (or GM and/or GIS client) can select a specific location and/or 'feature' on a map and be directed to Product/Service/Retail-Geographic Mapping-Company/Local & Socially Conscious Information-Social Networking (PSR-GM-C/L&SC-SN) information, e.g., information and/or documents, as well as entire sets of information and/or documents themselves associated with a product, service, company and/or local information, including socially conscious information, which contain data and/or information relevant to that specific 'feature' and/or location selected. Said another way, specific relevant data can be provided to a user based upon the 'feature' selected, not just based upon a traditional search query. Thus, GDMS 100 links and/or ties a 'feature,' and/or specific geographic location, to an indexed database of data. Examples of documents that can have a geospatial associated, but are not amenable to layered geo-visualization can include one and/or more components of Product/Service/Retail-Geographic Mapping-Company/Local & Socially Conscious Information-Social Networking (PSR-GM-C/L&SC-SN) information, e.g., but not limited to, advertisements, product information, socially conscious information about companies, their products, local cities and/or communities, and/or the like, e.g., real estate contracts concerning a particular property, title records, covenants, plats, zoning regulations, construction plans, and others. The specific relevant data provided to a user can comprise only portions and/or sections of documents, maps, and/or images related to that specific 'feature' selected. This can greatly increase efficiency of GM and/or GIS by taking a user directly to a relevant section of a document, which can be hundreds and/or thousands of pages in length.

The GDMS speeds the process of bringing discordant stakeholder groups to consensus by providing real-time and highly comprehensible (due to the visual output) answers to questions offered in meetings and/or any networking and/or social networking methods, systems and/or resources. Moreover, the technology introduced in the GDMS yields truly optimal solutions to highly complex and nonlinear physical problems using reasonable computational times and resources, including associating company, local and product and/or service information, comprising social conscious information, data, and other resources. The modular design of GDMS permits coupling to virtually any simulation code. The GDMS can also be linked to and implemented within user-friendly and widely-accepted graphical user interfaces (GUIs) including web browser applications.

As should be apparent from the above discussion, the GDMS is a powerful tool that can be used to access enormous quantities of data stored at remote locations. When using the GDMS, control access to data stored at remote locations, for example, an access control module 222 as depicted in FIG. 31 can be implemented. An administrator of the data stored at the remote location to have server-side control over varying levels of access to data. Thus, in some implementations, access control can be exercised on the server-side; however, in other implementations this level of access control can be exercised on the client side. Further, access control can also be exercised at/by a given database. It can also be desirable to have different levels of authorization to control data access for employees having different roles within an organization. For example, a higher level officer, such as a supervisor and/or general, can have unlimited access to classified data, while entry-level employees can only have access to non-classified data. These levels of authorization can be created and adjusted by an administrator to permit varying levels of access to the data. The GDMS can specifically establish different levels of access to the data can be controlled for each individual and/or can be controlled in groups (e.g., hierarchically) by the administrator and can be created and maintained using operations implemented within the access control module 222.

The varying levels of accessibility to data can be controlled using a number of different methods including, but not limited to, authentication codes and passwords, secure user management tools, firewalls, user authentication, user pathway mapping, and/or encryption. The levels of access control to the data can also be controlled by the creation of an individual profile for each user identifying the user's role in the organization and specifying their level of access to the data. Then, when a user logs onto a system, their level of access to data can be known by the system and the user can then only be able to view and/or access data that was commensurate with their level of authorization.

The layers of data can also be saved so that other authorized users and members can access the saved layers to view and make additional changes to (or comments on) the layers and then save those additional changes. This allows a given user to open the selected state, make changes, alterations, and comments, and save this new altered state for review and potential further modification by others. Certain GDMS view state data and/or functionality can and/or can not be accessible to and/or be editable by a user based upon access permissions that have been granted to and/or withheld from the user.

In one implementation, access to the different map tiles and/or layers of data can be based upon the scale and/or resolution of the map and/or layer, i.e., access is 'scale-driven.' The contextual and/or 'smart' layers of data can be turned on and/or off by an administrator based upon the authorization to access each layer of data. A user's ability to change and/or alter the layers of data can also be dependent upon their level of authorization.

With reference now to FIG. 32, an exemplary GDMS 300 is implemented in a server system 302 with a DMD 306 as described above. The server system 302 can further include additional data servers, for example, a map tile server 310 indexed by coordinates, reference number, and/or feature; one and/or more layer servers 312 that provide feature and layer information also indexed by reference to geospatial coordinates, tile reference number, and/or feature; and a document server 314 that can provide Product/Service/Retail-Geographic Mapping-Company/Local & Socially Conscious Information-Social Networking (PSR-GM-C/L&SC-SN) information, and/or other documents and information associated with a geo-target location (again indexed by coordinate, reference number, and/or feature) in a format not amenable to geo-visualization. As shown in FIG. 32, the data servers 310, 312, 314 can be connected to the DMD 306 and/or to one another to maximize operating efficiency of the datastore 306. In some implementations, the data servers 310, 312, 314 and the datastore 306 can be located within the same server system 302, while in other implementations, the data servers 310, 312, 314 and the datastore 306 can be distributed across a network. The server system 302 can further comprise a workflow module 316 and an access control module 318 through one and/or a number of different types of software programs (i.e., programming logic and/or computer executable instructions) utilizing a variety of different types of measures to control access to the DMD 306. The workflow module 316 and the access control module 318 can be positioned between the client mobile device 304 and the DMD 306, as shown in FIG. 32, to provide a layer of access control between the client device 304 and the DMD 306 and/or the data servers 310, 312, 314. In other implementations, the access control module 318 and workflow module 316 can be partially and/or substantially implemented in other locations, for example, on the client device 304, and/or within the communications network 308.

In one implementation of the GDMS 300, as shown in FIG. 32, the access control module 318 and workflow module 316 can be separate from the DMD 306 and the servers 310, 312, 314. In other implementations, the access control module 318 and 310, 312, 314. The access control module 318 and workflow module 316, DMD 306, and data servers 310, 312, 314 are shown as separate components in FIG. 32 for simplicity of illustration, but can all be combined into one server system 302, system datastore, and/or network.

The access control module 318 and workflow module 316 can be operatively associated and can control access to different layers of data via the DMD 306 to facilitate control over what users and members can access through the DMD 306. The access control module 318 and workflow module 316 can work in concert to provide a security control function that grants and/or denies a user access to map tiles, information, documents, features, applications, resolution, elevation views, aerial extent views, and/or system access based on the users and members identification. This also allows the DMD 306 to provide only the information, documents, features, and applications that are authorized and relevant to a given user, which can provide workflow efficiencies.

By streamlining user workflow, the availability of information and applications can be assigned by appropriate and relevant scale and/or resolution intervals. In this construct, application icons and information layers can appear and disappear based on the scale and/or resolution presented to the user within the system at any given point in time. This streamlines tasks by eliminating those information and application choices that are not relevant at a certain scale (and hence represent clutter) and by allowing more efficient navigation to the information and application choices that remain, i.e., those that are relevant at a given scale.

The workflow module 316 is a tool which can also lead users and members though data sets by progressively 'walking' a user through design steps using interactive design tools which can traverse more than one layer of data. The workflow module 316 can be particularly helpful for novice users and members as they attempt to navigate through the vast amounts of data accessible via the DMD 306. In one exemplary implementation, the features and functionality of the workflow module 316 can be turned on and off based upon the scale and/or resolution that a user attempts to access. In this embodiment, the workflow module 316 can operate by correlating the resolution and/or magnification of the geo-visualization data to conform to a user's level of authorization, thus controlling which users and members are able to view the most detailed and/or secure data.

The workflow module 316 can allow a system administrator to create within the DMD 306 different levels and/or groups of levels of access to the data for each individual within an organization. In this implementation, each individual within an organization can be given an individual profile. The individual profile can include information such as their role and/or security clearance within an organization. The individual profiles can be stored on a database coupled to, and/or integral with, the DMD 306. The profiles and/or lists of users and members can contain information on the level of information, and/or data, that each user is permitted to view. This individual profile can be accessed by the workflow module 316 and/or access control module 318 when individuals attempt to access data through the DMD 306 to permit the individual to have only a pre-determined level of access to data. When individuals attempt to access the DMD 306, their individual identities can be linked to their profile such that their access to the DMD 306 can be referenced and/or validated before they are permitted to access the DMD 306.

The workflow module 316 and access control module 318 can also allow system administrator of the DMD 306 to create and edit different levels of access to data for individuals and/or groups within an organization. For example, in the military, all individuals having equivalent rank and/or security clearance can have the same amount of access to the data within the datastore 306. Thus, the limited access is applied uniformly to the entire group of individuals, such that all of the individuals in the group have the same level of access to the data. This can be referred to as 'hierarchical access control' because groups and/or individuals can be grouped together for purposes of determining server-side access control levels.

Alternately, in an implementation of the GDMS 300 in an open and/or public platform, rather than a system internal to and/or controlled by a particular organization, access to data can be controlled based merely upon geospatial attributes, for example, the geo-target location (coordinates) of a tile request, scale of a tile request, resolution of a tile request, payment for access, the combination of layers requested, and/or freshness and/or staleness of data requested. Another example of a geospatial attribute can be the ability to download a geospatial dataset as opposed to merely having the ability to view a geo-visualization of such data, e.g., as a layer and/or set of features, e.g., Product/Service/Retail-Geographic Mapping-Company/Local & Socially Conscious Information-Social Networking (PSR-GM-C/L&SC-SN) information. A further example of a geospatial attribute can be the ability to save and/or bookmarks geo-visualization states defines by various combinations of underlying mar tiles and overlying layers and features for easily returning to such states as opposed to having to recreate the same filter query to return to a prior state. In such a public platform, contributors of GM and/or GIS data accessible for geo-visualization can place limits and/or restrictions on the availability of and/or accessibility of the GM and/or GIS data. A public implementation of the workflow module 316 can be used as an interface for data sources to either upload data to the DMD 306 and/or otherwise register data with the DMD 306 so that the DMD 306 can locate and access the data from a remote server and/or data store managed by the data source.

In order to place access restrictions on data, the data source can use the workflow module 316 to tag and/or otherwise encode an entire dataset and/or portions of the dataset with restriction instructions associated with one and/or more geospatial attributes. In one implementation, the workflow module 316 can provide tools to tag datasets, for example, using extensible mark-up language (XML) to indicate the presence and nature of a restriction tied to a particular map tile, data layer, and/or feature. In an alternate embodiment, a data source can encode a dataset itself as long as the tags are in a language and format that the DMD 306 understands.

As depicted in FIG. 32, the access control module 318 can be understood as composed of a number of functional sub-modules for implementing a public platform with controlled access to GM and/or GIS data. Such sub-modules can include, for example, a bounding box restriction module 320, a scale determination module 322, a layer comparison module 324, an authorization module 326, a temporal determination module 328, and a payment processing module 330. Each of these modules can provide separate functionality, but often can operate in conjunction with each other to make an access control determination as further described below. It can be desirable to control access to data for a variety of reasons, for example, to generate revenue for a particular data source.

The bounding box restriction module 320 within the access control module 318 can be used to provide a gross initial screening to determine whether a tile request by a user falls within the range of a bounding box that is entirely off-limits for presentation without a password and/or certificate due to proprietary and/or security concerns. The bounding box restriction module 320 monitors all tile requests for GM and/or GIS data to determine whether any of the requested tiles falls within a restricted bounding box. The bounding box can be also understood as defining a collection of records in a GM and/or GIS database that have geospatial coordinate fields associated with the data with values falling within the range of the bounding box. An additional field in the data records can indicate whether there is a restriction placed on the data record and the nature of the restriction.

If a requested tile is restricted, then the bounding box restriction module 320 can interface with the DMD 306 and instruct that the requested GM and/or GIS data and/or the tiles thereof that fall within the bounding box be withheld from delivery by the DMD 306 to the client 304. However, this access restriction can be overridden if the requestor can provide a valid password and/or certificate as further discussed below. The functions provided by the bounding box restriction module 320 can be used by the other modules within the access control module 318 in order to identify the geographic boundaries of a map tile request and/or data layer.

The scale determination module 322 can be used to control access to data based upon the scale and resolution of the GM and/or GIS data requested. The term "scale" is used herein in the cartographic sense, e.g., 1 cm:1 km (1 cm of the image presented on the screen corresponds to 1 km in real terms), whereas "resolution" refers to the sharpness of the image file available for presentation on the screen (e.g., the number of pixels and/or dots per inch in a raster image). A large scale, e.g., 1:1 generally will correspond to an image of high resolution whereas a small scale, e.g., 1:100,000 will generally correspond to an image of low resolution as there is a limited ability of a presentation screen to present a very high resolution at a small scale—there is physically no room. In the context of access control, it can be perfectly acceptable to provide map tiles of a particular coordinate area at a scale of 1 cm:100 m at a relatively coarse resolution (e.g., 60 dpi), but it can be unacceptable to provide a larger scale (e.g., 1 cm:1 m) at a high resolution (e.g., 300 dpi), and/or at any resolution at all, e.g., because that combination of scale and resolution has a premium value and is coded as inaccessible without payment of a fee.

The scale determination module 322 monitors requests for GM and/or GIS data having a scale and/or resolution attribute. If there is a scale and/or resolution change requested, the scale determination module 322 can interface with the DMD 306 and request that the GM and/or GIS data be held for screening by the scale determination module 322 to determine whether the requested GM and/or GIS data has a scale and/or resolution restriction, and/or a combination thereof, and the nature of the restriction.

The layer comparison module 324 can be used to control access to data based upon the types and combinations of data layers of the GM and/or GIS data requested for overlay on a map. For example, it can be perfectly acceptable to provide a geo-visualization of a data layer showing locations of Product/Service/Retail-Geographic Mapping-Company/Local & Socially Conscious Information-Social Networking (PSR-GM-C/L&SC-SN) information. In a further implementation, the layer comparison module 324 can be configured to save identifying information of a user making a layer combination request associated with interaction relating to one and/or more Product/Service/Retail-Geographic Mapping-Company/Local & Socially Conscious Information-Social Networking (PSR-GM-C/L&SC-SN) information.

In each of the examples of geospatial attribute-driven access control presented above, it is noted that request denials of map tiles and/or data layers can be overridden by the provision of a valid certificate and/or password. The authorization module 326 provides an opportunity for requestors to enter a password, certificate, and/or other identification sufficient to overcome a denial of presentation of a requested map region, data layer, and/or feature. In such a case, if a requester enters the appropriate password and/or presents an appropriate certificate, the authorization module 326 can direct the DMD 306 to access and present the requested GM and/or GIS data.

Another exemplary function of the access control module 318 can be embodied in the temporal determination module 328 that allows and/or denies access to map tiles and/or layers based upon the age of the information comprising the particular dataset, e.g., Product/Service/Retail-Geographic Mapping-Company/Local & Socially Conscious Information-Social Networking (PSR-GM-C/L&SC-SN) information. In an example, data that is significantly older can develop additional value again for use in temporal studies to identify trends. In such a case, the data can again only be accessible upon payment of a fee for the service. The temporal determination module 328 manages the temporal worth of GM and/or GIS data, for example, by examining time stamps associated with particular GM and/or GIS datasets and comparing the timestamps to any tags that can be encoded with the data indicating that the GM and/or GIS dataset is subject to a fee for service within particular ranges of age.

A further exemplary function of the access control module 318 can be the acceptance of payment for access to GM and/or GIS datasets through the payment processing module 330. Upon receipt of a request for a GM and/or GIS dataset, the payment processing module 330 can query the relevant datastore to determine whether the dataset is subject to a fee for service, for example membership, registration, and/or subscription for website access for providing coupons and/or discounts and associated company, local information, including socially conscious information, such as Product/Service/Retail-Geographic Mapping-Company/Local & Socially Conscious Information-Social Networking (PSR-GM-C/L&SC-SN) information. If so, the payment processing module 330 can instruct the DMD 306 to withhold delivery of a dataset to a requestor until payment is made. In an alternate implementation, the payment processing module 330 can maintain a schedule of fees charged by each contributor for particular datasets and compare incoming dataset requests with the schedule to determine whether a fee is required to access the data and instruct the DMD 306 accordingly. In another implementation, upon payment of a fee for access to a restricted dataset, the payment processing module 330 can issue a password and/or certification to the requester who would then present the password/certificate to the authorization module 326 to seek access to the dataset through that component. The payment processing module 330 can actually accept and process access payments from requesters, and/or it can interface with a third party payment processing service (e.g., PayPal®) to actually process fund transfers.

FIG. 33 depicts an exemplary set of access control operations 400 that can be performed according to one implementation of an access control module within a GDMS. Initially the access control module receives a tile request in a receiving operation 402 associated with one and/or more Product/Service/Retail-Geographic Mapping-Company/Local & Socially Conscious Information-Social Networking (PSR-GM-C/L&SC-SN) information. It should be understood that any request from a client device for GM and/or GIS data, e.g., Product/Service/Retail-Geographic Mapping-Company/Local & Socially Conscious Information-Social Networking (PSR-GM-C/L&SC-SN) information, be it a particular map and/or a dataset for a layer and/or a feature and/or even a document, will necessarily be associated with one and/or more map tiles. In order to present a geo-visualization interface, all of the data can have a reference to particular geospatial coordinates which can optionally broken down in units of map tiles.

Once a tile request is received, the access control module can next identify a bounding box containing all the tiles in the tile request in identification operation 404. Creation of a bounding box allows the access control module to easily determine whether access is restricted to presentation of any of the map tiles requested. In a comparison operation 406, the access control module can simply compare whether any of the entire region of the bounding box intersects with a geospatial attribute that can be subject to a presentation restriction. Recall that there can be any number of geospatial attributes that can be designated as having restriction requirements, for example, the geo-target location (coordinates) of a tile request itself, the scale of the tile request, resolution of a tile request, an angle of view (e.g., plan, aerial, street level, etc.), payment for access, the combination of layers requested, and/or the freshness and/or staleness of data requested. If there are no geospatial attribute restrictions associated with any of the tiles in the bounding box, the process 400 can approve all of the tiles and instruct the DMD to send the particular map tiles, layer dataset, features, and/or other information in sending operation 408.

If the access control module recognizes that there is a restriction associated with one and/or more of the tiles in the bounding box, the access control module can next determine what kind of geospatial attribute is implicated in the bounding box restriction in checking operation 410. The access control module can then invoke one and/or more of the sub-modules described above for further processing assistance. The appropriate sub-module(s) can first determine whether an actual restriction must be imposed on the data request pursuant to the geospatial attribute in determination operation 412. This operation determines whether the requested a value of the geospatial dataset and/or feature actually conflicts with the restriction set by the data contributor. For example, the tile request at a resolution value restricted by the data contributor without additional authorization and/or payment and the tile would be considered actually restricted. Alternatively, if the tile request is at a resolution value within the allowable bounds set by the contributor, then the attribute of the request would not be considered restricted and the tiles and/or associated data would be approved for presentation in sending operation 408.

If the geospatial attribute associated with the tile request is found to be "set high," then the access control module will request that some form of authentication be presented by the requester before the data are released for presentation in requesting operation 414. Responses to the requesting operation are then examined in determination operation 416 to determine what information should be provided relating to Product/Service/Retail-Geographic Mapping-Company/Local & Socially Conscious Information-Social Networking (PSR-GM-C/L&SC-SN) information. Similarly, if the GM and/or GIS dataset is a premium service requiring additional payment, upon payment by the requester the access control module can approve the request and the tile are sent in sending operation 408. If a requester cannot provide the appropriate password and/or certification, and/or chooses not to pay for a premium service, then the access controller will deny the tile request in denying operation 418. The GDMS can either inform the requester that the request has been denied and/or alternatively return a GM and/or GIS data set as responsive as possible to the request, but without providing the restricted information.

Some implementations described herein can be implemented as logical steps in one and/or more computer systems. The logical operations of the described systems, apparatus, and methods are implemented (1) as a sequence of processor-implemented steps executing in one and/or more computer systems and (2) as interconnected machine modules within one and/or more computer systems. The implementation is a matter of choice, dependent on the performance requirements of the computer system implementing the described system, apparatus, and method. Accordingly, the logical operations making up the implementations of the systems, apparatus, and methods described herein are referred to variously as operations, steps, objects, and/or modules.

In some implementations, articles of manufacture are provided as computer program products that cause the instantiation of operations on a computer system to implement the invention. One implementation of a computer program product provides a computer program storage medium readable by a computer system and encoding a computer program. Another implementation of a computer program product can be provided in a computer data signal embodied in a carrier wave by a computing system and encoding the computer program.

Figure 34:
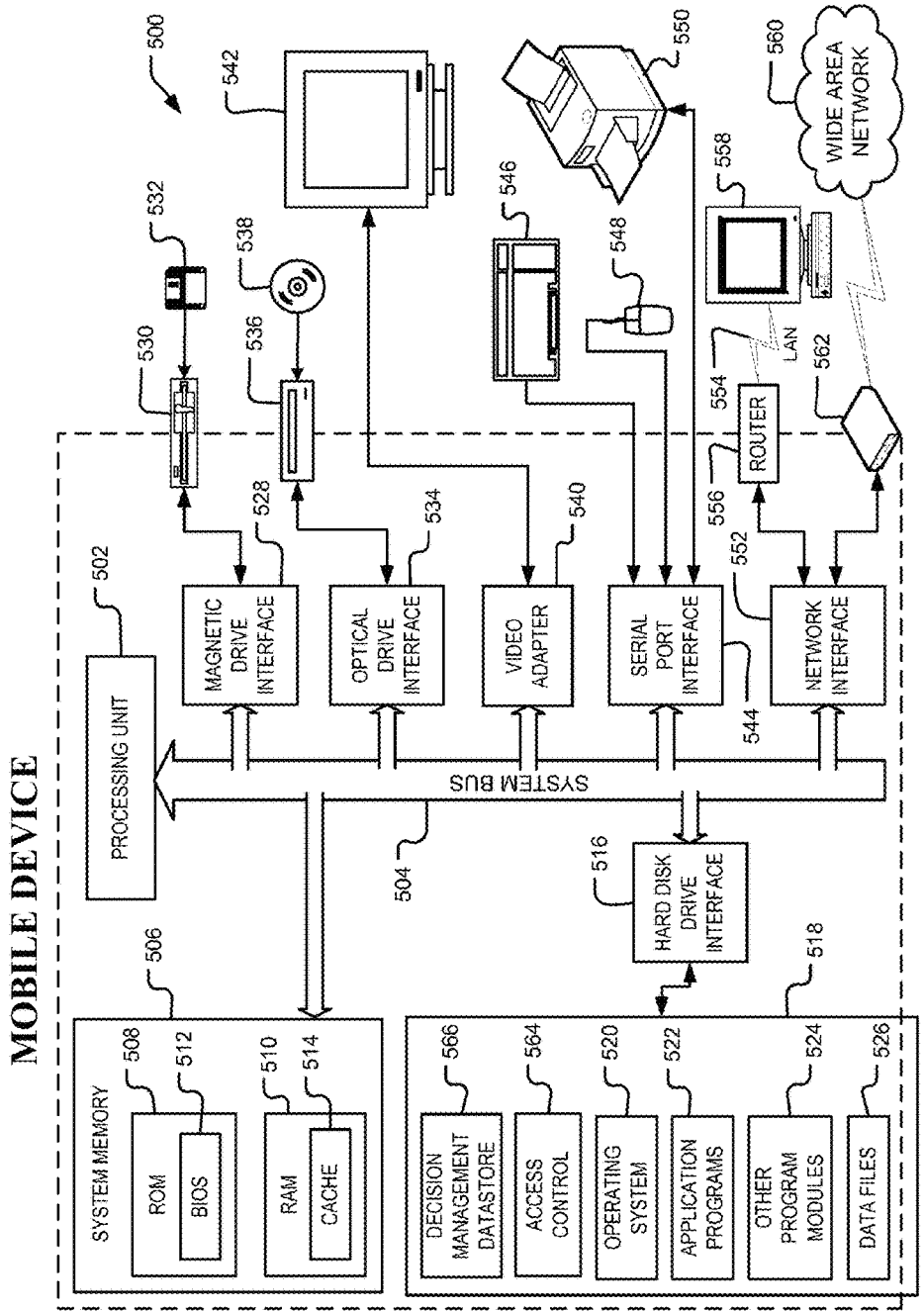
FIG. 34 is a schematic diagram of an exemplary implementation of a general purpose computer system that that can be used to implement various aspects of a geospatial decision management system, including access control.

An exemplary computer system 500 for implementing the file origin determination processes above is depicted in FIG. 34. The computer system 500 can be a computer server with internal processing and memory components as well as interface components for connection with external input, output, storage, network, and other types of peripheral devices. Internal components of the computer system in FIG. 34 are shown within the dashed line and external components are shown outside of the dashed line. Components that can be internal and/or external are shown straddling the dashed line. Alternatively to a server, the computer system 500 can be in the form of any of a personal computer (PC), a notebook and/or portable computer, a tablet PC, a handheld media player (e.g., an MP3 player), a smart phone device, a video gaming device, a set top box, a workstation, a mainframe computer, a distributed computer, an Internet appliance, and/or other computer devices, and/or combinations thereof.

The computer system 500 includes a processor 502 and a system memory 506 connected by a system bus 504 that also operatively couples various system components. There can be one and/or more processors 502, e.g., a single central processing unit (CPU), and/or a plurality of processing units, commonly referred to as a parallel processing environment. The system bus 504 can be any of several types of bus structures including a memory bus and/or memory controller, a peripheral bus, a switched-fabric, point-to-point connection, and a local bus using any of a variety of bus architectures. The system memory 506 includes read only memory (ROM) 508 and random access memory (RAM) 510. A basic input/output system (BIOS) 512, containing the basic routines that help to transfer information between elements within the computer system 500, such as during start-up, is stored in ROM 508. A cache 514 can be set aside in RAM 510 to provide a high speed memory store for frequently accessed data.

A hard disk drive interface 516 can be connected with the system bus 504 to provide read and write access to a data storage device, e.g., a hard disk drive 518, for nonvolatile storage of applications, files, and data. A number of program modules and other data can be stored on the hard disk 518, including an operating system 520, one and/or more application programs 522, other program modules 524, and data files 526. In an exemplary implementation, the hard disk drive 518 can further store access control module 564 for restricting access to map and data files and the decision management datastore 566 for housing and managing GM and/or GIS databases according to the exemplary processes described herein above. Note that the hard disk drive 518 can be either an internal component and/or an external component of the computer system 500 as indicated by the hard disk drive 518 straddling the dashed line in FIG. 37. In some configurations, there can be both an internal and an external hard disk drive 518.

The computer system 500 can further include a magnetic disk drive 530 for reading from and/or writing to a removable magnetic disk 532, tape, and/or other magnetic media. The magnetic disk drive 530 can be connected with the system bus 504 via a magnetic drive interface 528 to provide read and write access to the magnetic disk drive 530 initiated by other components and/or applications within the computer system 500. The magnetic disk drive 530 and the associated computer-readable media can be used to provide nonvolatile storage of computer-readable instructions, data structures, program modules, and other data for the computer system 500.

The computer system 500 can additionally include an optical disk drive 536 for reading from and/or writing to a removable optical disk 538 such as a CD ROM and/or other optical media. The optical disk drive 536 can be connected with the system bus 504 via an optical drive interface 534 to provide read and write access to the optical disk drive 536 initiated by other components and/or applications within the computer system 500. The optical disk drive 530 and the associated computer-readable optical media can be used to provide nonvolatile storage of computer-readable instructions, data structures, program modules, and other data for the computer system 500.

A display device 542, e.g., a monitor, a television, and/or a projector, and/or other type of presentation device can also be connected to the system bus 504 via an interface, such as a video adapter 540 and/or video card. Similarly, audio devices, for example, external speakers and/or a microphone (not shown), can be connected to the system bus 504 through an audio card and/or other audio interface (not shown).

In addition to the monitor 542, the computer system 500 can include other peripheral input and output devices, which are often connected to the processor 502 and memory 506 through the serial port interface 544 that is coupled to the system bus 506. Input and output devices can also and/or alternately be connected with the system bus 504 by other interfaces, for example, a universal serial bus (USB), a parallel port, and/or a game port. A user can enter commands and information into the computer system 500 through various input devices including, for example, a keyboard 546 and pointing device 548, for example, a mouse. Other input devices (not shown) can include, for example, a microphone, a joystick, a game pad, a tablet, a touch screen device, a satellite dish, a scanner, a facsimile machine, and a digital camera, and a digital video camera. Other output devices can include, for example, a printer 550, a plotter, a photocopier, a photo printer, a facsimile machine, and a press (the latter not shown). In some implementations, several of these input and output devices can be combined into a single device, for example, a printer/scanner/fax/photocopier. It should also be appreciated that other types of computer-readable media and associated drives for storing data, for example, magnetic cassettes and/or flash memory drives, can be accessed by the computer system 500 via the serial port interface 544 (e.g., USB) and/or similar port interface.

The computer system 500 can operate in a networked environment using logical connections through a network interface 552 coupled with the system bus 504 to communicate with one and/or more remote devices. The logical connections depicted in FIG. 34 include a local-area network (LAN) 554 and a wide-area network (WAN) 560. Such networking environments are commonplace in home networks, office networks, enterprise-wide computer networks, and intranets. These logical connections can be achieved by a communication device coupled to and/or integral with the computer system 500. As depicted in FIG. 34, the LAN 554 can use a router 556 and/or hub, either wired and/or wireless, internal and/or external, to connect with remote devices, e.g., a remote computer 558, similarly connected on the LAN 554. The remote computer 558 can be a PC client, a server, a peer device, and/or other common network node, and typically includes many and/or all of the elements described above relative to the computer system 500.

To connect with a WAN 560, the computer system 500 typically includes a modem 562 for establishing communications over the WAN 560. Typically the WAN 560 can be the Internet. However, in some instances the WAN 560 can be a large private network spread among multiple locations. The modem 562 can be a telephone, smart phone modem, a high speed modem (e.g., a digital subscriber line (DSL) modem), a cable modem, and/or similar type of communications device. The modem 562, which can be internal and/or external, is connected to the system bus 518 via the network interface 552. In alternate embodiments the modem 562 can be connected via the serial port interface 544. It should be appreciated that the network connections shown are exemplary and other means of and communications devices for establishing a communications link between the computer system and other devices and/or networks can be used. Connection of the computer system 500 with a WAN 560 allows the decision management datastore 566 the ability to access remote GM and/or GIS datastores to provide for a distributed GM and/or GIS platform.

All directional references (e.g., proximal, distal, upper, lower, upward, downward, left, right, lateral, front, back, top, bottom, above, below, vertical, horizontal, clockwise, and counterclockwise) are only used for identification purposes to aid the readers understanding of the present invention, and do not create limitations, particularly as to the position, orientation, and/or use of the invention. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto can vary.

Figure 35:
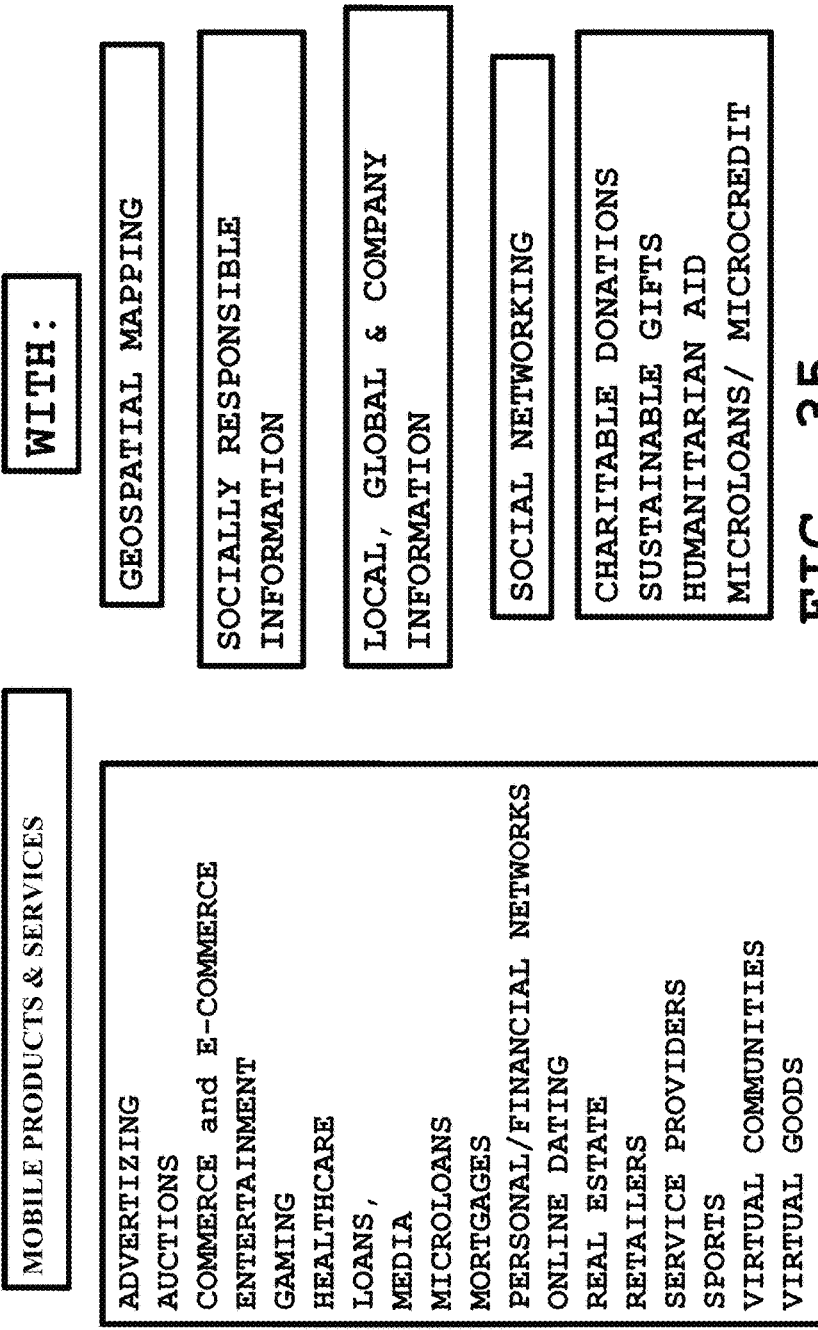
FIG. 35 is flow chart and a list of representative products and services that can be provided in combination with geospatial mapping, web mapping, mobile mapping & layers geographic information, socially responsible information, local, global and company information, social networking, and charity/aid, according to the present invention. As presented in FIG. 35, the present invention provides in one aspect a delivery system for a geospatial website for a multidimensional representation of information and/or scalable versions of web and mobile device or portable device (e.g. mobile device, telephone, smart phone, PDA, laptop computer, Android, iOS devices, iPhone, 3G, 3GS, iPhone, iPad, iPad Touch, etc.) content for an infrastructure and global platform that provides users and members and businesses of all types and sizes with access to broad markets for the delivery of online coupons, mobile services, products & services, clickable advertisements & mobile advertisements by geo-target location, and allows users to engage in geo-target location-based social networking integration & mobile services, search and pay for coupons, mobile services, products & services, clickable advertisements & mobile advertisements by geo-target location, including microloans or microcredit, humanitarian aid and support other worldly causes through charitable donations (collectively referred to as "Product or Service" as any product, service, or service provider or subgroup thereof) through combined coupons, mobile services, products & services, clickable advertisements & mobile advertisements by geo-target location with Geospatial Mapping/Web Mapping/Mobile Mapping/Company-Local & Socially Conscious Information/Location-Based Social Networking Integration & Mobile Services ("PS-GM-C/L&SC/I-SN") on a three dimensional geospatial platform using geospatial mapping, web mapping, mobile mapping & layers geographic information technology.

As presented in FIG. 35, The present invention provides in one aspect a delivery system for a geospatial website for a multidimensional representation of information and/or scalable versions of web and mobile device or portable device (e.g. mobile device, telephone, smart phone, PDA, laptop computer, Android, iOS devices, iPhone, 3G, 3GS, iPhone, iPad, iPad Touch, etc.) content for an infrastructure and global platform that provides users and members and businesses of all types and sizes with access to broad markets for the delivery of coupons, mobile services, products & services, clickable advertisements & mobile advertisements by geo-target location, daily deal coupons and free or discounted printable coupons, products & services, clickable advertisements & mobile advertisements by geo-target location from merchants, business owners, B2B business directory, retailers and major brands around the world, and allows users to engage in geo-target location-based social networking integration & mobile services, online auctions, daily deal coupons & free or discounted printable coupons, products & services, clickable advertisements & mobile advertisements by geo-target location from merchants, business owners, B2B business directory, retailers and major brands around the world, e-commerce, media and entertainment, sports, personal & financial, social networking, online dating, gaming, retail stores, virtual communities and virtual goods, microloans or microcredit, humanitarian aid and support other worldly causes through charitable donations (collectively referred to as "Products & services" as any product, service, or service provider or subgroup thereof) through combined coupons, mobile services, products & services, clickable advertisements & mobile advertisements by geo-target location with Geospatial Mapping/Web Mapping/Mobile Mapping/Company-Local & Socially Conscious Information/Location-Based Social Networking Integration & Mobile Services ("PS-GM-C/L&SC/I-SN") on a three dimensional geospatial platform using geospatial mapping, web mapping, mobile mapping & layers geographic information technology.

FIG. 36 presents a flow chart showing a typical transaction to search and pay for a coupon, mobile services, products & services by geo-target location that provides a portion of the sale proceeds to microloans or microcredit, humanitarian aid and support other worldly causes through charitable donations or sustainable gifts. "Coupons, mobile services, products & services, clickable advertisements & mobile advertisements by geo-target location, search and pay for coupons, mobile services, products & services, clickable advertisements & mobile advertisements by geo-target location, retail stores, virtual communities and virtual goods, microloans or microcredit, humanitarian aid and support other worldly causes through charitable donations or sustainable gifts from around the world by geo-target location or anywhere in the world on the present inventions unique "live view" of the planet."

POTENTIAL ASPECTS OR ELEMENTS OF THE CLAIMED INVENTION THAT CAN BE OPTIONALLY EXCLUDED OR NEGATIVELY CLAIMED. The present invention can also in particular claimed embodiments exclude or negatively claim one or more aspect of the following list, e.g., to more particularly recite or exclude embodiments or elements that might occur in cited or other published art. Accordingly, the present invention can optionally exclude, not include, or not provide, one of more, or any combination of, coupons, mobile services, products & services, clickable advertisements & mobile advertisements by geo-target location, daily deal coupons and free or discounted printable coupons, products & services, clickable advertisements & mobile advertisements by geo-target location from merchants, business owners, B2B business directory, retailers and major brands around the world, and allows users to engage in geo-target location-based social networking integration & mobile services, mobile advertisements, mobile text, mobile SMS marketing, mobile search, mobile multimedia, mobile operating system, mobile device, mobile banking, mobile payment, mobile wallet and/or electronic payments, mobile wallet, mobile express checkout, mobile money transfer, mobile social media widgets, mobile keywords, mobile coupons, mobile instant messaging marketing, mobile voting, mobile eCards, mobile short codes, mobile commerce, mobile shopping, mobile push content, geo-mobile, geo-social (collectively referred to as "Mobile Services" as any product, service, or service provider or subgroup thereof) in connection with server and/or cloud based internet with access to coupons, mobile services, products & services, clickable advertisements & mobile advertisements by geo-target location, daily deal coupons and free or discounted printable coupons, products & services, clickable advertisements & mobile advertisements by geo-target location from merchants, business owners, B2B business directory, retailers and major brands around the world (collectively referred to as "Coupons" as any product or service or subgroup thereof), online auctions, products, services, e-commerce, media and entertainment, sports, personal & financial, social networking, online dating, gaming, and/retail stores, virtual communities and virtual goods, microloans or microcredit, humanitarian aid and support other worldly causes through charitable donations or sustainable gifts. In addition, users and members of the website will be able to view, e.g., but not limited to, residential and/or commercial real estate listings, loans and quotes, auto loans, mortgages, banking services, family fun, sports, restaurants, events, consumer packaged goods, groceries, apparel, beverages, books & magazines, foods, health care, household, office, personal care, pet care, photography, autos, beauty products, business, classic car parts, restoration and maintenance services, collectibles & art, custom car parts, restoration and maintenance services, deals & gifts education, electronics, fashion, financial, healthcare, home, outdoor & décor, hospitality, insurance, online services, other legal, marketing, medical facilities, medical insurance, medical retailers, motors, pets, physicians, dentists, other practioners, public services, psychics, intuitive, metaphysical, mediums & spiritual advisors, real estate, skincare & cosmetics, sports, travel, tourism, wedding, parties & media and entertainment, online dating, and the like (collectively referred to as "Products & services" as any product, service, or service provider, or subgroup thereof), in combination with geospatial website for a multidimensional representation of information and/or scalable versions of web content that comprises social networking and/or socially conscious information and/or activities, on a three dimensional geospatial platform using multi-dimensional and scalable geospatial mapping, web mapping, mobile mapping & layers of geographic information associated with entities providing and/or members of the service and/or social networking.

The present invention can also exclude one or more of the following: (1) finding social awareness of companies found in patent searches; (2) showing entities such as companies on maps; (3) finding local real estate service providers on map searches; (4) ranking entities found using geospatial mapping, web mapping, mobile mapping & layers geographic information; (5) representing objects (e.g., brand or logo or product) of entities on a geospatial map; (6) providing local comparative shopping information to members on a website; and/or (7) modeling user views to include objects (brand, logo, or product) of entities in local environment.

Although various embodiments of this invention have been described above with a certain degree of particularity, and/or with reference to one and/or more individual embodiments, those skilled in the art could make numerous alterations to the disclosed embodiments without departing from the spirit and/or scope of this invention. And while the subject matter has been described in language specific to structural features and/or methodological arts, it is to be understood that the subject matter defined in the appended claims is not necessarily limited to the specific features and/or acts descried above. Rather, the specific features and acts described above are disclosed as example forms of implementing the claimed subject matter. It is intended that all matter contained in the above description and/or shown in the accompanying drawings shall be interpreted as illustrative only and not limiting. Changes in detail and/or structure can be made without departing from the basic elements of the invention as defined in the following claims.

EXAMPLES: EXEMPLARY IMPLEMENTATION OF NON-LIMITING EMBODIMENTS OF THE PRESENT INVENTION

The following example is shown by way of example and is not intended to limit the scope of the present invention in any way.

Example 1: Social Earth, Inc.: Description of Present Invention Example

The present invention in a non-limiting embodiment called Social Earth™ provides, in one aspect, for an infrastructure and global platform that provides users and members and businesses of all types with access to broad markets for the delivery of coupons, mobile services, products & services, clickable advertisements & mobile advertisements, mobile services, products & services, clickable advertisements & mobile advertisements by geo-target location, search and pay for coupons, mobile services, products & services, clickable advertisements & mobile advertisements by geo-target location, and allows users to engage in geo-target location-based social networking integration & mobile services from around the world to its Social Shoppers via its unique live view of the planet. The site includes links to places and events, data on the landscape, interactive 360 panoramas, fly-through shopping tours with stunning 3D imagery and videos, clickable advertisements & mobile advertisements by geo-target location, daily deal coupons and free or discounted printable coupons, products & services, clickable advertisements & mobile advertisements by geo-target location from merchants, business owners, B2B business directory, retailers and major brands around the world, and allows users to engage in geo-target location-based social networking integration & mobile services, mobile advertisements, mobile text, mobile SMS marketing, mobile search, mobile multimedia, mobile operating system, mobile device, mobile banking, mobile payment, mobile wallet and/or electronic payments, mobile wallet, mobile express checkout, mobile money transfer, mobile social media widgets, mobile keywords, mobile coupons, mobile instant messaging marketing, mobile voting, mobile eCards, mobile short codes, mobile commerce, mobile shopping, mobile push content, geo-mobile, geo-social, clickable advertisements & mobile advertisements by geo-target location, daily deal coupons and free or discounted printable coupons, products & services, clickable advertisements & mobile advertisements by geo-target location from merchants, business owners, B2B business directory, retailers and major brands around the world, and allows users to engage in geo-target location-based social networking integration & mobile services, on the 3D landscape, advanced search for private and public information, social networking integration, self-posting for uploading user generated content, custom tools, apps, widgets and other embodiments. Social Earth™ will include Social Earth™ Mobile allowing Social Shoppers to receive coupons, mobile services, products & services, clickable advertisements & mobile advertisements by geo-target location based upon their precise location. Mobile apps for smart phones (Android and tablets, iPhone, iPod Touch and iPad) are provided that will allow Social Shoppers to receive Mobile Coupons, Products & services, clickable advertisements & mobile advertisements by geo-target location from merchants, business owners, B2B business directory, retailers and major brands around the world, or retail based upon their precise location or other criteria, such as shopping or interest preferences. With Social EarthMobile, Social Shoppers can explore the same 3D imagery and terrain as the desktop version. Fly to your current location or just about anywhere in the world with the touch of a button. Pan, zoom, and tilt your view as you travel around the globe. Search for cities, places and businesses around the world. View layers of geographic information and more. The invention provides opportunities to reach people at the point of shopping—a benefit both to shoppers and merchants. What do you get when you combine a global marketplace with buyers and sellers and coupons, mobile services, products & services, clickable advertisements & mobile advertisements by geo-target location, daily deal coupons and free or discounted printable coupons, products & services, clickable advertisements & mobile advertisements by geo-target location from merchants, business owners, B2B business directory, retailers and major brands around the world, and allows users to engage in geo-target location-based social networking integration & mobile services, online auctions, daily deal coupons & free or discounted printable coupons, products & services, clickable advertisements & mobile advertisements by geo-target location from merchants, business owners, B2B business directory, retailers and major brands around the world, e-commerce, media and entertainment, sports, personal & financial, social networking, online dating, gaming, retail stores, virtual communities and virtual goods, microloans or microcredit, humanitarian aid and support other worldly causes through charitable donations or sustainable gifts, the social media revolution and the power of geo-mapping technology? You get a cutting-edge online experience that blends the best of online shopping and social networking and takes it to a stratospheric new height called SOCIAL EARTH™.

Unlike any other shopping site, when Social Earth™ site subscribers called Social Shoppers (or "SE SHOPPERS"), visit the Social Earth™ website, e.g., at www.socialearth.co, they are invited to travel virtually around the globe in search of clickable advertisements & mobile advertisements by geo-target location, search and pay for coupons, mobile services, products & services, clickable advertisements & mobile advertisements by geo-target location and the best bargains on the planet. This one-of-a-kind website aggregates coupons, mobile services, products & services, clickable advertisements & mobile advertisements by geo-target location, daily deal coupons and free or discounted printable coupons, products & services, clickable advertisements & mobile advertisements by geo-target location from merchants, business owners, B2B business directory, retailers and major brands around the world, and allows users to engage in geo-target location-based social networking integration & mobile services, online auctions, daily deal coupons & free or discounted printable coupons, products & services, clickable advertisements & mobile advertisements by geo-target location from merchants, business owners, B2B business directory, retailers and major brands around the world, or retail stores from around the world (collectively referred to as "Social Shopping") and virtually showcases them in their actual, physical location on the websites unique "live view" of Earth. As Social Shoppers shop the world for bargains, they can view Social Earth™ Shopping from major brands around the world for coupons, mobile services, products & services, clickable advertisements & mobile advertisements by geo-target location, daily deal coupons and free or discounted printable coupons, products & services, clickable advertisements & mobile advertisements by geo-target location from merchants, business owners, B2B business directory, retailers and major brands around the world, and allows users to engage in geo-target location-based social networking integration & mobile services, online auctions, daily deal coupons & free or discounted printable coupons, products & services, clickable advertisements & mobile advertisements by geo-target location from merchants, business owners, B2B business directory, retailers and major brands around the world, media and entertainment, sports, personal & financial, social networking, online dating, gaming, retail stores, virtual communities and virtual goods, microloans or microcredit, humanitarian aid and support other worldly causes through charitable donations or sustainable gifts, e.g., but not limited to, online auctions, residential and commercial real estate listings, loans and quotes, auto loans, mortgages, banking services, and/or any other product or service, e.g., but not limited to, family fun, sports, restaurants, events and hundreds of top consumer packaged goods brands for groceries, apparel, beauty products, beverages, books & magazines, foods, health care, household, office, personal care, pet care, photography, skincare & cosmetics and other embodiments.

Social Shoppers will find great product or services deals from leading restaurant, toy and entertainment companies and top retailers around the world. Social Shoppers can select a target location in the U.S., e.g., but not limited to, Atlanta, Austin, Dallas, Denver, San Diego, San Francisco or in other cities around the world. Social Shoppers can find product or services deals in London or they can tour the planet at will, jumping from Hong Kong to Amsterdam to Buenos Aires to check out the bargains. Because the Earth view comes live from satellite and webcam images, shoppers can zoom in for a closer look or zoom out to gain perspective on the location.

Social Earth™ will offer clickable advertisements & mobile advertisements opportunities for service providers, and business owners, B2B business directory e.g. for business services, healthcare services, specialty financial services, consumer products, specialty retail and media and entertainment, lenders, mortgage companies, auto finance companies and other business owners, B2B business directory' who want to reach millions of users and members online on Social Earth™. Clickable advertisements & mobile advertisements by geo-target location will appear at the top of consumers' property and service provider search results ahead of other properties meeting their search criteria. Realtors, mortgage lending, auto finance, financial services, healthcare, hospitality, cars, insurance, online education, government services, media and entertainment and sports industry, travel industry, top internet advertisers, social brands and thousands of service providers and business owners, B2B business directory will have the ability to purchase advertising space, which will appear at the top of consumers' property and service provider search results ahead of other properties meeting their search criteria. Consumers can learn about neighborhoods, property values, schools, shopping centers, cost of living features and join with thousands of service providers and business owners, B2B business directory from around the world. Our goal is to help consumers conveniently connect with thousands of service providers and business owners, B2B business directory to find what they're looking for in our Social Earth™ Personal Network.

Social Earth™ will also provide free real estate information and mortgage quotes from national lenders and mortgage companies for the purchase of a new home, refinance, consolidating debt, auto loans, insurance quotes or home equity loans. The Social Earth™ database includes millions of residential listings, commercial properties and thousands of service providers and business owners, B2B business directory. Millions of users and members will search online and align with thousands of service providers and business owners, B2B business directory in search of everything from "A" to "Z" whether its buying a home or a new or used car, finding an apartment or a medical professional or healthcare provider, booking travel, weather updates, breaking news, reading about your favorite celebrity or entertainer or sports' team, Social Earth™ has it all.

The Company's website will populate the virtual landscape with real estate listings, clickable advertisements & mobile advertisements by geo-target location from service providers and various links from the desired search request. Consumers can zoom in and out of the Social Earth Personal Network, click on clickable advertisements & mobile advertisements by geo-target location and links and see the exact location of a business, retailer, restaurant or shopping mall on the landscape. Clickable advertisements & mobile advertisements by geo-target location will appear at the top of the consumers' property and service provider search results. Home buyers and renters can learn about neighborhoods, property values, apartments, schools, shopping centers, cost of living and connect with thousands of real estate and other service providers and business owners, B2B business directory from around the world. The Social Earth™ Personal Network will allow consumers too easily and conveniently search for all of their personal and financial services from the comfort of their home. The future of searching for all of your personal and financial needs via the Internet is here with the development of a Social Earth™ Personal & Financial Network of Real Estate Professionals, Service Providers and Business owners, B2B business directory.

Social Earth™ displays, organizes and delivers information across many social layers and social media sites featuring top-notch content, stunning satellite imagery, aerial photography and graphic animated color overlays on top of Google Earth. Social Earth™ delivers a delightful mash-up of content, Social Earth™ Shopping and live social networking feeds from, e.g., Twitter™. Social Earth™ utilizes the top social networking platforms such as Facebook™, Twitter™ and Skype™ to allow Social Shoppers to share the latest product or services deals with their friends. Unlike Groupon™, Livingsocial™ or Google Offers™, Social Earth™ aggregates clickable advertisements & mobile advertisements by geo-target location, and allows users to engage in geo-target location-based social networking integration & mobile services, search and pay for coupons, mobile services, products & services, clickable advertisements & mobile advertisements by geo-target location on its site. Social Shoppers are encouraged to share these product or services deals with their friends in Facebook™, Twitter™, and Skype™ in real-time The global sharing capabilities are built into Social Earth™ technology using sophisticated technology integrating geospatial mapping, web mapping, mobile mapping & layers geographic information, layering location-relevant data, and GPS technologies.

Social Shoppers are able to find great coupons, mobile services, products & services, clickable advertisements & mobile advertisements by geo-target location in their local areas or just about anywhere else in the world with the click of a mouse or input on their mobile device or portable device (e.g. mobile device, telephone, smart phone, PDA, laptop computer, Android, iOS devices, iPhone, 3G, 3GS, iPhone, iPad, iPad Touch, etc.). Capitalizing on the popularity of social networking giants such as Facebook™ and Twitter™ with more than 750 million users worldwide, SOCIAL EARTH™ creates an online community that taps into the power of social networking by integrating live social feeds from these social networking giants directly into its website. By creating a highly engaged social networking community, Social Earth™ creates "stickiness," keeping the Social Shoppers on the site for long periods of time, as well as bringing them back again and again. In other words, Social Earth™ provides long-time customer loyalty, not just a one-off deal.

Social Earth™ also provides microloans or microcredit and donates a portion of each "coupon," "mobile services," or "products & services" by geo-target location that are sold to microloans or microcredit, humanitarian aid or other worldly cause. The community aspect of Social Earth™ is the driver behind building awareness of the website and its featured product or services deals. Existing and potential customers provide clickable advertisements & mobile advertisements by spreading the word to their friends about the great product or services deals they have found on a shopping site such as Social Earth™. Add to that the power of collective buying and its easy to see how the Social Earth™ community can leverage group size in exchange for larger discounts. Social Earth™ delivers Shopping from around the world to its Social Shoppers via its unique live view of the virtual Earth that includes links to places and events, data on the landscape, interactive 360 panoramas, fly-through shopping tours with stunning 3D imagery. The use of geospatial mapping, web mapping, mobile mapping & layers geographic information for associating information to specific places can included, but it not limited to, one or more of: Live links to places and events; Data on the landscape; Zoom to birds-eye and human scale views; 3D custom audio/visual content; Interactive 360 panoramas; Fly-through tours with content, narration, music; Stunning imagery and videos; 3D buildings and landscaping online auctions, e-commerce or m-commerce and mobile banking, mobile payment, mobile wallet and/or electronic payments tools and hooks; Clickable advertisements & mobile advertisements on the landscape; Advanced search for private and public information; Social networking integration; Self-posting for uploading user generated content; Custom tools, apps and widgets; and the like. Social Earth™. Mobile sends Shopping from around the world to Social Shoppers based upon their precise location. This provides opportunities to reach people at the point of shopping—a benefit both to shoppers and merchants.

Social Layers. Social Shoppers virtually travel around the globe in search of coupons, mobile services, products & services, clickable advertisements & mobile advertisements by geo-target location, as well as bargains. Social Earth's™ technology drives content into a "virtual Earth" of the shopping scene on the planet Earth and allow Social Shoppers to view Social Earth™ Shopping from around the world by geo-target location, their home town or another city around the world and virtually travel there. This one-of-a-kind website aggregates clickable advertisements & mobile advertisements by geo-target location, and allows users to engage in geo-target location-based social networking integration & mobile services, search and pay for coupons, mobile services, products & services, clickable advertisements & mobile advertisements by geo-target location from around the world and showcase them in their actual, physical location on the virtual Earth. Because the virtual Earth is "interactive," one can zoom in for a more detailed view or zoom out to gain perspective on where they are in the world. Social Earth™ Shopping can last for days, weeks or even months. What makes Social Earth's™ website different from other group buying websites is that Social Earth's™ website allows Social Shoppers to search for coupons, mobile services, products & services, clickable advertisements & mobile advertisements by geo-target location, as well as bargains on a virtual Earth, customize their buying preferences, engage in social networking and support worthwhile causes. Social Earth's™ website allows Social Shoppers to select from a menu of coupons based upon their preferences, which is integrated into the virtual Earth along with other layer location-relevant data as Social Shoppers shop online and interact with their friends on Facebook™, Twitter™ and "live" talk communications in real-time on Skype™. Advertisers and merchants will send coupons to Social Shoppers based on geo-target location.

Social Earth™ develops layer applications, which are known as "social layers." These social layers allow Social Shoppers to customize their personal experience on Social Earth™ as they search for Social Earth™ Shopping in their local area or just about anywhere else in the world based upon their interests or travels take them. Social Shoppers select from a menu of "Purchase Coupons" categories such as. (Arts & Entertainment, Travel, Giving Back, Eat & Drink, Deal of the Day) and "Free Coupons" categories such as: (Health & Beauty Products, Sports, Shopping, Groceries). Social Shoppers may be able to search for other products and services such as: Autos, Beauty Products, Business, Classic Car Parts, Restoration And Maintenance Services Collectibles & Art Custom Car Parts, Restoration And Maintenance Services, Deals & Gifts, Education, Electronics, Fashion, Financial, Healthcare, Home, Outdoor & Décor, Hospitality, Insurance, Online Services, Other Legal, Marketing, Medical Facilities, Medical Insurance, Medical Retailers, Motors, Pets Physicians, Dentists, Other Practioners Public Services Psychics, Intuitive, Metaphysical, Mediums & Spiritual Advisors, Real Estate, Skincare & Cosmetics, Sports, Travel, Tourism, Wedding, Parties & Entertainment, Online Dating and Free or Discounted Coupons). Social Earth™ drives traffic to its website by targeting Shopping from around the world, based upon a users and members preference, which are displayed on a unique "live view" of planet Earth. Once a Social Shopper selects one or more coupon categories, clickable advertisements & mobile advertisements by geo-target location for Social Earth Shopping from around the world populate the virtual Earth. Social Shoppers are able to double click on Shopping and fly directly to its location on Earth. Social Shoppers can also click on one of the featured cities and take a tour of London, San Francisco or Denver and zoom down to street level to take a closer look. Social Shoppers enjoy the experience of virtually traveling around the world, zooming in and out to street level in search for great product or services deals and sharing the latest product or services deals with their friends.

In connection with a one-of-a-kind geospatial website aggregates clickable advertisements & mobile advertisements by geo-target location, and allows users to engage in geo-target location-based social networking integration & mobile services, search and pay for coupons, mobile services, products & services, clickable advertisements & mobile advertisements by geo-target location from around the world and showcases them in their actual, physical location on the websites unique live view of a virtual Earth. As Social Shoppers shop the world for bargains, they can view Shopping from major brands around the world for family fun, sports, restaurants, events and hundreds of top consumer packaged goods brands for groceries, apparel, beauty products, beverages, books & magazines, foods, health care, household, office, personal care, pet care, photography, skincare & cosmetics and other embodiments. Social Shoppers can find great product or services deals from leading restaurant, toy and entertainment companies and top retailers around the world. Social Shoppers can use "a mobile device payment method and system for effectuating an online payment through a mobile device equipped carrier or a mobile device equipped bank using a mobile users and members device in connection with online auctions, e-commerce or m-commerce and mobile banking, mobile payment, mobile wallet and/or electronic payments transactions on the host geospatial website (e.g. mobile device, telephone, smart phone, PDA, laptop computer, Android, iOS devices, iPhone, 3G, 3GS, iPhone, iPad, iPad Touch, etc.); wherein users and members create and maintain a rich-media application via a geospatial mapping, web mapping, mobile mapping & layers geographic information platform via the Internet comprising: mobile banking, mobile payment, mobile wallet and/or electronic payments.

The delivery system for a host geospatial website will provide for a multidimensional representation of information and scalable version of web content for the delivery of Social Earth™ Shopping from around the world on a three dimensional geospatial platform using geospatial mapping, web mapping, mobile mapping & layers geographic information technology. A host geospatial website will include realistic virtual landscape using satellite and aerial photography that will include many content layers of web based information, online auctions, e-commerce or m-commerce and mobile banking, mobile payment, mobile wallet and/or electronic payments links, social networking and virtual clickable advertisements & mobile advertisements by geo-target location for a richer user experience. A host geospatial website shall store images, web-based content, social data and share live social feeds from social networks and other communications in real-time. Connecting Shopping from around the world with users and members known as "Social Shoppers" in real-time on a geographical area across multiple social layers that are displayed as graphic animated color overlays on a three dimensional geospatial platform using geospatial mapping, web mapping, mobile mapping & layers geographic information technology. More specifically, it relates to a method for users and members known as "Social Shoppers" to effectuate banking and electronic payments; accessing a user account, engaging in mobile social activities and viewing available options via a three dimensional geospatial mapping platform using geospatial mapping, web mapping, mobile mapping & layers geographic information technology."

Giving Back: Social Shoppers will be able to help those who have been impacted by a natural disaster, live in impoverished conditions or are less fortunate in the world. Social Shoppers are able to purchase coupons from merchants who support humanitarian causes in developing countries and charities in their communities and local and global causes around our planet and relief efforts for those who are suffering around the world from and need access to microloans or microcredit, humanitarian aid, charitable donations and sustainable gifts to save lives, alleviate suffering and maintain human dignity around the world to those impacted by a pole shift, an environmental disaster such as a nuclear reactor leak, oil spills or carbon gas leak, manmade disasters or natural disaster such as tsunamis, earthquake, hurricane, volcanic eruption, severe weather, heat wave, landslide or flooding. By tapping into the power of social networking and bringing together a collective consciousness with millions of Social Shoppers, Social Earth™ raises awareness for global issues and millions of dollars for microloans or microcredit, humanitarian aid and support other worldly causes or sustainable gifts.

Example 2: Further Description of Social Earth™ Example

What do you get when you combine the daily deal phenomenon, the social media revolution and the power of geo-mapping technology? You get a cutting-edge online experience that blends the best of daily deal sharing and social networking and takes it to a stratospheric new height called Social Earth™ that also gives back to local communities.

Unlike any other shopping site, when site subscribers called Social Shoppers (or "SE SHOPPERS"), visit the Social Earth™ website, "A Daily Coupon Site" located at www.socialearth.co, they are invited to virtually travel around the globe in search of the best bargains, products and services on the planet. This one-of-a-kind website aggregates coupons, mobile services, products & services, clickable advertisements & mobile advertisements by geo-target location, and allows users to engage in geo-target location-based social networking integration & mobile services for "daily deal coupons" and "free or discounted" printable coupons from major brands around the world (collectively referred to as "Coupons" as any product, service, or service provider, or subgroup thereof) and showcases them in their actual, physical location on the planet. Social Earth™ will integrate social media feeds from Facebook™, Twitter™ and Skype™. Social Earth™ is all about finding great bargains for savvy Social Shoppers and allowing them to give back to our planet and feel good knowing that a portion of each "coupon", "mobile services," or "products & services" by geo-target location that are sold on Social Earth™ will be made available for microloans or microcredit, humanitarian aid and support other worldly causes. Advertisers on Social Earth™ are also encouraged to give back to our planet.

Social Shoppers will be able to find great deals around the planet, and locally, from leading brands, Internet products and services providers, and top retailers. Social Shoppers will be able to select any desired target location and zoom into the local landscape and view some of the best shopping in cosmopolitan cities in North America, such as: San Francisco, Los Angeles, New York, Seattle and more. Looking for a vacation hot spot? Social Shoppers will be able to virtual travel to Buenos Aires, Rio De Janeiro, Belize or Bermuda to find great travel deals! Social Shoppers will be able to find great romance of shopping in major cosmopolitan cities in London, Paris, Barcelona or Rome. Because the Earth view comes live from satellite and webcam images, Social Shoppers can zoom in and out for a closer look and gain a perspective on the location.

Social Earth™ will display, organize and deliver clickable advertisements & mobile advertisements by geo-target location, Search and pay for coupons, mobile services, products & services, clickable advertisements & mobile advertisements by geo-target location in their exact location on the planet. Our website will feature top-notch content, stunning satellite imagery, aerial photography and graphic animated color overlays on top of Google Earth that will give Social Shoppers a wonderful perspective.[1] Social Earth™ will deliver a delightful mash-up of content, clickable advertisements & mobile advertisements by geo-target location, Coupons, Mobile Services, Products or Services, and "live social feeds" from Facebook™ and Twitter™ and "live" talk communications on Skype™ that will allow Social Shoppers to share their latest deals with their friends on Social Earth™ and in these popular social networks.

The community aspects of Social Earth™ are the driver behind building awareness of the website and its featured deals. Imagine a business model where existing and potential customers do the clickable advertisements & mobile advertisements for you by spreading the word to their friends about the great deals they've found on a shopping site such as Social Earth™. Add to that the power of collective buying and it's easy to see how the Social Earth™ community can leverage group size in exchange for larger discounts.

Clickable advertisements & mobile advertisements by geo-target location, search and pay for coupons, mobile services, products & services, clickable advertisements & mobile advertisements by geo-target location from around the world to its Social Shoppers via its unique live view of the planet. The site includes links to places and events, data on the landscape, interactive 360 panoramas, fly-through shopping tours with stunning 3D imagery and videos, clickable advertisements & mobile advertisements on the landscape, advanced search for private and public information, social networking integration, self-posting for uploading user generated content, custom tools, apps, widgets and more! As our community grows, Social Earth™ can include Social Earth™ Mobile allowing Social Shoppers to receive coupons, mobile services, products & services, clickable advertisements & mobile advertisements by geo-target location based upon their precise location. This opens up an incredible opportunity to reach people at the point of shopping—a benefit both to shoppers and merchants.

Products & Services Description

Social Earth™ includes and delivers a user-friendly smooth desktop interface and mobile app for smart phones that allows Social Shoppers to enjoy a unique experience utilizing a multitude of services as they virtually tour around Social Earth™. They are able to: Use Social Earth™ after installing Google Earth™ plug-in or similar plug-in; View clickable advertisements & mobile advertisements by geo-target location, search and pay for coupons, mobile services, products & services, clickable advertisements & mobile advertisements by geo-target location from around the world based upon their location or anywhere in the world on Social Earth's™ unique "live view" of the planet; Receive clickable advertisements & mobile advertisements by geo-target location, Coupons from around the world via email or mobile device or portable device (e.g. mobile device, telephone, smart phone, PDA, laptop computer, Android, iOS devices, iPhone, 3G, 3GS, iPhone, iPad, iPad Touch, etc.) based upon location; Search online for geo-target location-based social networking integration & mobile services, products and services; View "live social feeds" from Facebook and Twitter™; Connecting with their friends on Skype™; Zoom to birds-eye and human scale view and navigate around stunning 3D satellite images of the virtual Earth; Watch videos from RSS links; have a unique interactive user experience, view live links to places and events knowing that a portion of the dollars spent on Social Earth™ is going to provide access to microloans or microcredit, humanitarian aid, charitable donations and sustainable gifts to save lives, alleviate suffering and maintain human dignity around the world to those impacted by a pole shift, an environmental disaster such as a nuclear reactor leak, oil spills or carbon gas leak, man-made disasters or natural disaster such as tsunamis, earthquake, hurricane, volcanic eruption, severe weather, heat wave, landslide or flooding.

Advantages: Social Earth's™ unique shopping experience on a live view of the planet offers multiple advantages over other e-tail, daily deal, coupon and social networking sites by: Combining the community of social networking with the fun of collective buying, currently the fastest growing business model on the Web; A portion of each "Coupon," "Mobile Services," or "Products & Services" that are sold on Social Earth™ is going to provide microloans or microcredit, humanitarian aid or support other worldly causes through charitable donations or sustainable gifts; Gathering bargains from all over the world into one fun online shopping experience; Shoppers can search for Clickable advertisements & mobile advertisements by geo-target location, search and pay for coupons, mobile services, products & services, clickable advertisements & mobile advertisements by geo-target location from around the world in each market; With its easy-to-scale usability and social networking component, Social Earth™ will spread virally and expand rapidly into different regions; Allowing Social Shoppers to engage in social networking activities and mobile social networking activities and share the latest bargains with their friends will create "stickiness" and bring them back to the site again and again; Giving Social Shoppers a fun, hip interactive experience on a live view of a virtual Earth with satellite imagery, aerial photography and graphic animated color overlays; and/or Having a unique interactive user experience, view live links to places and events.

What is claimed is:

1. A method for purchasing a product or service by selecting the product or service by a user from mobile device or wireless device or computer with electronically generated and user customized web pages of an integrated social networking and 2D and 3D geospatial mapping interactive website, the customized web pages comprising the electronic display of online coupons and products or services or service providers in combination with geospatial mapping, mobile mapping, related company or local information, location-based services, location-based deals and offers, social networking, mobile ads and mobile coupons through controlling access to advertisements and geo-targeted advertisements, geo-location advertisements, mapped ads and advertising impressions in a network, comprising:

(a) electronically providing an integrated social networking and 2D and 3D geospatial mapping interactive website that provides geospatial mapping interactive displays interactive with social networking, where the geospatial interactive displays provide a multi-dimensional and scalable geospatial mapping functional tool, and where the social networking provides interactive emailing, instant messaging, texting, online auctions, social networking communities, online communications, user profiles, social plugins, social applications, entertainment shopping, bidding, advertisements, promotions, online coupons, mobile services, products, goods and services;

(b) electronically assigning and providing, on an electronic computing system via a processor, a unique identifier to said user from a client mobile device or computer receiving a request from said user from to provide said user with said unique identifier, through a client application operating on the client mobile device or computer, for the user to electronically access a website displayed on the user's client mobile device or computer the displayed website configured to display the customized web pages of the integrated social networking and 2D and 3D geospatial mapping interactive website, the customized web pages comprising the combination of:
  (i) online coupons;
  (ii) geospatial mapping,
  (iii) mobile mapping,
  (iv) company or local or global information,
  (v) location-based services,
  (vi) location-based deals and offers,
  (vii) social networking,
  (viii) mobile ads,
  (ix) mobile coupons,
  (x) advertisements, geo-targeted advertisements and geo-location advertisements,
  (xii) mapped ads,
  (xii) advertising impressions; and
  (xiii) products or services,
  the request including the identifier assigned to the client;

(c) electronically monitoring, collecting, and analyzing, via a processor in a computer system or mobile device, electronic behavior and location data of said user to generate initial end user data sets, the electronic behavior and location data user electronic data comprising preferred locations, location-based services, location-based deals and offers, user profile and/or lifestyle preferences, feeds, interests, preferences, social networking, mobile ads, mobile coupons, social networking interests or connections, online coupons, products or services, or service providers, advertisements, geo-targeted advertisements and geo-location ads, mapped ads, advertising impressions and marketing interests; and (d) electronically generating, via a processor in a computer system or mobile device, first promotional data sets from said initial end user data sets generated in said monitoring and analyzing step (c), said first promotional data sets comprising user customized data sets configured for the electronic display of said customized webpages of the integrated social networking and 2D and 3D geospatial mapping interactive website on said user's mobile device or computer display, the customized electronic data sets comprising:
  (i) online coupons data sets for products or services or service providers;
  (ii) geospatial map data sets or mobile mapping data sets,
  (iii) company product or service information data sets,
  (iv) advertisements and geo-targeted advertisements data sets,
  (v) advertising impressions and social networking information data sets,
  (vi) mobile ads data sets, and
  (vii) mobile coupons data sets, wherein said first promotional data sets comprising said user customized data sets include said user related preferred locations, location-based services, location-based deals and offers, user profile and/or lifestyle preferences, feeds, interests, social plugins, applications, chat rooms, online coupons, products, or services, advertisements, geo-targeted advertisements and geo-location advertisements, preferences, social networking, social networking interests or connections, online coupons, products or services, or service providers, mobile ads, mobile coupons, advertisements, geo-targeted advertisements and geo-location advertisements, mapped ads, advertising impressions, and marketing interests of users and members of said client mobile device or wireless device or computer; and (e) electronically sending to the client mobile device or computer said first promotional data sets comprising said user customized data sets configured for the electronic display of said customized webpages of the integrated social networking and 2D and 3D geospatial mapping interactive website on said user's mobile device or computer display;

(f) electronically displaying, on said user's client mobile device or computer, said first promotional data sets comprising said user customized data sets configured for the electronic display of said customized webpages of the integrated social networking and 2D and 3D geospatial mapping interactive website on said user's mobile device or computer display; and (g) purchasing said product or service by said user, wherein said purchasing is accomplished by a computer or mobile device computer program application on non-transitory readable media that is executed by a processor of a computer or mobile device; and (h) further comprising providing secure access; and, one or more of:
  the geospatial or mobile map data being defined by a collection of records in a geospatial database having coordinate fields corresponding to the collection of geospatial map files;
  the geospatial or mobile map data value corresponding to combinations of dataset layers;
  the geospatial or mobile map data value corresponding to a scale and a resolution of the geospatial map; and,
  the geospatial or mobile map data corresponding to an age of the geospatial data; and the determining operation further comprising denying the request if the age of the geospatial data falls within a temporal period defined by the presentation restriction.

2. The method of claim 1, wherein the identifier assigned to the client mobile device is not a user identity and is not an internet protocol address.

3. The method of claim 1, wherein said geospatial or mobile map data is defined by a collection of records in a geospatial database having coordinate fields corresponding to the collection of geospatial map files.

4. The method of claim 1, wherein the geospatial or mobile map data value corresponds to combinations of dataset layers.

5. The method of claim 4, wherein the geospatial or mobile map data value corresponds to one or both of a scale and/or a resolution of the geospatial map.

6. The method of claim 4, wherein the geospatial or mobile map data corresponds to an age of the geospatial data; and the determining operation further comprises denying the request if the age of the geospatial data falls within a temporal period defined by the presentation restriction.

7. A method according to claim 1, wherein said online coupon, product or service or mobile ads or mobile coupon or mapped ad is selected from at least one of advertisements or geo-targeted advertisements or geo-location advertisements, mapped ad, online coupons, service providers, mobile or web services, clickable advertisements, mobile advertisements by geo-target location, location-based services, location-based deals and offers, daily deal coupons, last minute deals, mobile ads, mobile coupons, free or discounted printable coupons, business directories, mobile advertisements, mobile text, mobile SMS marketing, mobile search, mobile multimedia, mobile operating systems, mobile device or wireless device or computer, mobile banking, mobile payment, mobile wallet or electronic payments, mobile express checkout, mobile money transfer, mobile social media, mobile keywords, mobile coupons, mobile instant messaging marketing, mobile voting, mobile e-cards, mobile short codes, mobile commerce, mobile shopping, mobile push content, geo-mobile information, geo-social information, geo-tagging, geo-targeted, geo-location, geo-fencing, daily deal coupons, last minute deals, mobile ads, mobile coupons, mapped ad, art, auctions, online auctions, e-commerce, m-commerce, media and entertainment, sports, personal networks, financial networks, travel and hospitality services, educational services, ancillary services, service providers and business owners, business services, healthcare services, financial services, consumer products, specialty retail, news, media, sports, entertainment, lenders, mortgage companies, social networking, online dating, gaming, retail stores, virtual communities, virtual goods.

8. A method according to claim 1, wherein said information further comprises socially conscious information and wherein said combination further comprises one or more of microloans, microcredit, humanitarian aid, or charitable donations.

9. A method according to claim 1, wherein
   (a) said social networking comprises one or more of social networking interactions, social applications, social sharing, social context advertising, commercial content advertising, social & mobile web interactions, geo-targeted ads, geo-location ads, mapped ads and advertising impressions; and
   (b) said advertising comprises one or more of mobile display advertising, mobile ads, mobile coupons, mobile advertising, social context advertising, location based ads, mapped ads, performance based ads, user profile based ads, lifestyle preference ads, commercial content advertising, geo-targeted ads, geo-location ads, and advertising impressions.

* * * * *